US008248397B2

(12) United States Patent
Toyomura et al.

(10) Patent No.: US 8,248,397 B2
(45) **Date of Patent: *Aug. 21, 2012**

(54) METHOD OF DRIVING ORGANIC ELECTROLUMINESCENCE EMISSION PORTION

(75) Inventors: Naobumi Toyomura, Kanagawa (JP); Katsuhide Uchino, Kanagawa (JP); Tetsuro Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 986 days.

This patent is subject to a terminal disclaimer.

(21) Appl. No.: 12/285,592

(22) Filed: Oct. 9, 2008

(65) Prior Publication Data

US 2009/0115765 A1 May 7, 2009

(30) Foreign Application Priority Data

Nov. 2, 2007 (JP) ................................ 2007-286063

(51) Int. Cl.
*G09G 3/30* (2006.01)
*G09G 5/00* (2006.01)
*G06F 3/038* (2006.01)

(52) U.S. Cl. ............ 345/211; 345/76; 345/80; 345/212

(58) Field of Classification Search .................. 345/211
See application file for complete search history.

(56) References Cited

U.S. PATENT DOCUMENTS

2002/0158666 A1* 10/2002 Azami et al. .................... 326/83
2002/0196243 A1* 12/2002 Morita .......................... 345/204
2009/0058771 A1* 3/2009 Toyomura et al. .............. 345/80
2011/0227897 A1* 9/2011 Iida et al. ...................... 345/211

FOREIGN PATENT DOCUMENTS

JP 2006-215213 8/2006

* cited by examiner

*Primary Examiner* — Sumati Lefkowitz
*Assistant Examiner* — Andrew Yeretsky
(74) *Attorney, Agent, or Firm* — Rader Fishman & Grauer, PLLC

(57) ABSTRACT

Disclosed herein is a method of driving an organic electroluminescence emission portion, the driving method including the steps of: executing steps from preprocessing step to writing step for at least continuous three scanning time periods; applying a first node initialization voltage to corresponding one of the data lines, and supplying the video signal instead of the first node initialization voltage for each of the scanning time periods; applying the first node initialization voltage from the corresponding one of the data lines to the first node through the write transistor held in the ON state, thereby initializing the potential at the first node; and applying the first node initialization voltage from the corresponding one of the data lines to the first node through the write transistor held in an ON state, thereby holding the potential at the first node.

4 Claims, 26 Drawing Sheets

METHOD OF DRIVING ORGANIC ELECTROLUMINESCENCE EMISSION PORTION

CROSS REFERENCES TO RELATED APPLICATIONS

The present invention contains subject matter related to Japanese Patent Application JP 2007-286063 filed in the Japan Patent Office on Nov. 2, 2007, the entire contents of which being incorporated herein by reference.

BACKGROUND OF THE INVENTION

1. Field of the Invention

The present invention relates to methods of driving an organic electroluminescence emission portion.

2. Description of the Related Art

In an organic electroluminescence display device (hereinafter simply referred to as "an organic EL display device" for short when applicable) using an organic electroluminescence element (hereinafter simply referred to as "an organic EL element" for short when applicable) as an electroluminescence element, a luminance of the organic EL element is controlled in accordance with a value of a current caused to flow through the organic EL element. Also, a simple matrix system and an active matrix system are well known as a driving method in the organic EL display device as well similarly to the case of a liquid crystal display device. Although the active matrix system has a disadvantage that a structure is more complicated than that based on the simple matrix system, it has various advantages that an image having a light luminance is obtained, and so forth.

A drive circuit composed of five transistors and one capacitor (called a 5Tr/1C drive circuit) is well known as a circuit for driving an organic electroluminescence emission portion (hereinafter simply referred to as "an electroluminescence portion" when applicable) constituting the organic EL element from Japanese Patent Laid-Open No. 2006-215213. As shown in FIG. 16, the 5Tr/1C drive circuit is composed of five transistors of a write transistor $TR_W$, a drive transistor $TR_D$, a first transistor $TR_1$, a second transistor $TR_2$ and a third transistor $TR_3$, and one capacitor portion $C_1$. Here, a source/drain region on one side of the drive transistor $TR_D$ constitutes a second node $ND_2$, and a gate electrode of the drive transistor $TR_D$ constitutes a first node $ND_1$.

For example, each of the write transistor $TR_W$, the drive transistor $TR_D$, the first transistor $TR_1$, the second transistor $TR_2$, and the third transistor $TR_3$ is composed of an n-channel thin film transistor (TFT), and the electroluminescence portion ELP is provided on an interlayer insulating film or the like which is formed so as to cover the drive circuit. An anode electrode of the electroluminescence portion ELP is connected to the source/drain region on the one side of the drive transistor $TR_D$. On the other hand, a voltage $V_{Cat}$ (for example, 0 V) is applied to a cathode electrode of the electroluminescence portion ELP. In FIG. 16, reference symbol $C_{EL}$ designates a capacitance of the drive transistor $TR_D$.

As shown in a conceptual view of FIG. 17, the organic EL display device includes:

(1) a scanning circuit 101;

(2) a signal outputting circuit 102;

(3) (M×N) organic EL elements each including the electroluminescence portion ELP, and a drive circuit for driving the electroluminescence portion ELP;

(4) M scanning lines SCL which are each connected to the scanning circuit 101 and which extend in a first direction;

(5) N data lines DTL which are each connected to the signal outputting circuit 102 and which extend in a second direction different from the first direction (specifically, in a direction intersecting perpendicularly to the first direction);

(6) a power source portion 100;

(7) a first transistor controlling circuit 111;

(8) a second transistor controlling circuit 112; and (9) a third transistor controlling circuit 113.

Here, the N organic EL elements 10 are disposed in the first direction, and the M organic EL elements are disposed in the second direction, that is, the (M×N) organic EL elements 10 are disposed in a two-dimensional matrix. It is noted that although the (3×3) organic EL elements 10 are shown in FIG. 17 for the sake of convenience, this is merely an exemplification.

FIG. 18 schematically shows a timing chart in the drive operation in the organic EL elements 10. Also, FIGS. 19A to 19I schematically show an ON/OFF state and the like of the write transistor $TR_W$, the drive transistor $TR_D$, the first transistor $TR_1$, the second transistor $TR_2$, and the third transistor $TR_3$. As shown in FIG. 18, preprocessing for executing threshold voltage canceling processing is executed for [time period-TP(5)$_1$]. That is to say, each of potentials of a second transistor controlling line $AZ_2$ and a third transistor controlling line $AZ_3$ is set at a high level in accordance with the operations of the second transistor controlling circuit 112 and the third transistor controlling circuit 113. As a result, as shown in FIG. 19B, the second transistor $TR_2$ and the third transistor $TR_3$ are each turned ON, so that a potential at the first node $ND_1$ is set at $V_{0fs}$ (for example, 0 V). On the other hand, a potential at the second node $ND_2$ is set at $V_{ss}$ (for example, −10 V). As a result, a difference in potential between the gate electrode of the drive transistor $TR_D$, and the source/drain region on the electroluminescence portion ELP side becomes equal to or higher than the threshold voltage $V_{th}$ (for example, 3 V) of the drive transistor $TR_D$. Also, the drive transistor $TR_D$ is held in an ON state.

Next, as shown in FIG. 18, the threshold voltage canceling processing is executed for [time period-TP(5)$_2$]. The potential of the second transistor controlling line $AZ_2$ is set at a low level in and before completion of [time period-TP(5)$_1$], thereby turning OFF the second transistor $TR_2$ as shown in FIG. 19C. A potential of a first transistor controlling line $CL_1$ is set at a high level in accordance with the operation of the first transistor controlling circuit 111 in a commencement of [time period-TP(5)$_2$] while the ON state of the third transistor $TR_3$ is maintained. As a result, as shown in FIG. 19D, the first transistor $TR_1$ is turned ON. As a result, the potential at the second node $ND_2$ changes toward a potential obtained by subtracting the threshold voltage $V_{th}$ of the drive transistor $TR_D$ from the potential at the first node $ND_1$. That is to say, the potential at the second node $ND_2$ held in a floating state rises. Also, when the difference in potential between the gate electrode and the source/drain region on the electroluminescence portion ELP side of the drive transistor $TR_D$ reaches the threshold voltage $V_{th}$ of the drive transistor $TR_D$, the drive transistor $TR_D$ is turned OFF. In this state, the potential at the second node $ND_2$ is held approximately at ($V_{0fs}$−$V_{th}$). After that, for [time period-TP(5)$_3$], while the third transistor $TR_3$ is held in the ON state, the potential of the first transistor controlling line $CL_1$ is set at the low level in accordance with the operation of the first transistor controlling circuit 111. As a result, as shown in FIG. 19E, the first transistor $TR_1$ is turned OFF. Next, for [time period-TP(5)$_4$], the third transistor controlling line $AZ_3$ is set at the low level in accordance with the operation of the third transistor controlling circuit 113, thereby turning OFF the third transistor $TR_3$ as shown in FIG. 19F.

Next, as shown in FIG. 18, processing for writing data to the drive transistor $TR_D$ is executed for [time period-TP(5)$_5$]. Specifically, as shown in FIG. 19G, while each of the first transistor $TR_1$, the second transistor $TR_2$ and the third transistor $TR_3$ is held in the OFF state, a potential of corresponding one of the data lines DTL is set at a voltage [a voltage of a video signal (a drive signal, a luminance signal) $V_{Sig}$ used to control the luminance in the electroluminescence portion ELP] corresponding to a video signal. Next, the potential of the corresponding one of the scanning lines SCL is set at the high level, thereby turning ON the write transistor $TR_W$. As a result, the potential at the first node $ND_1$ rises to $V_{Sig}$. The electric charges based on a change in potential at the first node $ND_1$ are distributed to the capacitor portion $C_1$, the capacitance $C_{EL}$ of the electroluminescence portion ELP, and the parasitic capacitance between the gate electrode and the source/drain region on the electroluminescence portion ELP side of the drive transistor $TR_D$. Therefore, the potential at the second node $ND_2$ changes so as to follow a change in potential at the first node $ND_1$. However, the change in potential at the second node $ND_2$ becomes small as the capacitance value of the capacitance $C_{EL}$ of the electroluminescence portion ELP becomes larger. In general, the capacitance value of the capacitance $C_{EL}$ of the electroluminescence portion ELP is larger than that of each of the capacitor portion $C_1$, and the parasitic capacitance of the drive transistor $TR_D$. Then, when it is assumed that the potential at the second node $ND_2$ hardly changes, a difference $V_{gs}$ in potential between the gate electrode, and the source/drain region on the electroluminescence portion ELP side in the drive transistor $TR_D$ is expressed by Expression (1):

$$V_{gs} \approx V_{Sig} - (V_{Ofs} - V_{th}) \quad (1)$$

After that, as shown in FIG. 18, mobility correcting processing is executed for [time period-TP(5)$_6$]. In the mobility correcting processing, the potential at the source/drain region on the electroluminescence portion ELP side of the drive transistor $TR_D$ (that is, the potential at the second node $ND_2$) is made to rise in accordance with the characteristics (such as the magnitude of a mobility μ) of the drive transistor $TR_D$. Specifically, as shown in FIG. 19H, while the write transistor $TR_W$ is held in the ON state, the first transistor $TR_1$ is turned ON in accordance with the operation of the first transistor controlling circuit 111. Next, after a lapse of a predetermined time ($t_0$), the write transistor $TR_W$ is turned OFF. As a result, when the value of the mobility μ of the drive transistor $TR_D$ is large, an amount, ΔV (potential correction value), of potential risen at the source/drain region on the electroluminescence portion ELP side in the drive transistor $TR_D$ becomes large. On the other hand, when the value of the mobility μ of the drive transistor $TR_D$ is small, an amount, ΔV (potential correction value), of potential risen at the source/drain region on the electroluminescence portion ELP side in the drive transistor $TR_D$ becomes small. Here, the difference $V_{gs}$ in potential between the gate electrode, and the source/drain region on the electroluminescence portion ELP side in the drive transistor $TR_D$ is transferred from Expression (1) into Expression (2):

$$V_{gs} \approx V_{Sig} - (V_{Ofs} - V_{th}) - \Delta V \quad (2)$$

It is noted that a predetermined time (a total time $t_0$ of [time period-TP(5)$_6$] demanded to execute the mobility correcting processing has to be previously calculated as a design value when the organic EL display device is designed.

By performing the above operations, the threshold voltage canceling processing, the write processing and the mobility correcting processing are all completed. Also, for subsequent [time period-TP(5)$_7$], the write transistor $TR_W$ is held in the OFF state, and the first node $ND_1$, that is, the gate electrode of the drive transistor $TR_D$ is held in the floating state. On the other hand, the first transistor $TR_1$ is held in the ON state, and thus one of the source/drain regions of the first transistor $TR_1$ is held in a state of being connected to a power source portion (a voltage $V_{CC}$, for example, 20 V) for controlling the electroluminescence of the electroluminescence portion ELP. Therefore, as the result of the foregoing, as shown in FIG. 18, the potential at the second node $ND_2$ rises, so that the same phenomenon as that in a so-called bootstrap circuit occurs in the gate electrode of the drive transistor $TR_D$. Thus, the potential as well at the first node $ND_1$ rises. As a result, the difference $V_{gs}$ in potential between the gate electrode, and the source/drain region on the electroluminescence portion ELP side in the drive transistor $TR_D$ holds the value in Expression (2). In addition, a current caused to flow through the electroluminescence portion ELP is a drain current $I_{ds}$ caused to flow from the drain region into the source region of the drive transistor $TR_D$. Thus, when it is assumed that the drive transistor $TR_D$ ideally operates in a saturated region, the drain current $I_{ds}$ can be given by Expression (3):

$$I_{ds} = k \cdot \mu \cdot (V_{gs} - V_{th})^2 = k \cdot \mu \cdot (V_{gs} - V_{th} - \Delta V)^2 \quad (3)$$

As shown in FIG. 19I, the drain current $I_{ds}$ is caused to flow through the electroluminescence portion ELP. Also, the electroluminescence portion ELP emits a light with a luminance corresponding to the value of the drain current $I_{ds}$.

SUMMARY OF THE INVENTION

It is necessary to perform the switching of the ON state/the OFF state for the transistors constituting the drive circuit until completion of the threshold voltage canceling processing. However, the electric power consumed in the scanning circuit and the like increases in correspondence to the number of times of the switching of the ON state/the OFF state for the transistors. In addition, the drive circuit shown in FIG. 16 further requires three transistors in addition to the drive transistor for causing the electroluminescence portion ELP to emit a light, and the video signal writing transistor. Thus, the configuration of the drive circuit is complicated. From a viewpoint of making the manufacture of the organic EL display device easy, and enhancing the yield, it is preferable that the configuration of the drive circuit of the organic EL element is simple.

In the light of the foregoing, it is therefore desirable to provide a method of driving an organic electroluminescence emission portion which is capable of making a configuration of a drive circuit simple, and reducing the number of times of switching of an ON state/an OFF state for transistors constituting the drive circuit without posing a problem for threshold voltage canceling processing.

In order to attain the desire described above, according to an embodiment of the present invention, there is provided a method of driving an organic electroluminescence emission portion, in which a drive circuit for driving an organic electroluminescence emission portion includes:

(A) a drive transistor including source/drain regions, a channel formation region, and a gate electrode;

(B) a write transistor including source/drain regions, a channel formation region, and a gate electrode; and (C) a capacitor portion including a pair of electrodes;

in the drive transistor, (A-1) one of the source/drain regions is connected to a power source portion;

(A-2) the other of the source/drain regions is connected to an anode electrode provided in the organic electroluminescence light emission portion, and is connected to one of the pair of electrodes of the capacitor portion, thereby forming a second node; and (A-3) the gate electrode is connected to the other of the source/drain regions of the write transistor, and is connected to the other of the pair of electrodes of the capacitor portion, thereby forming a first node;

in the write transistor, (B-1) one of the source/drain regions is connected to corresponding one of data lines; and (B-2) the gate electrode is connected to corresponding one of scanning lines;

by using the drive circuit, there are performed the steps of:

(a) executing preprocessing for initializing a potential at the first node and a potential at the second node so that a difference in potential between the first node and the second node exceeds a threshold voltage of the drive transistor, and a difference in potential between the second node and a cathode electrode provided in the organic electroluminescence emission portion does not exceed a threshold voltage of the organic electroluminescence emission portion;

(b) executing threshold voltage canceling processing for applying a higher voltage than that obtained by subtracting the threshold voltage of the drive transistor from the potential at the first node from the power source portion to one of the source/drain regions of the drive transistor in a state of holding the potential at the first node, thereby changing the potential at the second node toward the potential obtained by subtracting the threshold voltage of the drive transistor from the potential at the first node at least once;

(c) executing write processing for supplying a video signal from the corresponding one of the data lines to the first node through the write transistor; and (d) turning OFF the write transistor to set the first node in a floating state, thereby causing a current corresponding to a value of the difference in potential between the first node and the second node to flow from the power source portion to the organic electroluminescence emission portion through the driving transistor;

the driving method including the steps of:

executing steps from the step (a) to the step (c) for at least continuous three scanning time periods;

applying a first node initialization voltage to corresponding one of the data lines, and supplying the video signal instead of the first node initialization voltage for each scanning time period;

applying the first node initialization voltage from the corresponding one of the data lines to the first node through the write transistor held in an ON state, thereby initializing the potential at the first node in the step (a); and holding a state of applying the first node initialization voltage from the corresponding one of the data lines to the first node through the write transistor held in an ON state, thereby holding the potential at the first node in the step (b).

Also, in the method of driving an organic electroluminescence emission portion according to an embodiment of the present invention, auxiliary bootstrap processing for turning OFF the write transistor for one scanning time period in a state in which a higher voltage than a voltage obtained by subtracting a threshold voltage of the drive transistor from a first node initialization voltage applied to the first node in the step (b) is applied from the power source portion to one of the source/drain regions for a time period from completion of the preprocessing to start of the threshold voltage canceling processing intended to be executed right before execution of write processing to cause the potential at the second node to rise, thereby causing the potential at the first node held in the floating state to rise is executed at least once.

In the driving method of the present invention, the auxiliary bootstrap processing is executed at least once for the time period from completion of the preprocessing to start of the threshold voltage canceling processing intended to be executed right before execution of the write processing. In the auxiliary bootstrap processing, the write transistor is held in the OFF state for one scanning time period. Therefore, as will be described later, it is possible to reduce the number of times of the switching of the ON state/the OFF state for the transistors constituting the drive circuit as compared with the driving method not including the auxiliary bootstrap processing. In addition, when the threshold voltage canceling processing is executed after execution of the auxiliary bootstrap processing, the potential at the second node basically changes toward the target potential (more specifically, the potential corresponding to the voltage obtained by subtracting the threshold voltage of the drive transistor from the first node initialization voltage applied to the first node in the step (b)) so as to follow the potential risen by executing the auxiliary bootstrap processing. Therefore, it is prevented to impede the operation of the threshold voltage canceling processing unless the potential at the second node over-rises in accordance with the auxiliary bootstrap processing. It is noted that in the auxiliary bootstrap processing, the potential at the first node held in the floating state also rises. However, in the threshold voltage canceling processing, the first node initialization voltage is applied from the corresponding one of the data lines to the first node. Therefore, the operation of the threshold voltage canceling processing is prevented from being impeded even when the potential at the first node rises in the auxiliary bootstrap processing.

In the threshold voltage canceling processing, the higher voltage (for example, 20 V) than the voltage obtained by subtracting the threshold voltage of the drive transistor from the potential at the first node (in other words, the first node initialization voltage) is applied from the power source portion to one of the source/drain regions of the drive transistor. In the auxiliary bootstrap processing as well, the same voltage is applied from the power source portion to one of the source/drain regions of the drive transistor. Here, comparing the speed of the rise of the potential at the second node in the state in which the low voltage such as the first node initialization voltage (for example, 0 V) is applied to the first node with the speed of the rise of the potential at the second node when the first node is in the floating state, the latter is qualitatively higher than the former. Therefore, execution of the auxiliary bootstrap processing makes it possible to cause the potential at the second node to more rapidly rise. As a result, there is also offered an advantage that the threshold voltage canceling processing can be executed for a short time period.

In the driving method according to an embodiment of the present invention, the steps from the step (a) to step (c) may be executed for continuous three scanning time periods, or may be executed for a time period longer than the continuous three scanning time periods. The number of times of the auxiliary bootstrap processing executed for a time period from completion of the preprocessing to start of the threshold voltage canceling processing intended to be executed right before execution of the write processing, for example, may be suitably set in accordance with the design of the organic electroluminescence display device to which the driving method according to an embodiment of the present invention is applied. In addition, when the auxiliary bootstrap processing is executed multiple times, the auxiliary bootstrap processing may be executed continuously multiple times, or another processing may be executed between the auxiliary bootstrap processing and the next auxiliary bootstrap processing. For example, the first time threshold voltage canceling processing may be executed after completion of the initialization, next, the auxiliary bootstrap processing may be executed continuously twice, and after that, the threshold voltage canceling processing intended to be executed right before the write processing may be executed. Or, a constitution can be exemplified such that the first time threshold voltage canceling processing is executed after completion of the initialization. Next, the auxiliary bootstrap processing is executed once, thereafter, the second time threshold voltage canceling processing is executed, next, the auxiliary bootstrap processing is executed once, and the threshold voltage canceling processing intended to be executed before the write processing is then executed. In what order the auxiliary bootstrap processing is executed multiple times has to be suitably set in accordance with the design of the organic electroluminescence display device to which the driving method according to an embodiment of the present invention is applied.

The organic electroluminescence display device to which the driving method according to an embodiment of the present invention is applied, for example, includes:

(1) a scanning circuit;

(2) a signal outputting circuit;

(3) (N×M) organic electroluminescence elements disposed in a two-dimensional matrix, the N organic electroluminescence elements being disposed in a first direction, the M organic electroluminescence elements being disposed in a second direction different from the first direction, each of the (N×M) organic electroluminescence elements including an organic electroluminescence emission portion and a drive circuit for driving the organic electroluminescence emission portion;

(4) M scanning lines each being connected to the scanning circuit so as to extend in the first direction;

(5) N data lines each being connected to the video signal outputting circuit so as to extend in the second direction; and (6) a power source portion.

In the driving method according to an embodiment of the present invention, for a predetermined scanning time period, the first node initialization voltage is applied to the corresponding one of the data lines, and next the video signal is applied thereto instead of applying the first node initialization voltage. When the step (a) is performed, the write transistor can be turned ON after the voltage applied to the corresponding one of the data lines is switched over to the first initialization voltage. Or, the write transistor can be turned ON in accordance with a signal transmitted through the corresponding one of the scanning lines prior to a commencement of the scanning time period for which the step (a) is performed, and in this state, the step (a) can be performed. In the case of the constitution of the latter, the potential at the first node is initialized as soon as the first node initialization voltage is applied to the corresponding one of the data lines. In the case of the former constitution that the write transistor is turned ON after the voltage applied to the corresponding one of the data lines is switched over to the node initialization voltage, a time must be allocated to the preprocessing, including the time requisite to wait for the switching. On the other hand, in the case of the latter constitution, the preprocessing can be executed for a shorter time period because no time requisite to wait for the switching is necessary. As a result, it is possible to allocate a longer time to the threshold voltage canceling processing or the like executed so as to follow the preprocessing.

In the driving method according to an embodiment of the present invention, the drive transistor is turned OFF when the potential at the second node reaches the potential obtained by subtracting the threshold voltage of the drive transistor from the potential at the first node by executing the threshold voltage canceling processing intended to be executed right before the write processing. On the other hand, when the potential at the second node does not reach the potential obtained by subtracting the threshold voltage of the drive transistor from the potential at the first node, a difference in potential between the first node and the second node is larger than the threshold voltage of the drive transistor, and thus the drive transistor is not turned OFF. In the driving method according to an embodiment of the present invention, it is not necessarily required that the drive transistor is turned OFF as the result of execution of the threshold voltage canceling processing intended to be executed right before execution of the write processing. It is noted that the write processing may be executed as soon as the threshold voltage canceling processing is completed, or may be executed at a regular interval.

In the driving method according to the embodiment of the present invention, in step (d), the write transistor is turned OFF in accordance with the signal from the corresponding one of the scanning lines. An anteroposterior relationship between this timing and a timing at which a predetermined voltage (hereinafter simply referred to as "a drive voltage" when applicable) is applied from the power source portion to one of the source/drain regions of the drive transistor in order to cause the current to flow through the organic electroluminescence portion is not especially limited. For example, after the write transistor is turned OFF, immediately or at a predetermined interval, the drive voltage may be applied to one of the source/drain regions of the drive transistor. Or, the write transistor may be turned OFF in a state in which the drive voltage is applied to one of the source/drain regions of the drive transistor. In the latter case, in the state in which the drive voltage is applied to one of the source/drain regions of the drive transistor, a time period exists for which the video signal is supplied from the corresponding one of the data lines to the first node. For this time period, there is performed the operation of the mobility correcting processing for causing the potential at the second node to rise in corresponding to the characteristics of the drive transistor.

The drive voltage described above, and the voltage applied to one of the source/drain regions of the drive transistor in the step (b) may be different from each other. However, preferably, the power source portion applies the drive voltage to one of the source/drain regions of the drive transistor in the step (b) and the step (d) from a viewpoint of reducing the kinds of voltages each of which is supplied from the power source portion.

In addition, in the driving method according to the embodiment of the present invention, the step (c) can be performed in the state in which the drive voltage is applied to one of the source/drain regions of the drive transistor. With this constitution, the write processing is executed together with the mobility correcting processing described above.

Although the details of the drive circuit will be described later, the drive circuit concerned can be configured in the form of a drive circuit composed of two transistors and one capacitor portion (called a 2Tr/1C drive circuit), three transistors and one capacitor portion (called a 3Tr/1C drive circuit) or four transistors and one capacitor portion (called a 4Tr/1C drive circuit). In any of the drive circuits, the number of transistors is reduced as compared with the drive circuit shown in FIG. 16, and thus the configuration of the drive circuit is simplified.

As described above, an organic electroluminescence display device to which the drive method of the present invention is applied can include:

(1) a scanning circuit;

(2) a signal outputting circuit;

(3) (N×M) organic electroluminescence elements disposed in a two-dimensional matrix, N organic electroluminescence elements being disposed in a first direction, M organic electroluminescence elements being disposed in a second direction different from the first direction, each of the (N×M) organic electroluminescence elements including an organic electroluminescence emission portion and a drive circuit for driving the organic electroluminescence emission portion;

(4) M scanning lines each connected to the scanning circuit so as to extend in the first direction;

(5) N data lines each connected to the signal outputting circuit so as to extend in the second direction; and (6) a power source portion.

Also, each of the organic electroluminescence elements (hereinafter simply referred to as "the organic EL elements" when applicable) is composed of the drive circuit including a drive transistor, a write transistor and a capacitor portion, and an organic electroluminescence emission portion.

The organic electroluminescence display device (hereinafter simply referred to as "the organic EL display device" when applicable) in the drive method of the present invention may adopt a configuration adopted to so-called monochrome display, or a configuration in which one pixel is composed of a plurality of sub-pixels, specifically, a form in which one pixel is composed of three sub-pixels of sub-pixels of a red light emitting sub-pixel, a green light emitting sub-pixel, and a blue light emitting sub-pixel. Moreover, one pixel can also be composed of one set of sub-pixels obtained by adding one kind or a plurality kind of sub-pixels to these three kinds of sub-pixels (for example, one set of sub-pixels obtained by adding a sub-pixel for emitting a white light for enhancement of a luminance to these three kinds of sub-pixels, one set of sub-pixels obtained by adding a sub-pixel for emitting a complementary color light for enlargement of a color reproduction range to these three kinds of sub-pixels, or one pair of sub-pixels obtained by adding sub-pixels for emitting a yellow light and a cyan light, respectively, to these three kinds of sub-pixels).

In the organic EL display device of the present invention, the various kinds of circuits such as the scanning circuit and the signal outputting circuit, the wirings such as the scanning lines and the data lines, the power source portion, and the organic electroluminescence emission portion (hereinafter simply referred to as "the electroluminescence portion" when applicable) can have the well-known configurations and structures. Specifically, the electroluminescence portion, for example, can be composed of an anode electrode, a hole transport layer, an electroluminescence layer, an electron transport layer, a cathode electrode, and the like.

An n-channel thin film transistor (TFT) can be given as the transistor constituting the drive circuit. The drive circuit may be either of an enhancement type or of a depletion type. In the case of the n-channel transistor, a Lightly Doped Drain (LDD) structure may be formed therein. The LDD structure may be asymmetrically formed in some cases. For example, a large current is caused to flow through the drive transistor when the organic EL element emits a light. Thus, the drive transistor may adopt the structure in which the LDD structure is asymmetrically formed in a way such that the LDD structure is formed only on one side, of the source/drain region, becoming the drain region side in the phase of the electroluminescence. It is noted that for example, a p-channel thin film transistor can be used as the write transistor or the like as the case may be.

The capacitor portion constituting the drive circuit can be composed of one electrode, the other electrode, and a dielectric layer (insulating layer) sandwiched between them. The above-mentioned transistors and capacitor portion constituting the drive circuit is formed within a certain plane (for example, formed on a supporting body), and the electroluminescence portion, for example, is formed above the transistors and the capacitor portion constituting the drive circuit through an interlayer insulating layer. In addition, the other of the source/drain regions of the drive transistor is connected to an anode electrode provided in the electroluminescence portion through, for example, a contact hole. It is noted that a structure may also be adopted such that the transistors are formed on a semiconductor substrate or the like.

In the driving method according to an embodiment of the present invention, the auxiliary bootstrap processing is executed at least once for the time period from completion of the preprocessing to start of the threshold voltage canceling processing intended to be executed right before the write processing. In the auxiliary bootstrap processing, the write transistor is held in the OFF state for one scanning time period. Therefore, the number of times of the switching of the ON state/the OFF state for the transistors constituting the drive circuit can be reduced as compared with the case of the driving method including no auxiliary bootstrap processing. In addition, when the threshold voltage canceling processing is executed after completion of the auxiliary bootstrap processing, the potential at the second node basically changes toward the target potential so as to follow the potential risen by executing the auxiliary bootstrap processing. Therefore, the operation of the threshold voltage canceling processing is prevented from being impeded unless the potential at the second node over-rises by executing the auxiliary bootstrap processing. It is noted that in the auxiliary bootstrap processing, the potential at the first node held in the floating state also rises. However, in the threshold voltage canceling processing, the first node initialization potential is applied from the corresponding one of the data lines to the first node. Therefore, the operation of the threshold voltage canceling processing is prevented from being impeded even when the potential at the first node rises in the auxiliary bootstrap processing.

In the threshold voltage canceling processing, the higher voltage (for example, 20 V) than the voltage obtained by subtracting the threshold voltage of the drive transistor from the potential at the first node (in other words, the first node initialization voltage) is applied from the power source portion to one of the source/drain regions of the drive transistor. In the auxiliary bootstrap processing as well, the same voltage is applied from the power source portion to one of the source/drain regions of the drive transistor. Here, comparing the speed of the rise of the potential at the second node in the state in which the low voltage such as the first node initialization voltage (for example, 0 V) is applied to the first node with the speed of the rise of the potential at the second node when the first node is held in the floating state, the latter is qualitatively higher than the former. Therefore, execution of the auxiliary bootstrap processing makes it possible to cause the potential at the second node to more rapidly rise. As a result, there is also offered an advantage that the threshold voltage canceling processing can be executed for a short time period.

DETAILED DESCRIPTION OF THE PREFERRED EMBODIMENTS

Although embodiments of the present invention will be described in detail hereinafter with reference to the accompanying drawings, an outline of an organic EL display device used in each of the embodiments will be described below prior thereto.

Figure 1:
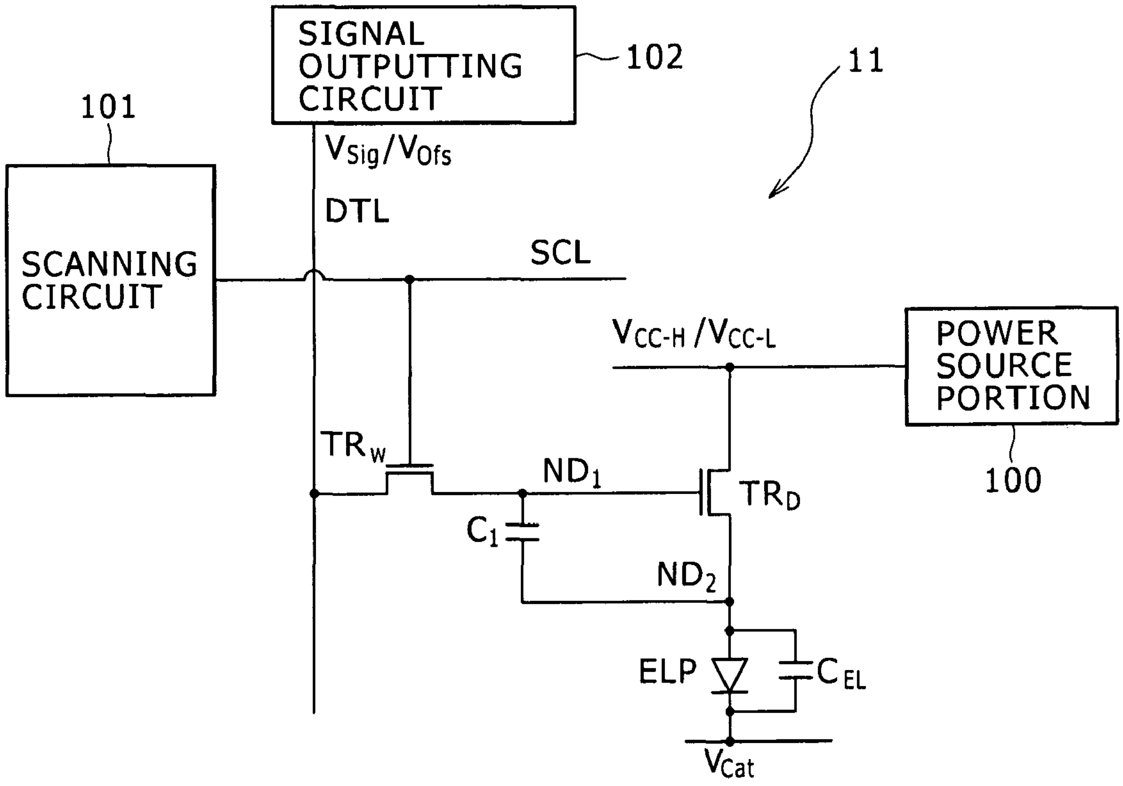
FIG. 1 is an equivalent circuit diagram of a drive circuit composed of 2 transistors/1 capacitor portion in Embodiment 1.
Figure 2:
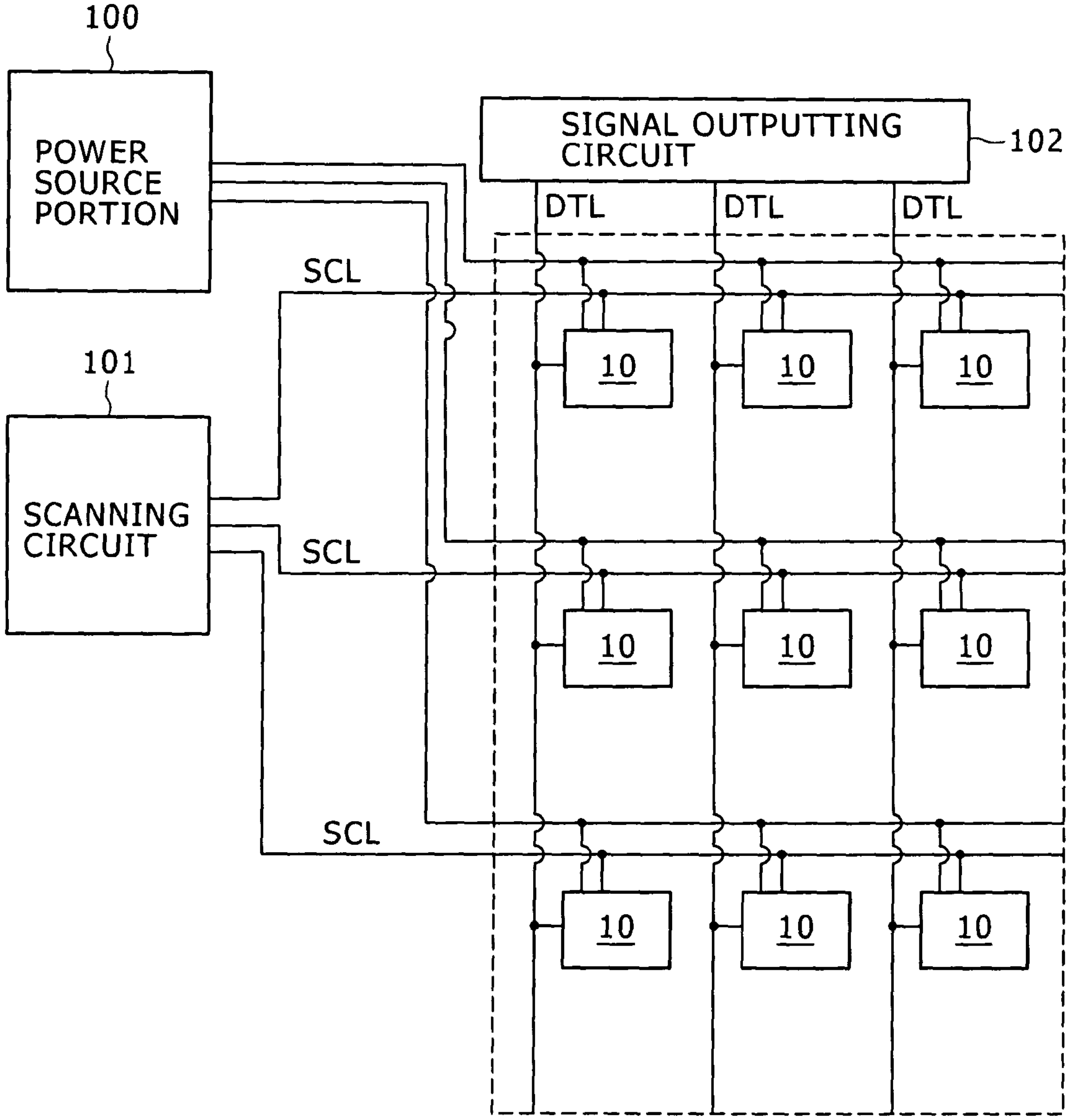
FIG. 2 is a conceptual view of an organic EL display device in Embodiment 1.
Figure 8:
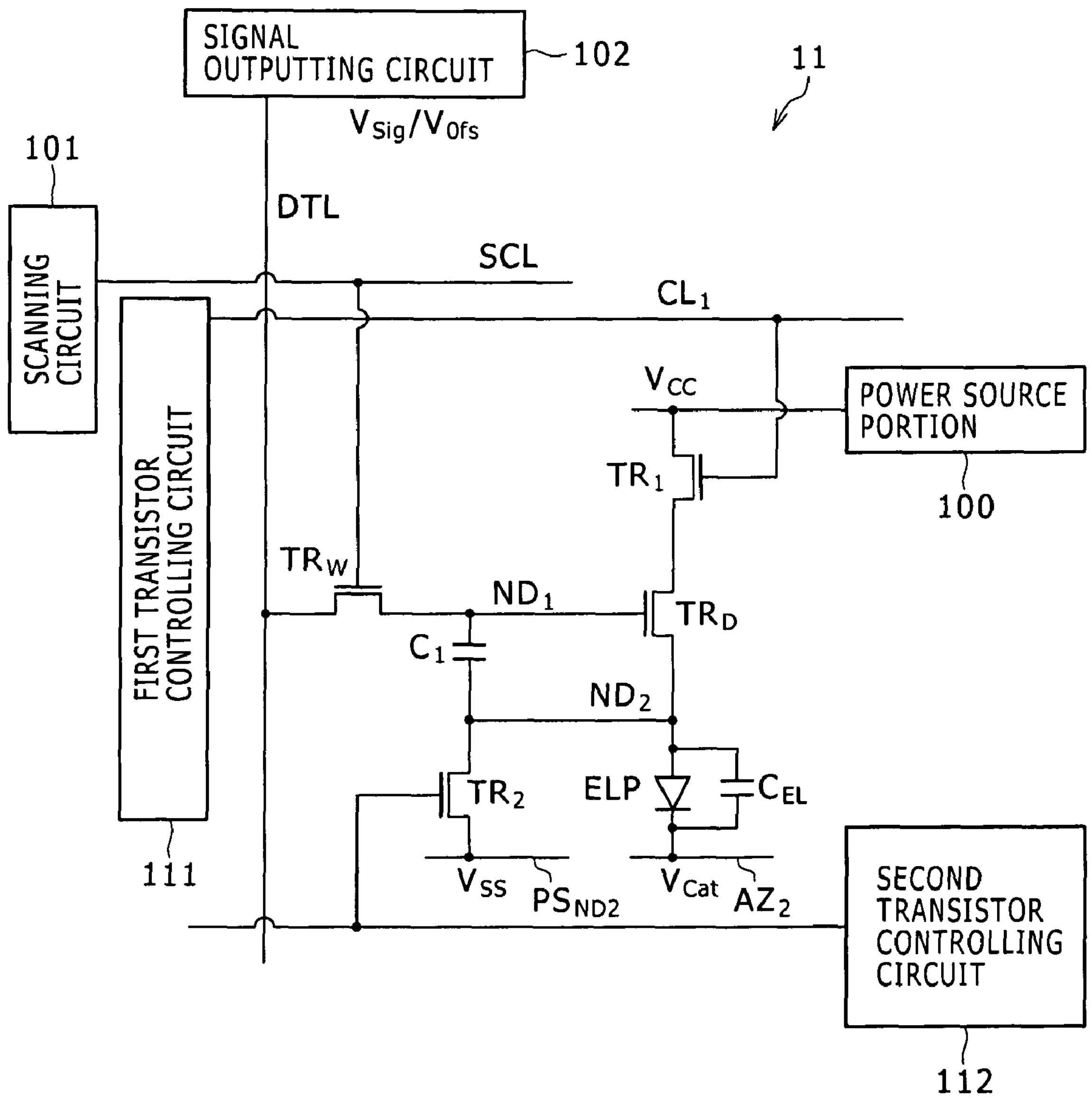
FIG. 8 is an equivalent circuit diagram of a drive circuit composed of 4 transistors/1 capacitor portion in Embodiment 2.
Figure 9:
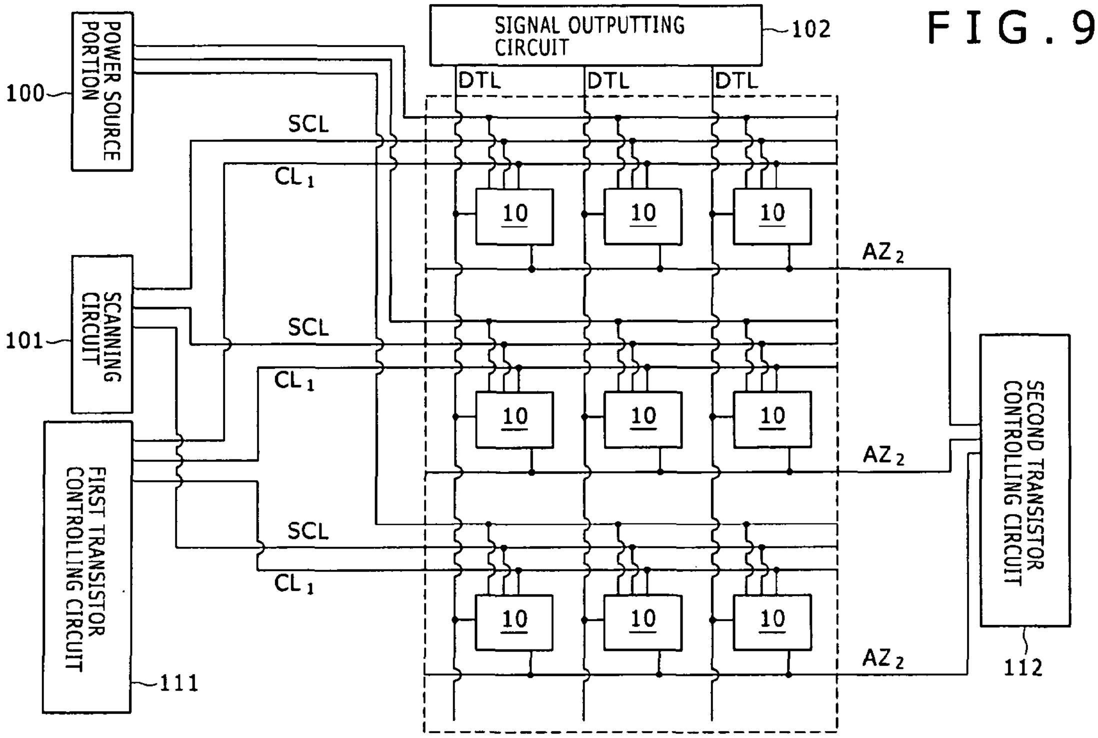
FIG. 9 is a conceptual view of an organic EL display device in Embodiment 2.
Figure 12:
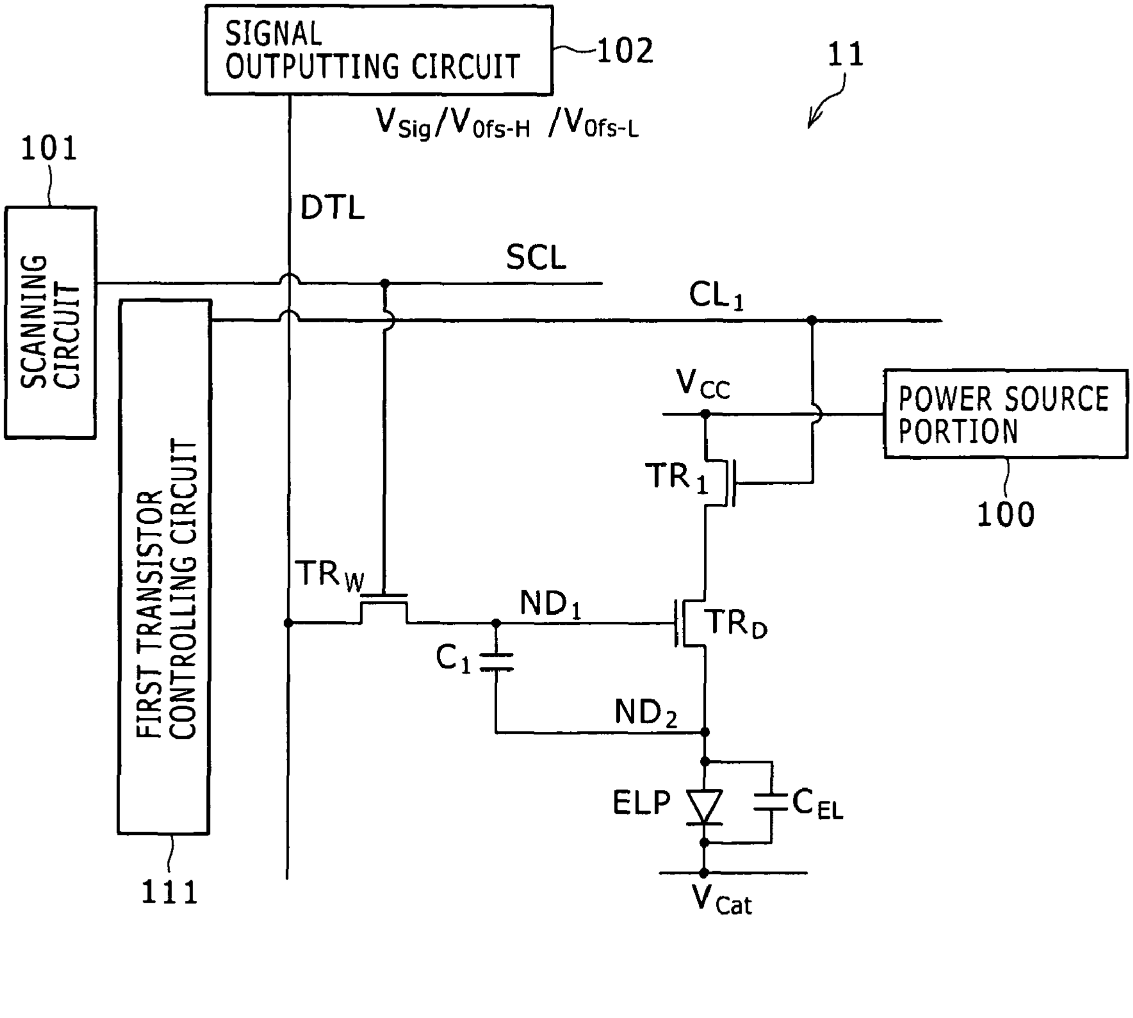
FIG. 12 is an equivalent circuit diagram of a drive circuit composed of 3 transistors/1 capacitor portion in Embodiment 3.
Figure 13:
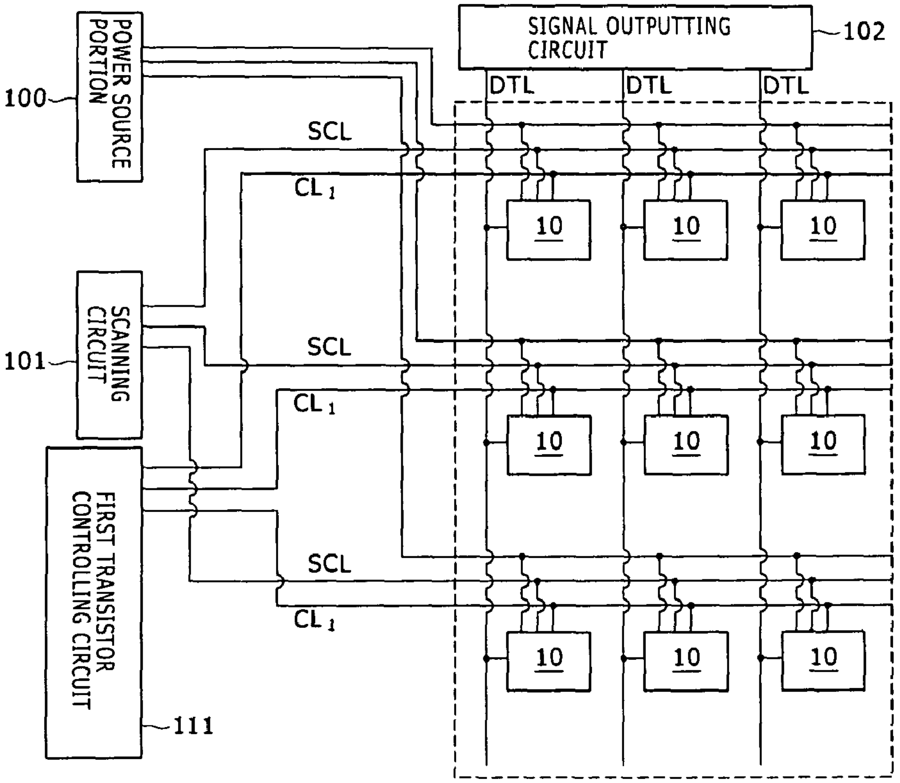
FIG. 13 is a conceptual view of an organic EL display device in Embodiment 3.

The organic EL display device suitable for being used in each of the embodiments is one including a plurality of pixels. Also, one pixel is composed of a plurality of sub-pixels (a sub-pixel for emitting a red light, a sub-pixel for emitting a green light and a sub-pixel for emitting a blue light as three sub-pixels in each of the embodiments). Each of the sub-pixels is composed of an organic EL element 10 having a structure obtained by laminating a drive circuit 11, and an organic electroluminescence emission portion (an electroluminescence portion ELP) connected to the drive circuit 11. FIG. 1 shows an equivalent circuit diagram of a drive circuit in Embodiment 1, and FIG. 2 shows a conceptual view of an organic EL display device. FIG. 8 shows an equivalent circuit diagram of a drive circuit in Embodiment 2, and FIG. 9 shows a conceptual view of an organic EL display device. Also, FIG. 12 shows an equivalent circuit diagram of a drive circuit in Embodiment 3, and FIG. 13 shows a conceptual view of an organic EL display device. Note that, the drive circuit shown in FIG. 1 is one which is basically composed of 2 transistors/1 capacitor portion, the drive circuit shown in FIG. 8 is one which is basically composed of 4 transistors/1 capacitor portion, and the drive circuit shown in FIG. 12 is one which is basically composed of 3 transistors/1 capacitor portion.

Here, the organic EL display device in each of Embodiments 1 to 3 includes:

(1) a scanning circuit 101;

(2) a signal outputting circuit 102;

(3) (M×N) organic EL elements 10;

(4) M scanning lines SCL which are each connected to the scanning circuit 101 and which extend in a first direction (a horizontal direction in each of Embodiments);

(5) N data lines DTL which are each connected to the signal outputting circuit 102 and which extend in a second direction (specifically, in a direction intersecting perpendicularly to the first direction, that is, a vertical direction in each of Embodiments); and (6) a power source portion 100.

In this case, the N organic EL elements 10 are disposed in the first direction, and the M organic EL elements 10 are disposed in the second direction, that is, the (M×N) organic EL elements 10 are disposed in a two-dimensional matrix. It is noted that although the (3×3) organic EL elements 10 are illustrated in each of FIGS. 2, 9 and 13, this is merely an exemplification.

The electroluminescence portion ELP has the well-known structure having an anode electrode, a hole transport layer, an electroluminescence layer, an electron transport layer, a cathode electrode, and the like. The scanning circuit 101, the signal outputting circuit 102, the scanning lines SCL, the data lines DTL, and the power source portion 100 can have the well-known configurations and structures. In addition, a first transistor controlling circuit 111 and a first transistor controlling line $CL_1$ shown in FIGS. 9 and 13, and a second transistor controlling circuit 112 and a second transistor controlling line $AZ_2$ shown in FIG. 9 can also have the well-known configuration and structure, respectively.

Giving minimum constituent elements of the drive circuit, the drive circuit includes at least (A) a drive transistor $TR_D$, (B) a write transistor $TR_W$, and (C) a capacitor portion $C_1$ having a pair of electrodes. The drive transistor $TR_D$ is composed of an n-channel TFT including source/drain regions, a channel formation region, and a gate electrode. In addition, the write transistor $TR_W$ is also composed of an n-channel TFT including source/drain regions, a channel formation region, and a gate electrode. It is noted that the write transistor $TR_W$ may also be composed of a p-channel TFT.

Here, in the drive transistor $TR_D$, (A-1) one of the source/drain regions is connected to the power source portion 100;

(A-2) the other of the source/drain regions is connected to the anode electrode provided in the electroluminescence portion ELP, and is connected to one of the pair of electrodes of the capacitor portion $C_1$, thereby forming a second node $ND_2$; and (A-3) the gate electrode is connected to the other of the source/drain regions of the write transistor $TR_W$, and is connected to the other of the pair of electrodes of the capacitor portion $C_1$, thereby forming a first node $ND_1$.

In addition, in the write transistor $TR_W$, (B-1) one of the source/drain regions is connected to the corresponding one of the data lines DTL; and (B-2) the gate electrode is connected to the corresponding one of the scanning lines SCL.

Figure 3:
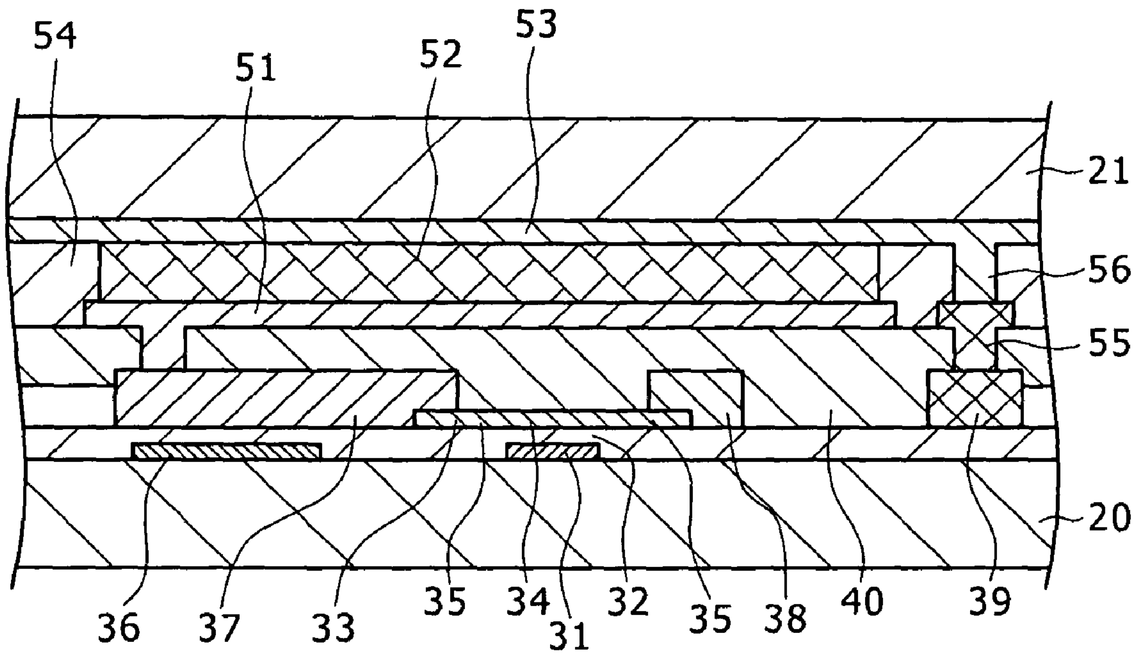
FIG. 3 is a schematic partial cross sectional view of a part of an organic EL element in Embodiment 1.

FIG. 3 shows a schematic partial cross sectional view of a part of the organic EL element 10. The write transistor $TR_W$ and the drive transistor $TR_D$, and the capacitor portion $C_1$ which constitute the drive circuit 11 for the organic EL element 10 are formed on a supporting body 20. The electroluminescence portion ELP, for example, is formed above the write transistor $TR_W$ and the drive transistor $TR_D$, and the capacitor portion $C_1$ which constitute the drive circuit 11 through an interlayer insulating layer 40. In addition, the other of the source/drain regions of the drive transistor $TR_D$ is connected to the anode electrode provided in the electroluminescence portion ELP through a contact hole. It is noted that FIG. 3 illustrates only the drive transistor $TR_D$. Thus, other transistors are blocked from view.

More specifically, the drive transistor $TR_D$ is composed of a gate electrode 31, a gate insulating layer 32, a semiconductor layer 33, source/drain regions 35 provided in the semiconductor layer 33, and a channel formation region 34 to which a portion of the semiconductor layer 33 between the source/drain regions 35 corresponds. On the other hand, the capacitor portion $C_1$ is composed of the other electrode 36, a dielectric layer constituted by an extension portion of the gate insulating layer 32, and one electrode 37 (corresponding to the second node $ND_2$). The gate electrode 31, a part of the gate insulating layer 32, and the other electrode 36 constituting the capacitor portion $C_1$ are all formed on the supporting body 20. One of the source/drain regions 35 of the drive transistor $TR_D$ is connected to a wiring 38, and the other of the source/drain regions 35 of the drive transistor $TR_D$ is connected to one electrode 37 (corresponding to the second node $ND_2$). The drive transistor $TR_D$, the capacitor portion $C_1$, and the like are covered with the interlayer insulating film 40. Also, the electroluminescence portion ELP composed of the anode electrode 51, the hole transport layer, the electroluminescence layer, the electron transport layer and the cathode electrode 53 is formed on the interlayer insulating layer 40. It is noted that in FIG. 3, the hole transport layer, the electroluminescence layer, and the electron transport layer are illustrated in the form of one layer 52. A second interlayer insulating layer 54 is provided on a portion of the interlayer insulating film 40 having no electroluminescence portion ELP provided thereon. Also, a transparent substrate 21 is disposed on the second interlayer insulating layer 54 and the cathode electrode 53, so that a light emitted from the electroluminescence layer passes through the transparent substrate 21 to be emitted to the outside. It is noted that one electrode 37 (the second node $ND_2$), and the anode electrode 51 are connected to each other through a contact hole formed in the interlayer insulating film 40. In addition, the cathode electrode 53 is connected to the wiring 39 provided on the extension portion of the gate insulating layer 32 through through holes 56 and 55 formed in the second interlayer insulating layer 54 and the first interlayer insulating layer 40, respectively.

The organic EL display device is composed of the (N/3)×M pixels which are disposed in a two-dimensional matrix. One pixel is composed of three sub-pixels (a sub-pixel for emitting a red light, a sub-pixel for emitting a green light, and a sub-pixel for emitting a blue light). It is assumed that the organic EL elements 10 constituting the respective pixels are driven in accordance with a line-sequence system, and a display frame rate is FR (times/second). That is to say, the organic EL elements 10 constituting the (N/3) pixels (N sub-pixels) which are disposed in the m-th row (m=1, 2, 3, . . . , M) are simultaneously driven. In other words, in the organic EL elements 10 constituting one row, a timing of electroluminescence/non-electroluminescence thereof is controlled in units of row to which they belong. Note that, the processing for writing the video signal to the pixels constituting one row may be processing for simultaneously writing the video signal to all the pixels (hereinafter simply referred to as "simultaneous write processing" when applicable) or processing for sequentially writing the video signal every pixel (hereinafter simply referred to as "sequential write processing" when applicable). Selection between the simultaneous write processing and the sequential write processing is suitably performed depending on the configuration of the drive circuit.

Here, although in principles, the driving and operation of the organic EL element 10 located in the m-th row and the n-th column (n=1, 2, 3, . . . , N) are described, such an organic EL element 10 will be referred hereinafter to as the (n, m)-th organic EL element 10 or the (n, m)-th sub-pixel. Also, the various kinds of processing (threshold voltage canceling processing, write processing, and mobility correcting processing) is executed until completion of the horizontal scanning time period for the organic EL elements 10 disposed in the m-th row (more specifically, the m-th horizontal scanning time period in the current display frame (hereinafter simply referred to as "the m-th horizontal scanning time period" when applicable)). It is noted that the write processing and the mobility correcting processing need to be basically executed within the m-th horizontal scanning time period. On the other hand, the threshold voltage canceling processing and the pre-processing following the same can also be executed prior to the m-th horizontal scanning time period.

Also, after completion of all the various kinds of processing described above, the electroluminescence portions constituting the respective organic EL elements 10 disposed in the m-th row are made to emit lights, respectively. It is noted that the electroluminescence portions may be made to the lights, respectively, immediately after completion of all the various kinds of processing described above, or may be made to emit the lights, respectively, after a lapse of a predetermined time period (for example, of a predetermined time period for the number of predetermined rows). The predetermined time period can be suitably set depending on the specification of the organic EL display device, the configuration of the drive circuit, and the like. It is noted that in the following description, it is assumed for the sake of convenience of the description that the electroluminescence portions may be made to the lights, respectively, immediately after completion of all the various kinds of processing described above. Also, the light emission from the electroluminescence portions constituting the respective organic EL elements 10 disposed in the m-th row is continuously performed until just before start of the horizontal scanning time period for the organic EL elements 10 disposed in the (m+m')-th row. Here, "m'" is determined based on the design specification of the organic EL display device. That is to say, the light emission from the electroluminescence portions constituting the respective organic EL elements 10 disposed in the m-th row of a certain display frame is continuously performed until completion of the (m+m'−1)-th horizontal scanning time period. On the other hand, the electroluminescence portions constituting the respective organic EL elements 10 disposed in the m-th row each maintain the non-electroluminescence state as a general rule for a time period from the commencement of the (m+m')-th horizontal scanning time period to completion of the write processing and the mobility correcting processing for the m-th horizontal scanning time period. Setting of the time period for the non-electroluminescence state described above (hereinafter simply called "the non-electroluminescence time period" when applicable) results in that the residual image blur following the active matrix drive can be reduced, and thus the grade of the moving image can be made more excellent. However, the electroluminescence/non-electroluminescence state of each of the sub-pixels (the organic EL elements 10) is by no means limited to the state described above. In addition, a time length of the horizontal scanning time period is one which is shorter than (1/FR)×(1/M) seconds. When the value of (m+m') exceeds M, the operation for the horizontal scanning time period for an exceeded part of the value of (m+m') is performed in the next display frame.

The term of "one of the source/drain regions" in the two source/drain regions of one transistor is used to mean the source/drain region on the side connected to the power source side in some cases. In addition, the wording "the transistor is held in the ON state" means that a channel is formed between the source/drain regions. In this case, it is no object whether or not the current is caused to flow from one of the source/drain regions of such a transistor to the other of the source/drain regions thereof. On the other hand, the wording "the transistor is held in the OFF state" means that no channel is formed between the source/drain regions. In addition, the wording "the source/drain region of a certain transistor is connected to the source/drain region of another transistor" inclusively means the form that the source/drain region of the certain transistor and the source/drain region of another transistor occupy the same region. Moreover, the source/drain region can be made of a metal, an alloy or conductive particles as well as made of a conductive material such as polysilicon amorphous silicon containing therein an impurity. Or, the source/drain region can be structured in the form of a luminance structure thereof, a layer made of an organic material (conductive polymer molecules). In addition, in each of timing charts used in the following descriptions, a length (time length) of an axis of abscissa represents time periods is schematic one, and thus does not represent a rate of the time lengths of the time periods.

By using the drive circuit described above, a driving method in each of Embodiments 1 to 3 includes the steps of:

(a) executing preprocessing for initializing the potential at the first node $ND_1$ and the potential at the second node $ND_2$ so that a difference in potential between the first node $ND_1$ and the second node $ND_2$ exceeds a threshold voltage ($V_{th}$ which will be described later) of the drive transistor $TR_D$, and a differenced in potential between the second node $ND_2$ and the cathode electrode of the organic electroluminescence portion ELP does not exceed a threshold voltage ($V_{th-EL}$ which will be described later) of the organic electroluminescence portion ELP; next (b) executing the threshold voltage canceling processing for applying a voltage higher than that obtained by subtracting the threshold voltage $V_{th}$ of the drive transistor $TR_D$ from the potential at the first node $ND_1$ in a state of holding the potential at the first node $ND_1$ from the power source portion 100 to one of the source/drain regions of the drive transistor $TR_D$, thereby changing the potential at the second node $ND_2$ toward the potential obtained by subtracting the threshold voltage $V_{th}$ of the drive transistor $TR_D$ from the potential at the first node $ND_1$ at least once;

(c) executing the write processing for supplying a video signal from the corresponding one of the data lines DTL to the first node ND1 through the write transistor $TR_W$; and (d) turning OFF the write transistor $TR_W$ to set the first node $ND_1$ in a floating state, thereby causing a current corresponding to a value of the difference in potential between the first node $ND_1$ and the second node $ND_2$ to flow from the power source portion 100 to the organic electroluminescence portion ELP through the drive transistor $TR_D$.

Also, steps from the step (a) to the step (c) are executed for at least continuous three scanning time periods, a first node initialization voltage ($V_{0fs}$ which will be described later) is applied to the corresponding one of the data lines DTL for each scanning time period, and next the video signal ($V_{Sig}$ which will be described later) is applied instead of applying the first node initialization voltage $V_{0fs}$;

in the step (a), the first node initialization voltage is applied from the corresponding one of the data lines DTL to the first node $ND_1$ through the write transistor $TR_W$ held in the ON state, thereby initializing the potential at the first node $ND_1$; and in the step (b), a state in held in which the first node initialization voltage is applied from the corresponding one of the data lines DTL to the first node $ND_1$ through the write transistor $TR_W$ held in the ON state, thereby holding the potential at the first node $ND_1$.

Also, in the method of driving an organic electroluminescence emission portion according each embodiments of the present invention, auxiliary bootstrap processing for turning OFF the write transistor $TR_W$ for one scanning time period in a state in which a higher voltage than a voltage obtained by subtracting a threshold voltage of the drive transistor $TR_D$ from a first node initialization voltage applied to the first node in the step (b) is applied from the power source portion to one of the source/drain regions for a time period from completion of the preprocessing to start of the threshold voltage canceling processing intended to be executed right before execution of write processing to cause the potential at the second node to rise, thereby causing the potential at the first node held in the floating state to rise is executed at least once.

It is noted that although in each of Embodiments 1 to 3, the write transistor $TR_W$ is turned ON for the scanning time period right before the scanning time period for which the step (a) is intended to be performed, and in this state, the step (a) is then performed, the present invention is by no means limited thereto.

Hereinafter, a method of driving the electroluminescence portion ELP will be described based on Embodiments 1 to 3.

Embodiment 1

Embodiment 1 relates to a method of driving the organic electroluminescence emission portion of the present invention. In Embodiment 1, the drive circuit is configured in the form of a 2Tr/1C drive circuit. In Embodiment 1 and other embodiment described later, it is noted that the description is given on the assumption that the steps from the step (a) to the step (c) are executed for at least continuous three scanning time periods.

Figure 4:
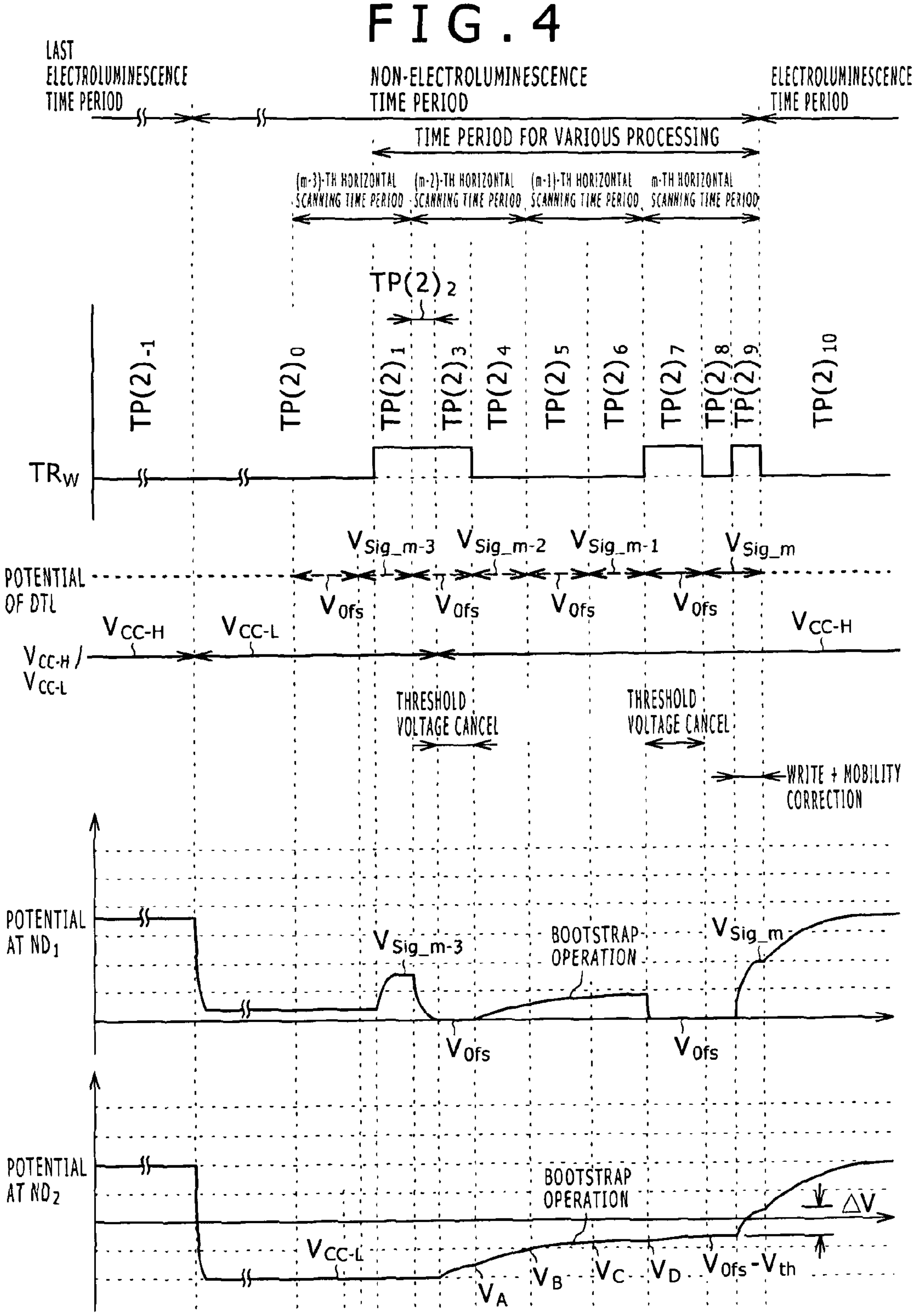
FIG. 4 is a timing chart schematically explaining a drive operation in the organic EL element in Embodiment 1.
Figure 6:
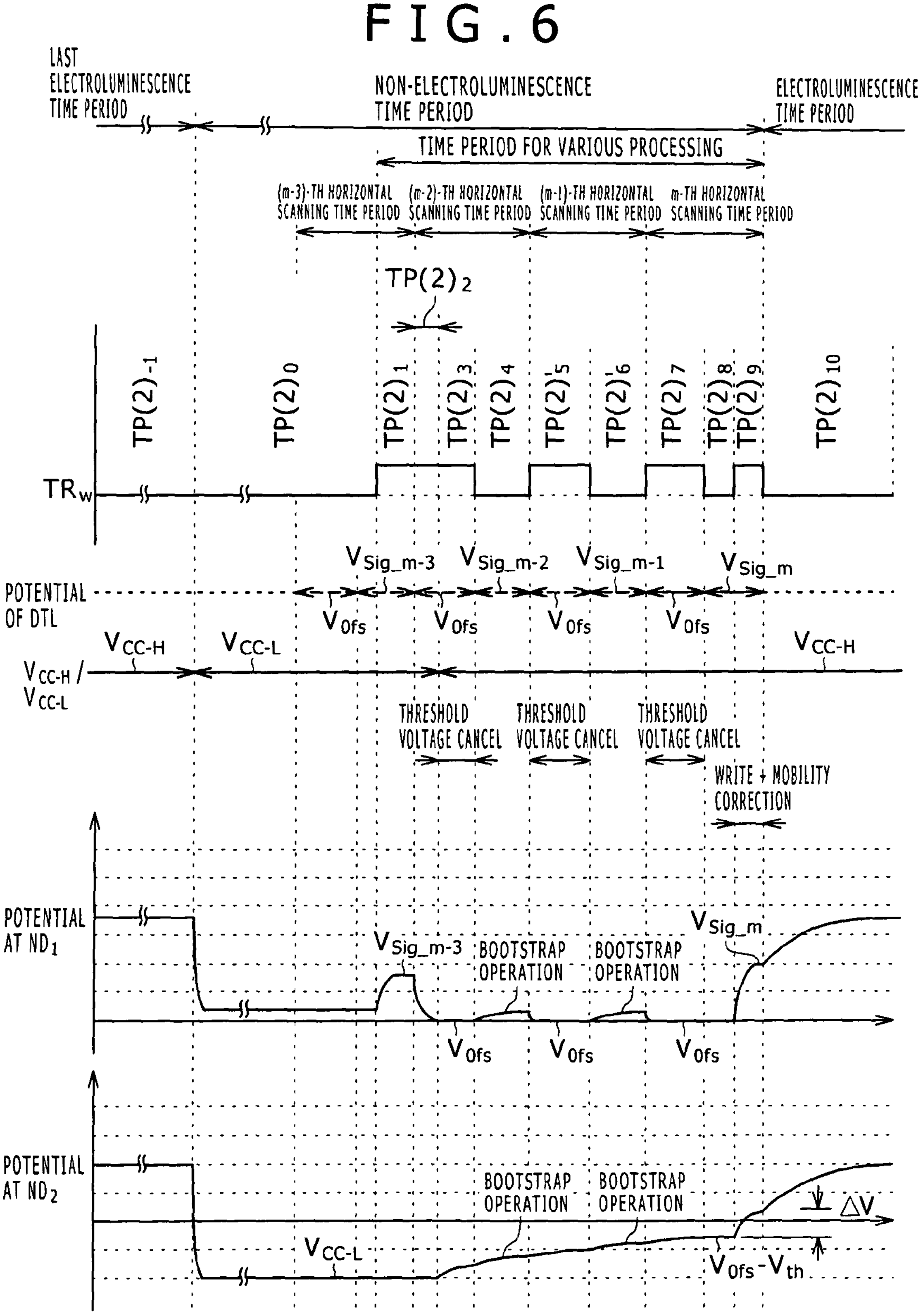
FIG. 6 is a timing chart schematically explaining a drive operation in an organic EL element of a comparative example.
Figure 7A:
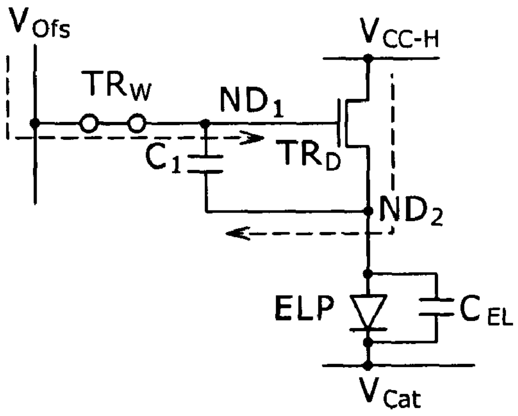
FIGS. 7A and 7B are respectively circuit diagrams schematically showing an ON/OFF state and the like of transistors constituting the drive circuit of the organic EL element of the comparative example.
Figure 7B:
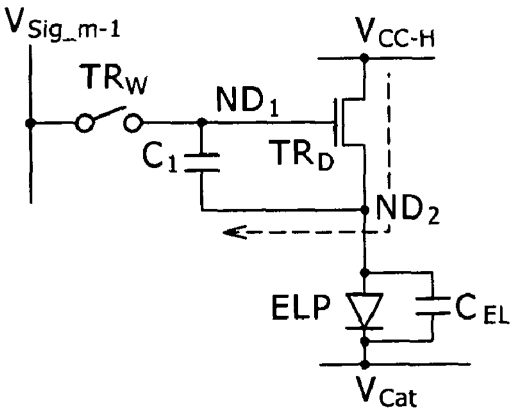

FIG. 1 shows an equivalent circuit diagram of the 2Tr/1C drive circuit, and FIG. 2 shows a conceptual view of the organic EL display device. Also, FIG. 4 schematically shows a timing chart in a drive operation, FIGS. 5A to 5M schematically show an ON/OFF state and the like of the transistors, FIG. 6 shows a timing chart in the drive operation in a comparative example, and FIG. 7A and 7B schematically show ON/OFF states and the like of the each transistors in comparative example.

The 2Tr/1C drive circuit is composed of the two transistors of the write transistor $TR_W$ and the drive transistor $TR_D$, and one capacitor portion $C_1$.

[Drive Transistor $TR_D$]

As described above, one of the source/drain regions of the drive transistor $TR_D$ is connected to the power source portion 100. On the other hand, the other of the source/drain regions of the drive transistor $TR_D$ is connected to:

[1] the anode electrode of the electroluminescence portion ELP; and

[2] one of the pair of electrodes of the capacitor portion $C_1$, thereby forming the second node $ND_2$. On the other hand, the gate electrode of the drive transistor $TR_D$ is connected to:

[1] the other of the source/drain regions of the write transistor $TR_W$, and;

[2] the other of the pair of electrodes of the capacitor portion $C_1$, thereby forming the first node $ND_1$.

[Write Transistor $TR_W$]

As described above, the other of the source/drain regions of the write transistor $TR_W$ is connected to the gate electrode of the drive transistor $TR_D$. On the other hand, one of the source/drain regions of the write transistor $TR_W$ is connected to the corresponding one of the data lines DTL. Also, the video signal (the drive signal, the luminance signal) $V_{Sig}$ used to control the luminance in the electroluminescence portion ELP, and the first node initialization voltage $V_{0fs}$ are supplied from the signal outputting circuit 102 to one of the source/drain regions of the write transistor $TR_W$ through the corresponding one of the data lines DTL. It is noted that the various kinds of signals and voltages (such as the signal used for the precharge drive, and the various kinds of reference voltages) other than the video signal $V_{Sig}$ and the first node initialization voltage $V_{0fs}$ may be supplied to one of the source/drain regions of the write transistor $TR_W$. In addition, the operation for turning ON/OFF the write transistor $TR_W$ is controlled in accordance with the signal from the corresponding one, of the scanning lines SCL, connected to the gate electrode of the write transistor $TR_W$.

In the electroluminescence state of the organic EL element 10, the drive transistor $TR_D$ is driven in accordance with Expression (4) so as to cause the drain current $I_{ds}$ to flow. In the electroluminescence state of the organic EL element 10, one of the source/drain regions of the drive transistor $TR_D$ serves as the drain region, and the other of the source/drain regions thereof serves as the source region. For the sake of convenience of the description, in the following description, one of the source/drain regions of the drive transistor $TR_D$ is simply referred to as the drain region, and the other of the source/drain regions thereof is simply referred to as the source region in some cases:

$$I_{ds}=k\cdot\mu\cdot(V_{gs}-V_{th})^2 \quad (4)$$

Where $\mu$ is an effective mobility, $V_{gs}$ is a difference in potential between the gate electrode and the source region, $V_{th}$ is a threshold voltage, and $k\equiv(1/2)\cdot(W/L)\cdot C_{0x}$ where L is a channel length, W is a channel width, and $C_{0x}$ is expressed by (relative permittivity of gate insulating layer)×(permittivity in vacuum)/(thickness of gate insulating layer).

Causing the drain current $I_{ds}$ to flow through the electroluminescence portion ELP of the organic EL element 10 results in that the electroluminescence portion ELP of the organic EL element 10 emits the light. Moreover, the electroluminescence state (luminance) in the electroluminescence portion ELP of the organic EL element 10 is controlled in accordance with the magnitude of the value of the drain current $I_{ds}$.

[Electroluminescence Portion ELP]

The anode electrode of the electroluminescence portion ELP, as described above, is connected to the source region of the drive transistor $TR_D$. On the other hand, a voltage $V_{Cat}$ is applied to the cathode electrode of the electroluminescence portion ELP. A capacitance of the electroluminescence portion ELP is designated with reference symbol $C_{EL}$. In addition, the threshold voltage requisite for the light emission from the electroluminescence portion ELP is designated with reference symbol $V_{th\text{-}EL}$. When a voltage equal to or larger than the threshold voltage $V_{th\text{-}EL}$ is applied across the anode electrode and cathode electrode of the electroluminescence portion ELP, the electroluminescence portion ELP emits the light.

Although the values of the voltages or potentials are set as follows in the description of each of Embodiments 1 to 3, they are merely values for the description, and the present invention is by no means limited to these values.

$V_{Sing}$: the video signal used to control the luminance in the electroluminescence portion ELP . . . from 0 to 10 V $V_{CC\text{-}H}$: a first voltage as a drive voltage used to cause a current to flow through the electroluminescence portion ELP

. . . 20 V $V_{CC\text{-}L}$: a second voltage as a second node initialization voltage

. . . −10 V $V_{0fs}$: a first node initialization voltage used to initialize the potential (the potential at the first node $ND_1$) at the gate electrode of the drive transistor $TR_D$

. . . 0 V $V_{th}$: the threshold voltage of the drive transistor $TR_D$

. . . 3 V $V_{Cat}$: the voltage applied to the cathode electrode of the electroluminescence portion ELP

. . . 0 V $V_{th\text{-}EL}$: the threshold voltage of the electroluminescence portion ELP

. . . 3 V

Hereinafter, a description will be given with respect to a method of driving the electroluminescence portion ELP by using the 2Tr/1C drive circuit. It is noted that although the description is given on the assumption that as described above, the electroluminescence state starts immediately after completion of the execution of all the various kinds of processing (the threshold voltage canceling processing, the write processing and the mobility correcting processing), the present invention is by no means limited thereto. This also applies to the descriptions of other Embodiments 2 and 3 which will be described later.

Figure 5A:
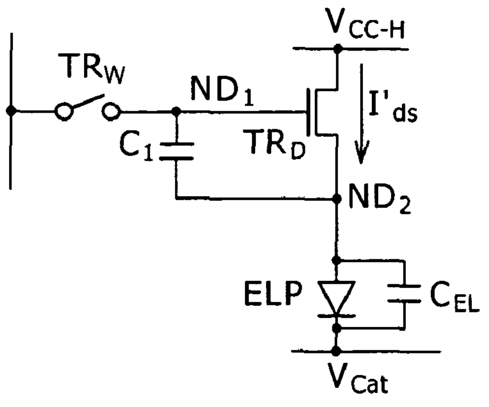
FIGS. 5A to 5M are respectively circuit diagrams schematically showing an ON/OFF state and the like of transistors constituting the drive circuit of the organic EL element in Embodiment 1.

[Time Period-TP(2)$_{-1}$] (Refer to FIG. 4 and FIG. 5A)

[time period-TP(2)$_{-1}$], for example, is an operation time period for which the operation in the last display frame is formed and the (n, m)-th organic EL elements 10 is held in the electroluminescence state after completion of the execution of the last various kinds of processing. That is to say, a drain current $I'_{ds}$ based on Expression (8) which will be described later is caused to flow through the electroluminescence portion ELP in the organic EL element 10 constituting the (n, m)-th sub-pixel. In this case, the luminance of the organic EL element 10 constituting the (n, m)-th sub-pixel has a value corresponding to the drain current $I'_{ds}$ concerned. Here, the write transistor $TR_W$ is held in the OFF state, and the drive transistor $TR_D$ is held in the ON state. The electroluminescence state of the (n, m)-th organic EL elements 10 continues right before start of the horizontal scanning time period for the organic EL element 10 disposed in the (m+m')-th row.

Figure 18:
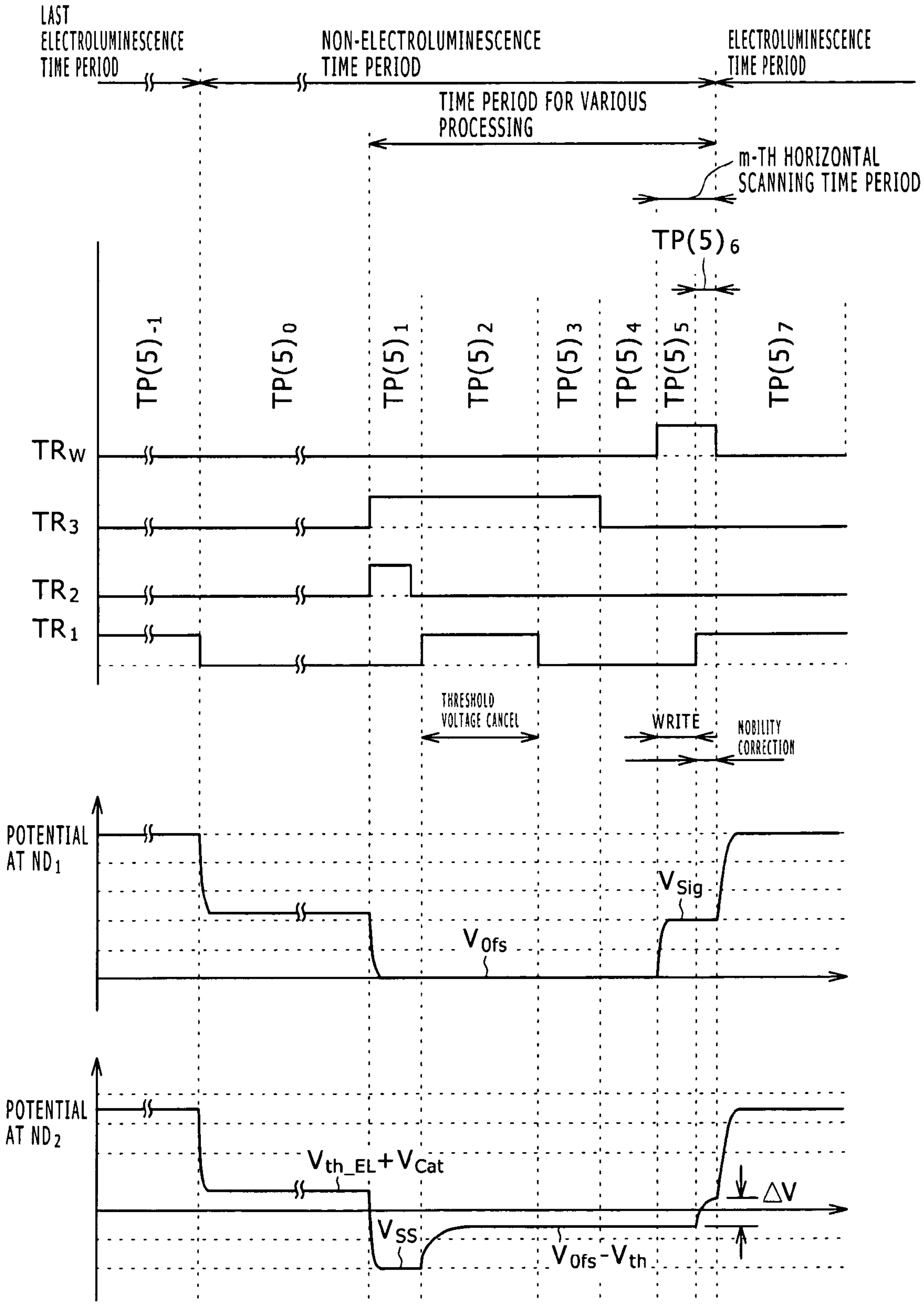
FIG. 18 is a timing chart schematically explaining a drive operation in the organic EL element in the related art.
Figure 19A:
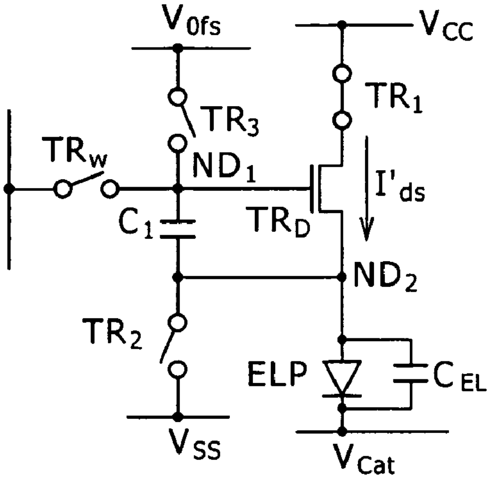
FIGS. 19A to 19I are respectively circuit diagrams schematically showing an ON/OFF state and the like of transistors constituting the drive circuit for the organic EL element in the related art.
Figure 19B:
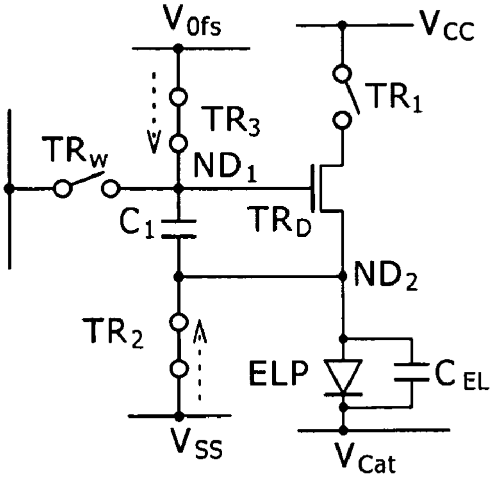
Figure 19C:
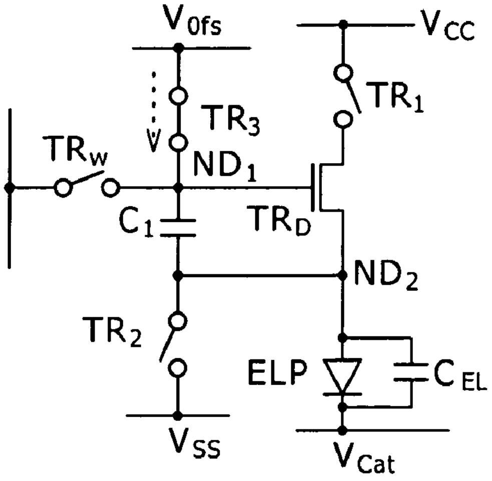
Figure 19D:
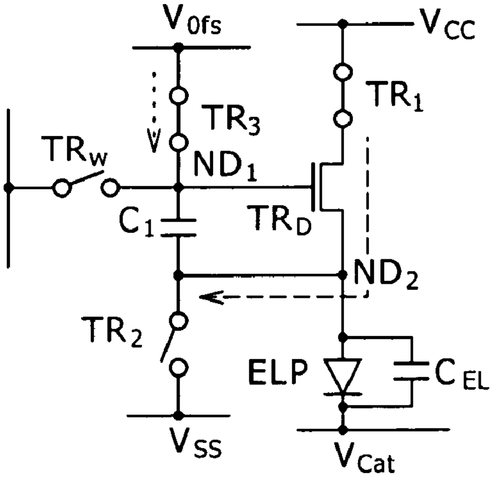
Figure 19E:
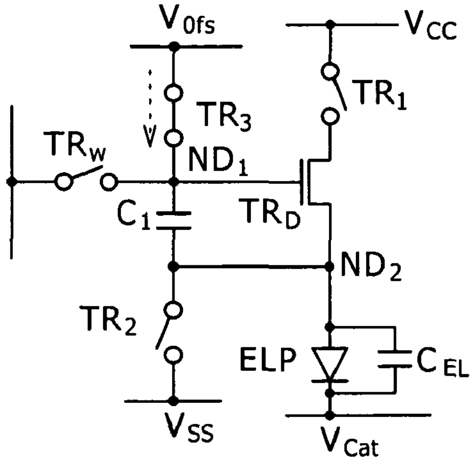
Figure 19F:
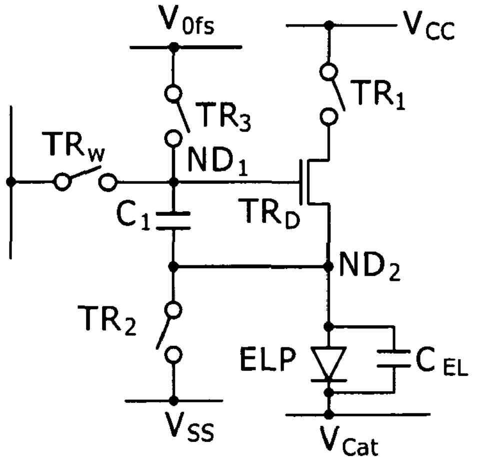
Figure 19G:
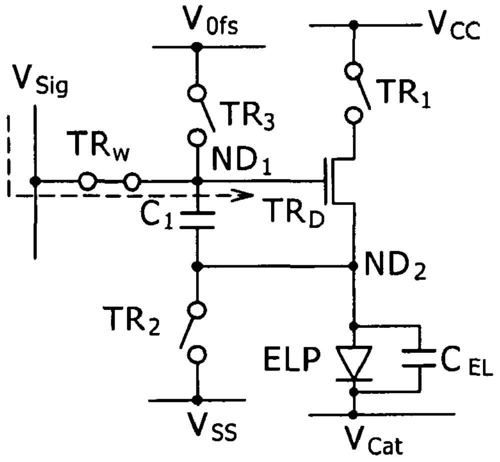
Figure 19H:
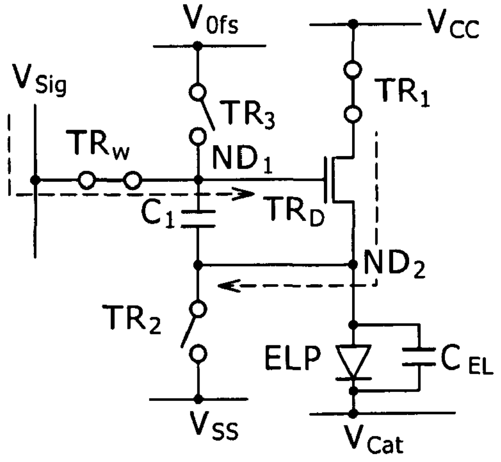
Figure 19I:
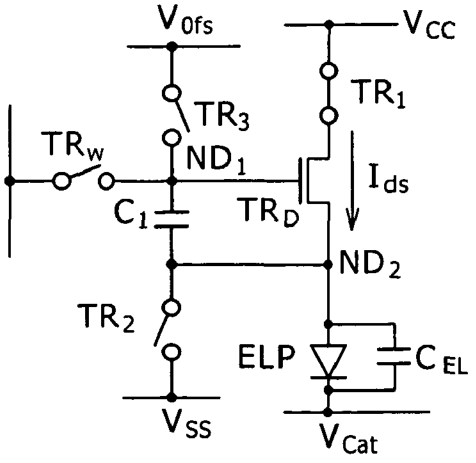

It is noted that the operation performed for [time period-TP(5)$_{-1}$] shown in FIG. 18 and referred thereto in the paragraph of "BACKGROUND OF THE INVENTION" is substantially the same as that performed for [time period-TP (2)$_{-1}$]

A time period from [time period-TP(2)$_0$] to [time period-TP(2)$_8$] shown in FIG. 4 is an operation time period from a time point after end of the electroluminescence state after completion of the execution of the last various kinds of processing to a time point right before the next processing is executed. Also, for the time period from [time period-TP(2)$_0$] to [time period-TP(2)$_8$], the (n, m)-th organic EL element 10 is held in the non-electroluminescence state as a general rule.

In Embodiment 1, steps from the step (a) to the step (c) are executed for a plurality of scanning time periods, specifically, from the (m−2)-th horizontal scanning time period to the m-th horizontal scanning time period.

For the purpose of convenient explanation, it is noted that the description is given on the assumption that a commencement of [time period-TP(2)$_2$] and a termination of [time period-TP(2)$_4$] agree with a commencement and a termination of the (m−2)-th horizontal scanning time period, respectively. Further, the description is given on the assumption that a commencement of [time period-TP(2)$_5$] and a termination of [time period-TP(2)$_6$] agree with a commencement and a termination of the (m−1)-th horizontal scanning time period, respectively. Still further, the description is given on the assumption that a commencement of [time period-TP(2)$_7$] and a termination of [time period-TP(2)$_9$] agree with a commencement and a termination of the m-th horizontal scanning time period, respectively.

Hereinafter, time periods of [time period-TP(2)$_0$] to [time period-TP(2)$_9$] will be described in detail. It is noted that a commencement of [time period-TP(2)$_1$], and lengths of the time periods of [time period-TP(2)$_1$] to [time period-TP(2)$_9$] have to be suitably set depending on the design of the organic EL display device.

Figure 5B:
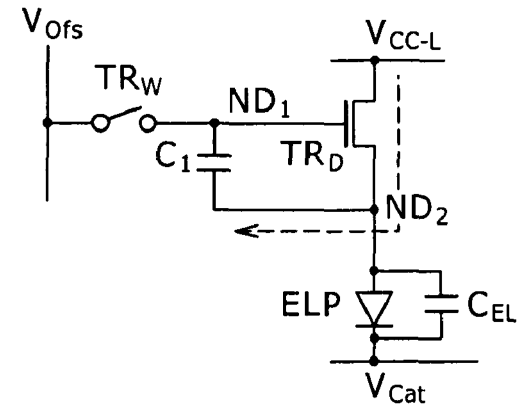
Figure 5C:
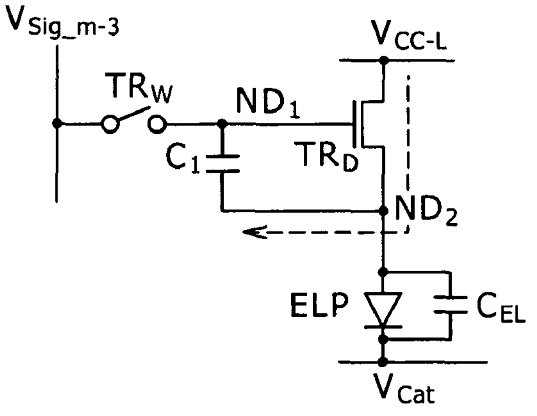

[Time Period-TP(2)$_0$] (Refer to FIG. 4 and FIGS. 5B and 5C)

[time period-TP(2)$_0$], for example, is an operation time period from the last frame to the current display frame. That is to say, [time period-TP(2)$_0$] is a time period from an (m+m')-th horizontal scanning time period in the last display frame to the middle of an (m−3)-th horizontal scanning time period in the current display frame. Also, for [time period-TP (2)$_0$], the (n, m)-th organic EL element 10 is held in the non-electroluminescence state as a general rule. The voltage supplied from the power source portion 100 is switched from the first voltage $V_{CC\text{-}H}$ over to the second voltage $V_{CC\text{-}L}$ at a time point at which the time period proceeds from [time period-TP(2)$_{-1}$] to [time period-TP(2)$_0$]. As a result, the potential at the second node $ND_2$ (the source region of the drive transistor $TR_D$ or the anode electrode of the electroluminescence portion ELP) drops to the second voltage $V_{CC\text{-}L}$, so that the electroluminescence portion ELP is held in the non-electroluminescence state. In addition, the potential at the first node $ND_1$ (the gate electrode of the drive transistor $TR_D$) held in the floating state also drops so as to follow the drop of the potential at the second node $ND_2$.

As will be described later, for each of the horizontal scanning time periods, the signal outputting circuit 102 applies the first node initialization voltage $V_{0fs}$ to the corresponding one of the data lines DTL, and next applies the video signal $V_{Sig}$ thereto instead of applying the first node initialization voltage $V_{0fs}$. More specifically, the first node initialization voltage $V_{0fs}$ is applied to the corresponding one of the data lines DTL in correspondence to the (m−3)-th horizontal scanning time period in the current display frame. Next, the video signal (It is designated with reference symbol $V_{Sig\_m-3}$ for the sake of convenience. This also applies to any of other video signals) corresponding to the (n, m−3)-th sub-pixel is applied to the corresponding one of the data lines DTL instead of applying the first node initialization voltage $V_{0fs}$. Therefore, as shown in FIG. 5B, the first node initialization voltage $V_{0fs}$ is applied to the corresponding one of the data lines DTL for the (m−3)-th horizontal scanning time period within [time period-TP (2)$_0$]. Next, as shown in FIG. 5C, the video signal $V_{Sig\_m-3}$ is applied to the corresponding one of the data lines DTL. Since the write transistor $TR_W$ is held in the OFF state, even when the potential (voltage) of the corresponding one of the data lines DTL, neither of the potential at the first node $ND_1$ and the potential at the second node $ND_2$ changes (although actually, a change in potential due to the electrostatic coupling based on the parasitic capacitance and the like may occur, normally, this change can be disregarded). Although an illustration is omitted in FIG. 4, even for each of the horizontal scanning time periods before the (m−3)-th horizontal scanning time period in the current display frame, the first node initialization voltage $V_{0fs}$ and the video signal $V_{Sig}$ are each applied to the corresponding one of the data lines DTL.

It is noted that [time period-TP(5)$_0$] shown in FIG. 18 and referred thereto in the paragraph of "BACKGROUND OF THE INVENTION" is a time period corresponding to [time period-TP(2)$_0$] described above. In FIG. 18, the first transistor $TR_1$ is turned OFF at a time point at which a time period proceeds from [time period-TP(5)$_{-1}$] to [time period-TP(5)$_0$]. As a result, the potential at the second node $ND_2$ (the source region of the drive transistor $TR_D$ or the anode electrode of the electroluminescence portion ELP) drops to ($V_{th\text{-}EL}$+$V_{Cat}$), so that the electroluminescence portion ELP is held in the non-electroluminescence state. In addition, the potential at the first node $ND_1$ (the gate electrode of the drive transistor $TR_D$) held in the floating state also drops so as to follow the drop of the potential at the second node $ND_2$.

Figure 5D:
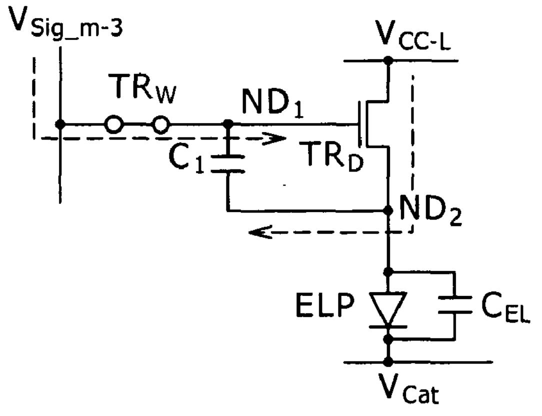
Figure 5E:
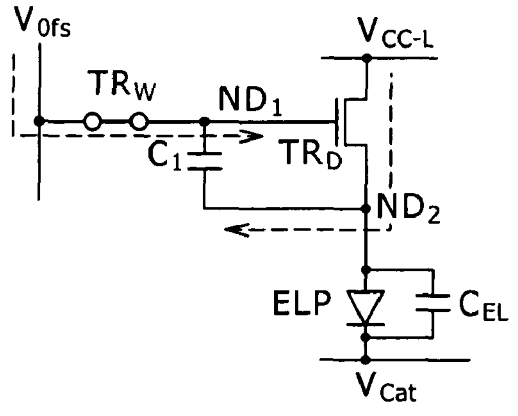

[Time Period-TP(2)$_1$] to [Time Period-TP(2)$_2$] (Refer to FIG. 4 and FIGS. 5D and 5E)

As will be described later, the step (a) described above, that is, the preprocessing described above is executed for [time period-TP(2)$_2$]. The write transistor $TR_W$ is turned ON in accordance with the signal from the corresponding one of the scanning lines SCL prior to the commencement of the scanning time period for which the step (a) is performed (that is, the (m−2)-th horizontal scanning time period). In this state, the step (a) is then performed. More specifically, the write transistor $TR_W$ is turned ON, and in this state, the step (a) is performed for the scanning time period right before the (m−2)-th horizontal scanning time period (that is, the (m−3)-th horizontal scanning time period). Hereinafter, this operation will be described in detail.

[Time Period-TP(2)$_1$] (Refer to FIG. 4 and FIG. 5D)

In and before a termination of the (m−3)-th horizontal scanning time period, the potential of the corresponding one of the scanning lines SCL is set at a high level in accordance with the operation of the scanning circuit 101. As a result, the voltage is applied from the corresponding one of the data lines DTL to the first node $ND_1$ through the write transistor $TR_W$ which is previously turned ON in accordance with the signal from the corresponding one of the scanning lines SCL. In Embodiment 1, the description is given on the assumption that the write signal $V_{Sig}$ is turned ON for the time period for which the video signal $V_{Sig\_m-3}$ is applied to the corresponding one of the data lines DTL.

As a result, the potential at the first node $ND_1$ is set at $V_{Sig\_m-3}$. However, the potential at the second node $ND_2$ is set at $V_{CC\text{-}L}$ (−10 V). Therefore, the difference in potential between the second node $ND_2$ and the cathode electrode provided in the electroluminescence portion ELP is −10 V. This voltage does not exceed the threshold voltage $V_{th-EL}$ of the electroluminescence portion ELP. As a result, the electroluminescence portion ELP emits no light.

The (m−2)-th horizontal scanning time period in the current display frame is started with [time period-TP((2)$_2$] The first node initialization voltage $V_{0fs}$ is applied to the corresponding one of the data lines DTL in accordance with the operation of the signal outputting circuit 102 for a time period from a commencement of [time period-TP(2)$_2$] to a termination of [time period-TP(2)$_3$] which will be described later.

[Time Period-TP(2)$_2$] (Refer to FIG. 4 and FIG. 5E)

As described above, the step (a) described above, that is, the preprocessing described above is executed for [time period-TP(2)$_2$]. The voltage applied to the corresponding one of the data lines DTL is switched from $V_{Sig\_m-3}$ over to the first node initialization voltage $V_{0fs}$ in the commencement of [time period-TP(2)$_2$] in a state in which application of the second voltage $V_{CC-L}$ from the power source portion 100 to one of the source/drain regions is maintained, and the ON state of the write transistor $TR_W$ is maintained in accordance with the signal from the corresponding one of the scanning lines SCL. The write transistor $TR_W$ is turned ON prior to a change in voltage of the corresponding one of the data lines DTL. Thus, the potential at the first node $ND_1$ is initialized as soon as the first node initialization voltage $V_{0fs}$ is applied to the corresponding one of the data lines DTL. As a result, the potential at the first node $ND_1$ is set at $V_{0fs}$ (0 V). On the other hand, the potential at the second node $ND_2$ is set at $V_{CC-L}$ (−10 V). The drive transistor $TR_D$ is held in the ON state because the difference in potential between the first node $ND_1$ and the second node $ND_2$ is 10 V, and the threshold voltage $V_{th}$ of the drive transistor $TR_D$ is 3 V. It is noted that the difference in potential between the second node $ND_2$ and the cathode electrode provided in the electroluminescence portion ELP is −10 V and thus does not exceed the threshold voltage $V_{th-EL}$ of the electroluminescence portion ELP. As a result, the preprocessing for initializing each of the potential at the first node $ND_1$ and the potential at the second node $ND_2$ is completed.

Figure 5F:
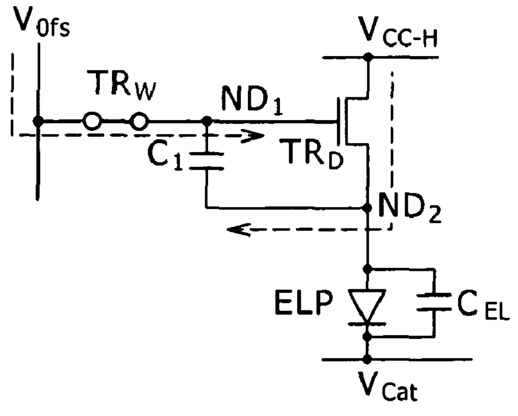

[Time Period-TP(2)$_3$] (Refer to FIG. 4 and FIG. 5F)

The step (b) described above, that is, the threshold voltage canceling processing described above is executed for [time period-TP(2)$_3$]. That is to say, the voltage supplied from the power source portion 100 is switched from the second voltage $V_{CC-L}$ over to the first voltage $V_{CC-H}$ in a state in which the first node initialization voltage $V_{0fs}$ is applied from the corresponding one of the data lines DTL to the first node $ND_1$ through the write transistor $TR_W$ held in the ON state in accordance with the signal from the corresponding one of the scanning lines SCL. As a result, the first voltage $V_{CC-H}$ is applied as a higher voltage than that obtained by subtracting the threshold voltage $V_{th}$ of the drive transistor $TR_D$ from the potential $V_{0fs}$ at the first node $ND_1$ from the power source portion 100 to one of the source/drain regions of the drive transistor $TR_D$ in a state in which the potential at the first node $ND_1$ is held. As a result, although no potential at the first node $ND_1$ changes ($V_{0fs}$=0 V is maintained), the potential at the second node $ND_2$ changes toward a potential obtained by subtracting the threshold voltage $V_{th}$ of the drive transistor $TR_D$ from the potential at the first node $ND_1$. That is to say, the potential at the second node $ND_2$ held in the floating state rises.

If [time period-TP(2)$_3$] is sufficiently long, the difference in potential between the gate electrode and the other of the source/drain regions of the drive transistor $TR_D$ reaches the threshold voltage $V_{th}$ of the drive transistor $TR_D$, so that the drive transistor $TR_D$ is turned OFF. That is to say, the potential at the second node $ND_2$ held in the floating state approaches ($V_{0fs}-V_{th}$=−3 V), and finally becomes ($V_{0fs}-V_{th}$). However, the length of [time period-TP(2)$_3$] in Embodiment 1 is not enough to sufficiently change the potential at the second node $ND_2$. Thus, in the termination of [time period-TP(2)$_3$], the potential at the second node $ND_2$ reaches a certain potential $V_A$ fulfilling a relationship of $V_{CC-L}<V_A<(V_{0fs}-V_{th})$.

Figure 5G:
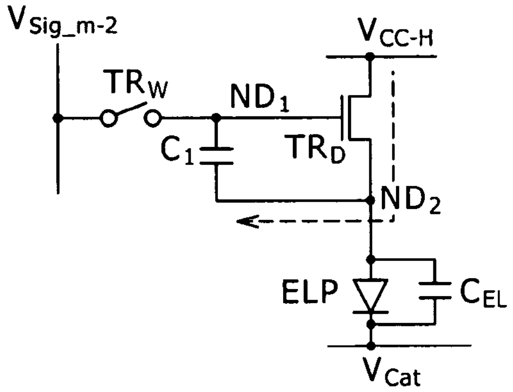

[Time Period-TP(2)$_4$] (Refer to FIG. 4 and FIG. 5G)

In a commencement of [time period-TP(2)$_4$], the voltage on the corresponding one of the data lines DTLs is switched from the first node initialization voltage $V_{0fs}$ over to the voltage of the video signal $V_{Sig\_m-2}$. In order to avoid application of the video signal $V_{Sig\_m-2}$ to the first node $ND_1$, in the commencement of [time period-TP(2)$_4$], the write transistor $TR_W$ is turned OFF in accordance with the signal transmitted through the corresponding one of the scanning lines SCLs. As a result, the gate electrode (that is, the first node $ND_1$) of the drive transistor $TR_D$ becomes the floating state.

The potential at the second node $ND_2$ rises from the potential $V_A$ to a certain potential $V_B$ because the first voltage $V_{CC-H}$ is applied from the power source portion 100 to one of the source/drain regions of the drive transistor $TR_D$. On the other hand, the bootstrap operation occurs in the gate electrode of the drive transistor $TR_D$ because the gate electrode of the drive transistor $TR_D$ is held in the floating state, and thus the capacitor portion $C_1$ exists. Therefore, the potential at the first node $ND_1$ rises so as to follow a change in potential at the second node $ND_2$.

It is noted that as shown in FIG. 4, the potential at the second node $ND_1$ reaches a certain potential $V_D$ in a termination of [time period-TP(2)$_6$] in accordance with the bootstrap operation carried out for [time period-TP(2)$_5$] and [time period-TP(2)$_6$] which will be described later. Basically, the potential at the second node $ND_2$ rises as a time period for which the bootstrap operation is carried out is longer. However, it is required as the premise of the operation carried out for [time period-TP(2)$_7$] which will be described later that in a termination of [time period-TP(2)$_6$], the potential at the second node $ND_2$ is lower than ($V_{0fs}-V_{th}$). A length of a time period from the commencement of [time period-TP(2)$_4$] to the termination of [time period-TP(2)$_6$] has to be previously determined as a design value during the design of the organic EL display device so as to fulfill the condition of $V_D<V_{0fs}-V_{th}$.

The bootstrap operation for [time period-TP(2)$_4$], the bootstrap operation for [time period-TP(2)$_5$] and [time period-TP (2)$_6$], and the bootstrap operation for [time period-TP(2)$_{10}$] which will be described later are basically identical to one another. Therefore, the temporal changes in potentials at the first node $ND_1$ and the like for these time periods become basically identical to one another. However, for the sake of convenience of the illustration, FIG. 4 shows the drive operation in the organic EL element without taking the coherency between the temporal changes in potentials at the first node $ND_1$ and the like for the time period from [time period-TP (2)$_4$] to [time period-TP(2)$_6$], and the temporal changes in potentials at the first node $ND_1$ and the like for [time period-TP(2)$_{10}$] into consideration. This also applies to the cases of FIGS. 8, 12 and 18 which will be described later.

Figure 5H:
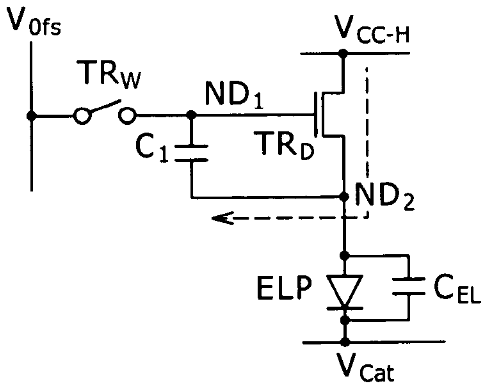
Figure 5I:
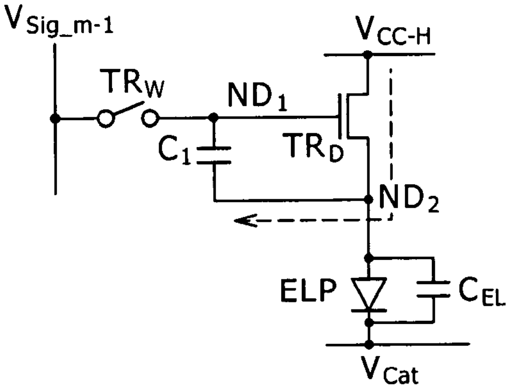

[Time Period-TP(2)$_5$] and [Time Period-TP(2)$_6$] (Refer to FIG. 4, and FIGS. 5H and 5I)

As will be described later, for these time periods, the higher voltage than the voltage obtained by subtracting the threshold voltage $V_{th}$ of the drive transistor $TR_D$ from the first node initialization voltage $V_{0fs}$ applied to the first node $ND_1$ in the step (b) is applied from the power source portion 100 to one of the source/drain regions of the drive transistor $TR_D$. In this state, the write transistor $TR_W$ is held in the OFF state for one horizontal scanning time period to cause the potential at the second node $ND_2$ to rise, thereby causing the potential at the first node $ND_1$ held in the floating state to rise. In such a manner, the auxiliary bootstrap processing is executed. Hereinafter, the auxiliary bootstrap processing will be described in detail.

[Time Period-TP(2)$_5$] (Refer to FIG. 4 and FIG. 5H)

The voltage on the corresponding one of the scanning lines SCLs is held at the low level in accordance with the operation of the scanning circuit 101, thereby maintaining the OFF state of the write transistor $TR_W$. Although in a commencement of [time period-TP(2)$_5$], the voltage on the corresponding one of the data lines DTLs is switched from the voltage of the video signal $V_{Sig\_m-2}$ over to the first node initialization voltage $V_{0fs}$, the gate electrode (that is, the first node $ND_1$ of the drive transistor $TR_D$ is held in the floating state because the write transistor $TR_W$ is held in the OFF state. The first voltage $V_{CC-H}$ is applied from the power source portion 100 to one of the source/drain regions of the drive transistor $TR_D$. Therefore, the bootstrap operation continues to occur in the gate electrode of the drive transistor $TR_D$ so as to follow the bootstrap operation carried out for [time period-TP(2)$_4$]. As a result, the potential at the second node $ND_2$ rises from the potential $V_B$ to a certain potential $V_C$, and the potential at the first node $ND_1$ held in the floating state also rises.

[Time Period-TP(2)$_6$] (Refer to FIG. 4 and FIG. 5I)

The voltage on the corresponding one of the scanning lines SCLs is held at the low level in accordance with the operation of the scanning circuit 101, thereby maintaining the OFF state of the write transistor $TR_W$. Although in a commencement of [time period-TP(2)$_6$], the voltage on the corresponding one of the data lines DTLs is switched from the first node initialization voltage $V_{0fs}$ over to the voltage of the video signal $V_{Sig\_m-1}$, the gate electrode (that is, the first node $ND_1$) of the drive transistor $TR_D$ is held in the floating state because the write transistor $TR_W$ is held in the OFF state. The first voltage $V_{CC-H}$ is applied from the power source portion 100 to one of the source/drain regions of the drive transistor $TR_D$. Therefore, the bootstrap operation continues to occur in the gate electrode of the drive transistor $TR_D$ so as to follow the bootstrap operation carried out for [time period-TP(2)$_6$]. As a result, the potential at the second node $ND_2$ rises from the potential $V_C$ to a certain potential $V_D$, and the potential at the first node $ND_1$ held in the floating state also rises.

As has been described so far, the write transistor $TR_W$ is held in the OFF state for [time period-TP(2)$_5$] and [time period-TP(2)$_6$] constituting the (m−1)-th horizontal scanning time period. Also, the bootstrap operation continues to occur in the drive transistor $TR_D$ for the (m−1)-th horizontal scanning time period, thereby executing the auxiliary bootstrap processing.

Figure 5J:
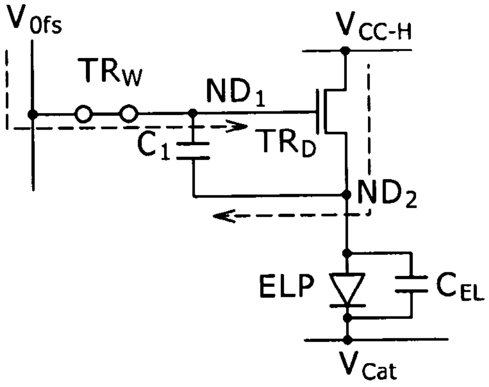

[Time Period-TP(2)$_7$] (Refer to FIG. 4 and FIG. 5J)

The above step (b), that is, the threshold voltage canceling processing described above is executed for [time period-TP (2)$_7$] as well. The threshold voltage canceling processing executed for [time period-TP(2)$_7$] corresponds to the threshold voltage canceling processing intended to be executed right before execution of the write processing.

The operation carried out for [time period-TP(2)$_7$] is basically the same as that described for [time period-TP(2)$_3$]. In a commencement of [time period-TP(2)$_7$], the voltage on the corresponding one of the data lines DTLs is switched from the voltage of the video signal $V_{Sig\_m-1}$ over to the first node initialization voltage $V_{0fs}$. Also, in the commencement of [time period-TP(2)$_7$], the write transistor $TR_W$ is turned ON in accordance with the signal transmitted through the corresponding one of the scanning lines SCLs.

This results in that the first node initialization voltage $V_{0fs}$ is applied from the corresponding one of the data lines DTLs to the first node $ND_1$ through the write transistor $TR_W$ held in the ON state. In addition, the first voltage $V_{CC-H}$ is applied from the power source portion 100 to one of the source/drain regions of the drive transistor $TR_D$. Therefore, the potential at the second node $ND_2$ changes toward the potential obtained by subtracting the threshold voltage $V_{th}$ of the drive transistor $TR_D$ from the potential at the first node $ND_1$ so as to follow the potential risen in accordance with the bootstrap operation carried out for [time period-TP(2)$_6$] similarly to the case described for [time period-TP(2)$_3$]. Also, when the difference in potential between the gate electrode of the drive transistor $TR_D$, and the other of the source/drain regions thereof reaches the threshold voltage $V_{th}$ of the drive transistor $TR_D$, the drive transistor $TR_D$ is turned OFF. Specifically, the potential at the second node $ND_2$ held in the floating state approaches ($V_{0fs}-V_{th}=-3$ V), and finally becomes ($V_{0fs}-V_{th}$). Here, as long as Expression (5) is guaranteed, in other words, as long as the potentials are selected and determined so as to fulfill Expression (5), the electroluminescence portion ELP emits no light.

$$(V_{0fs}-V_{th})<(V_{th\text{-}EL}+V_{Cat}) \tag{5}$$

The potential at the second node $ND_2$ finally becomes ($V_{0fs}-V_{th}$) for [time period-TP(2)$_7$]. That is to say, the potential at the second node $ND_2$ is determined depending on only the threshold voltage $V_{th}$ of the drive transistor $TR_D$, and the first node initialization voltage $V_{0fs}$ used to initialize the potential at the gate electrode of the drive transistor $TR_D$. Also, the potential at the second node $ND_2$ has no relation to the threshold voltage $V_{th\text{-}EL}$ of the electroluminescence portion ELP.

The step up to the threshold voltage canceling processing intended to be executed right before execution of the write processing has been described so far. Here, an operation in Comparative Example 1 shown in FIG. 6 is described in contrast with the operation in Embodiment 1 described above. Comparative Example 1 is different from Embodiment 1 in that the threshold voltage canceling processing is executed for the (m−1)-th horizontal scanning time period as well. Specifically, the operation in Comparative Example 1 is the same as that in Embodiment 1 except for the operation carried out for a time period from [time period-TP(2)'$_5$] to [time period-TP(2)'$_6$] shown in FIG. 6. The time period from [time period-TP(2)'$_5$] to [time period-TP(2)'$_6$] shown in FIG. 6 corresponds to the time period from [time period-TP(2)'$_5$] to [time period-TP(2)'$_6$] shown in FIG. 4, respectively.

In Comparative Example 1, in a commencement of [time period-TP(2)'$_5$], the voltage on the corresponding one of the scanning lines SCLs is switched from the low level over to the high level in accordance with the operation of the scanning circuit 101. Also, the operation state of the write transistor $TR_W$ is switched from the OFF state over to the ON state (refer to FIG. 6 and FIG. 7A). That is to say, the first node initialization voltage $V_{0fs}$ is applied from the corresponding one of the data lines DTLs to the first node $ND_1$ through the write transistor $TR_W$ held in the ON state in accordance with the signal transmitted through the corresponding one of the scanning lines SCLs. In this state, the potential at the first node $ND_1$ risen in accordance with the bootstrap operation for [time period-TP(2)$_4$] drops to the first node initialization voltage $V_{0fs}$ (=0 V).

The write transistor $TR_W$ is held in the ON state for [time period-TP(2)'$_5$]1. In addition, the voltage which is applied from the power source portion 100 is the first voltage $V_{CC-H}$.

Therefore, the first voltage $V_{CC-H}$ is applied as the higher voltage than the voltage obtained by subtracting the threshold voltage $V_{th}$ of the drive transistor $TR_D$ from the potential $V_{0fs}$ at the first node $ND_1$ from the power source portion 100 to one of the source/drain regions of the drive transistor $TR_D$ while the potential at the first node $ND_1$ is held similarly to the case previously described for [time period-TP(2)$_3$]. As a result, although no potential at the first node $ND_1$ changes ($V_{0fs}$=0V is maintained), the potential at the second node $ND_2$ changes from the potential at the first node $ND_1$ toward the potential obtained by subjecting the threshold voltage $V_{th}$ of the drive transistor $TR_D$ from the potential at the first node $ND_1$. That is to say, the potential at the second node $ND_2$ held in the floating gate rises.

In a commencement of [time period-TP(2)'$_6$], the voltage on the corresponding one of the scanning lines SCLs is switched from the high level over to the low level in accordance with the operation of the scanning circuit 101. Also, the operation state of the write transistor $TR_W$ is switched from the ON state over to the OFF state (refer to FIG. 6 and FIG. 7B). The gate electrode (that is, the first node $ND_1$) of the drive transistor $TR_D$ becomes the floating state because the write transistor $TR_W$ is held in the OFF state. The first voltage $V_{CC-H}$ is applied from the power source portion 100 to one of the source/drain regions of the drive transistor $TR_D$. As a result, the bootstrap operation occurs in the gate electrode of the drive transistor $TR_D$ to cause the potential at the second node $ND_2$ to rise, thereby causing the potential at the first node $ND_1$ held in the floating state to rise from the first node initialization voltage $V_{0fs}$.

In the operation as well in Comparative Example 1 described above, the operation carried out for a time period in and after [time period-TP(2)$_7$] is not especially impeded. However, it is necessary to perform the switching of the ON state/the OFF state of the write transistor $TR_W$ for the (m−1)-th horizontal scanning time period. As a result, the electric power consumed in the scanning circuit and the like increases as compared with the operation in Embodiment 1 described above.

Figure 5K:
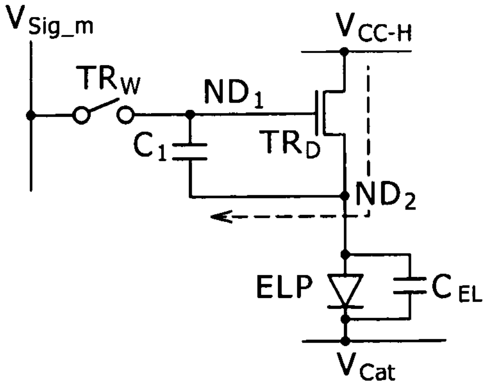

[Time Period-TP(2)$_8$] (Refer to FIG. 4 and FIG. 5K)

Subsequently, Embodiment 1 will now be described. In a commencement of [time period-TP(2)$_8$], the write transistor $TR_W$ is turned OFF in accordance with the signal transmitted through the corresponding one of the scanning lines SCLs. In addition, the voltage applied to the corresponding one of the data lines DTLs is switched from the first node initialization voltage $V_{0fs}$ over to the voltage of the video signal $V_{Sig\_m}$. If the drive transistor $TR_D$ reaches the OFF state in the threshold voltage canceling processing, neither of the potential at the first node $ND_1$ and the potential at the second node $ND_2$ substantially changes. In the case where the drive transistor $TR_D$ does not reach the OFF state in the threshold voltage canceling processing, the bootstrap operation occurs for [time period-TP(2)$_8$] as well, and each of the potential at the first node $ND_1$ and the potential at the second node $ND_2$ slightly rises. The drive operation in the organic EL element is explained in FIG. 4 on the assumption that no bootstrap operation occurs.

Figure 5L:
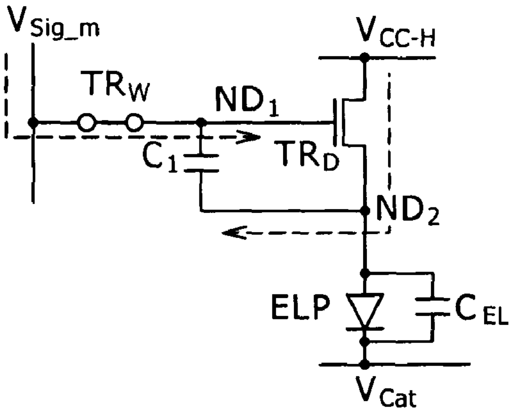

[Time Period-TP(2)$_9$] (Refer to FIG. 4 and FIG. 5L)

For this time period, the step (c) described above, that is, the write processing described above is executed. After the voltage applied to the corresponding one of the data lines DTL is switched from the first node initialization voltage $V_{0fs}$ over to the voltage of the video signal $V_{sig\_m}$, the write transistor $TR_W$ is turned ON in accordance with the signal from the corresponding one of the scanning lines SCL. Also, the video signal $V_{sig\_m}$ is applied from the corresponding one of the data lines DTL to the first node $ND_1$ through the write transistor $TR_W$. As a result, the potential at the first node $ND_1$ rises to $V_{sig\_m}$. The drive transistor $TR_D$ is held in the ON state. It is noted that the write transistor $TR_W$ can be held in the ON state for [time period-TP(2)$_8$] as the case may be. With this constitution, the write processing starts to be executed as soon as the voltage applied to the corresponding one of the data lines DTL is switched from the first node initialization voltage $V_{0fs}$ over to the voltage of the video signal $V_{sig\_m}$ for [time period-TP(2)$_8$].

Here, the capacitor portion $C_1$ has a capacitance value $c_1$, and the capacitance $C_{EL}$ of the electroluminescence portion ELP has a capacitance value $c_{EL}$. Also, the parasitic capacitance between the gate electrode and the other of the source/drain regions of the drive transistor $TR_D$ is designated with reference symbol $c_{gs}$. When the potential at the gate electrode of the drive transistor $TR_D$ changes from the first node initialization voltage $V_{0fs}$ to the voltage of the video signal $V_{sig\_m}$ ($>V_{0fs}$), the potentials at the opposite terminals of the capacitor portion $C_1$ (the potential at the first node $ND_1$, and the potential at the second node $ND_2$) changes as a general rule. That is to say, the electric charges based on a change ($V_{sig\_m}-V_{0fs}$) in potential at the gate electrode of the drive transistor $TR_D$ (=the potential at the first node $ND_1$) are distributed to the capacitor portion $C_1$, the capacitance $C_{EL}$ of the electroluminescence portion ELP, and the parasitic capacitance between the gate electrode and the other of the source/drain regions of the drive transistor $TR_D$. However, when the value $C_{EL}$ is sufficiently larger than each of the value $c_1$ and the value $c_{gs}$, a change in potential at the other (the second node $ND_2$) of the source/drain regions of the drive transistor $TR_D$ based on the change ($V_{sig\_m}-V_{0fs}$) in potential at the gate electrode of the drive transistor $TR_D$ is small. Also, in general, the capacitance value $c_{EL}$ of the capacitance $C_{EL}$ of the electroluminescence ELP is larger than each of the capacitance value $c_1$ of the capacitor portion $C_1$, and the capacitance value $c_{gs}$ of the parasitic capacitance of the drive transistor $TR_D$. Accordingly, in the description explained above, the description is given without taking the change in potential at the second node $ND_2$ caused by the change in potential at the first node $ND_1$ into consideration. Also, the description is given without taking the change in potential at the second node $ND_2$ caused by the change in potential at the first node $ND_1$ into consideration except for the case where there is a particular necessity. This also applied to any of other Embodiments 2 and 3. It is noted that a timing chart in a drive operation is shown without taking the change in potential at the second node $ND_2$ caused by the change in potential at the first node $ND_1$ into consideration except for FIG. 14 which will be described later.

With the driving method in Embodiment 1, the video signal $V_{Sig\_m}$ is applied to the gate electrode of the drive transistor $TR_D$ in the state in which the first voltage $V_{CC-H}$ is applied from the power source portion 100 to one of the source/drain regions of the drive transistor $TR_D$. For this reason, as shown in FIG. 4, the potential at the second node $ND_2$ rises for [time period-TP(2)$_9$]. An amount (ΔV shown in FIG. 4) of potential risen will be described later. When the potential at the gate electrode (the first node $ND_1$) of the drive transistor $TR_D$ is $V_g$, and the potential at the other (the second node $ND_2$) of the source/drain regions of the drive transistor $TR_D$ is $V_s$, if the above rise in potential at the second node $ND_2$ is taken into no consideration, a value of $V_g$, and a value of $V_s$ are expressed as follows. The difference in potential between the first node $ND_1$ and the second node $ND_2$, that is, the difference $V_{gs}$ in potential between the gate electrode and the other of the source/drain regions of the drive transistor $TR_D$ can be expressed by Expression (6):

$$V_g=V_{Sig\_m}V_s\approx V_{0fs}-V_{th}V_{gs}\approx V_{Sig\_m}-(V_{0fs}-V_{th}) \quad (6)$$

The potential difference $V_{gs}$ obtained in the write processing executed for the drive transistor $TR_D$ depends on only the video signal $V_{Sig\_m}$ used to control the luminance in the electroluminescence portion ELP, the threshold voltage $V_{th}$ of the driver transistor $TR_D$ and the first node initialization voltage $V_{0fs}$ used to initialize the potential at the gate electrode of the drive transistor $TR_D$. In addition, the potential difference $V_{gs}$ has no relation to the threshold voltage $V_{th\text{-}EL}$ of the electroluminescence portion ELP.

Next, a description will be given with respect to a rise in potential at the second node $ND_2$ for [time period-TP(2)$_9$] described above. With the driving method in Embodiment 1, the write processing is executed together with the mobility correcting processing for causing the potential at the other of the source/drain regions (that is, the potential at the second node $ND_2$) to rise in correspondence to the characteristics of the drive transistor $TR_D$ (for example, the magnitude of the mobility μ, and the like).

When the drive transistor $TR_D$ is manufactured in the form of a polysilicon thin film transistor or the like, it is difficult to avoid occurrence of the dispersion of the mobilities μ among the polysilicon thin film transistors. Therefore, even when the video signals $V_{Sig}$ having the same value are applied to the gate electrodes of a plurality of drive transistors $TR_D$ having different mobilities μ, a difference occurs between the drain current $I_{ds}$ caused to flow through the drive transistor $TR_D$ having the large mobility μ, and the drain current $I_{ds}$ caused to flow through the drive transistor $TR_D$ having the small mobility μ. Also, the occurrence of such a difference impairs the uniformity of a picture of the organic EL display device.

As has been described above, with the driving method in Embodiment 1, the video signal $V_{Sig\_m}$ is applied to the gate electrode of the drive transistor $TR_D$ in the state in which the first voltage $V_{CC\text{-}H}$ is applied from the power source portion 100 to one of the source/drain regions of the drive transistor $TR_D$. For this reason, as shown in FIG. 4, the potential at the second node $ND_2$ rises for [time period-TP(2)$_9$]. When the drive transistor $TR_D$ has the large mobility μ, the amount, ΔV (potential correction value), of potential risen at the other of the source/drain regions of the drive transistor $TR_D$ (that is, the potential at the second node $ND_2$) increases. Conversely, when the drive transistor $TR_D$ has the small mobility μ, the amount, ΔV (potential correction value), of potential risen at the other of the source/drain regions of the drive transistor $TR_D$ (that is, the potential at the second node $ND_2$) decreases. Here, the difference $V_{gs}$ in potential between the gate electrode of the drive transistor $TR_D$, and the other of the source/drain regions thereof serving as the source region is transformed from Expression (6) into Expression (7):

$$V_{gs} \approx V_{Sig\_m} - (V_{0fs} - V_{th}) - \Delta V \tag{7}$$

It is noted that a predetermined time requisite to execute the write processing (a total time to of [time period-TP(2)$_9$] has to be previously determined as a design value during the design of the organic EL display device. In addition, the total time $t_0$ of [time period-TP(2)$_9$] is determined so that the potential ($V_{0fs} - V_{th} + \Delta V$) at the other of the source/drain regions of the drive transistor $TR_D$ at this time meets Expression (8). As a result, the electroluminescence portion ELP emits no light for [time period-TP(2)$_9$]. Moreover, the dispersion of the coefficient k ($\equiv (1/2) \cdot (W/L) \cdot C_{0x}$) is simultaneously corrected by executing the mobility correcting processing.

$$(V_{0fs} - V_{th} + \Delta V) < (V_{th\text{-}EL} + V_{Cat}) \tag{8}$$

Figure 5M:
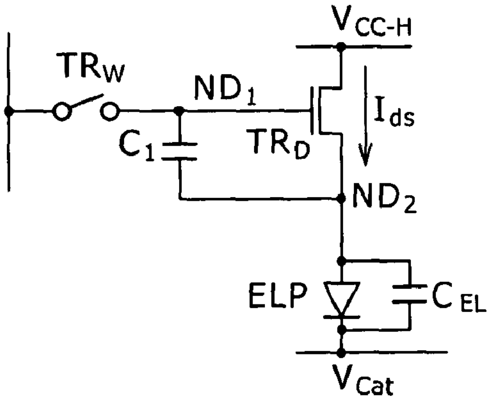

[Time Period-TP(2)$_{10}$] (Refer to FIG. 4 and FIG. 5M)

By performing the above operations, the execution of the threshold voltage canceling processing, the write processing, and the mobility correcting processing is completed. After that, the step (d) described above is performed as follows for this time period. That is to say, in a state in which the application of the first voltage $V_{CC\text{-}H}$ from the power source portion 100 to one of the source/drain regions of the drive transistor $TR_D$ is maintained, the potential of the corresponding one of the scanning lines SCL is set at the low level in accordance with the operation of the scanning circuit 101 to turn OFF the write transistor $TR_W$. As a result, the first node $ND_1$, that is, the gate electrode of the drive transistor $TR_D$ is held in the floating state. Therefore, as the result of the foregoing, the potential at the second node $ND_2$ rises.

Here, as described above, the gate electrode of the drive transistor $TR_D$ is held in the floating state, and in addition thereto, the capacitor portion $C_1$ exists in the drive circuit 11. As a result, the same phenomenon as that in a so-called bootstrap circuit occurs in the gate electrode of the drive transistor $TR_D$, and the potential at the first node $ND_1$ also rises. As a result, the difference $V_{gs}$ in potential between the gate electrode of the drive transistor $TR_D$, and the other of the source/drain regions serving as the source region thereof holds the value given based on Expression (7).

In addition, the electroluminescence portion ELP starts to emit the light because the potential at the second node $ND_2$ rises to exceed ($V_{th\text{-}EL} + V_{Cat}$). At this time, the current caused to flow through the electroluminescence portion ELP can be expressed by Expression (4) because it is the drain current $I_{ds}$ caused to flow from the drain region to the source region of the drive transistor $TR_D$. Here, Expression (4) can be transformed into Expression (9) based on Expression (4) and Expression (7):

$$I_{ds} = k \cdot \mu \cdot (V_{Sig\_m} - V_{0fs} - \Delta V)^2 \tag{9}$$

Therefore, when the first node initialization voltage $V_{0fs}$, for example, is set at 0 V, the current $I_{ds}$ caused to flow through the electroluminescence portion ELP is proportional to a square of a value obtained by subtracting the potential correction value ΔV in the second node $ND_2$ (the other of the source/drain regions of the drive transistor $TR_D$) due to the mobility μ of the drive transistor $TR_D$ from the value of the video signal $V_{Sig\_m}$ used to control the luminance in the electroluminescence portion ELP. In other words, the current $I_{ds}$ caused to flow through the electroluminescence portion ELP is independent of the threshold voltage $V_{th\text{-}EL}$ of the electroluminescence portion ELP, and the threshold voltage $V_{th}$ of the drive transistor $TR_D$. That is to say, an amount of luminescence of the electroluminescence portion ELP is free from the influence of the threshold voltage $V_{th\text{-}EL}$ of the electroluminescence portion ELP, and the influence of the threshold voltage $V_{th}$ of the drive transistor $TR_D$. Also, a luminance of the (n, m)-th organic EL element 10 has a value corresponding to the current $I_{ds}$ concerned.

Moreover, a value of the potential difference $V_{gs}$ in a left-hand side member in Expression (7) becomes small because the potential correction value ΔV becomes large as the mobility μ of the drive transistor $TR_D$ becomes larger. Therefore, even when the value of the mobility μ is given as being large in Expression (9), the value of $(V_{Sig\_m} - V_{0fs} - \Delta V)^2$ becomes small. As a result, the drain current $I_{ds}$ can be corrected. That is to say, the drain currents $I_{ds}$ become approximately equal to one another as long as the values of the video signals $V_{Sig}$ are identical to one another even in the drive transistors $TR_D$ having the different mobilities μ. As a result, the currents $I_{ds}$ caused to flow through the electroluminescence portions ELP to control the luminances in the electroluminescence portions ELP, respectively, are uniformed. That is to say, it is possible to correct the dispersion of the luminances in the electroluminescence portions ELP due to the dispersion of the mobilities μ (moreover, the dispersion of k).

Also, the electroluminescence state of the electroluminescence portion ELP is continuously held until the (m+m'−1)-th horizontal scanning time period. This time point corresponds to end of [time period-TP(2)$_{-1}$].

From the above, the operation for the electroluminescence of the organic EL element 10 constituting the (n, m)-th sub-pixel has been completed. Embodiment 2

Embodiment 2 also relates to a method of driving an organic electroluminescence (EL) portion of the present invention. In Embodiment 2, the drive circuit is configured in the form of a 4Tr/1C drive circuit.

Figure 10:
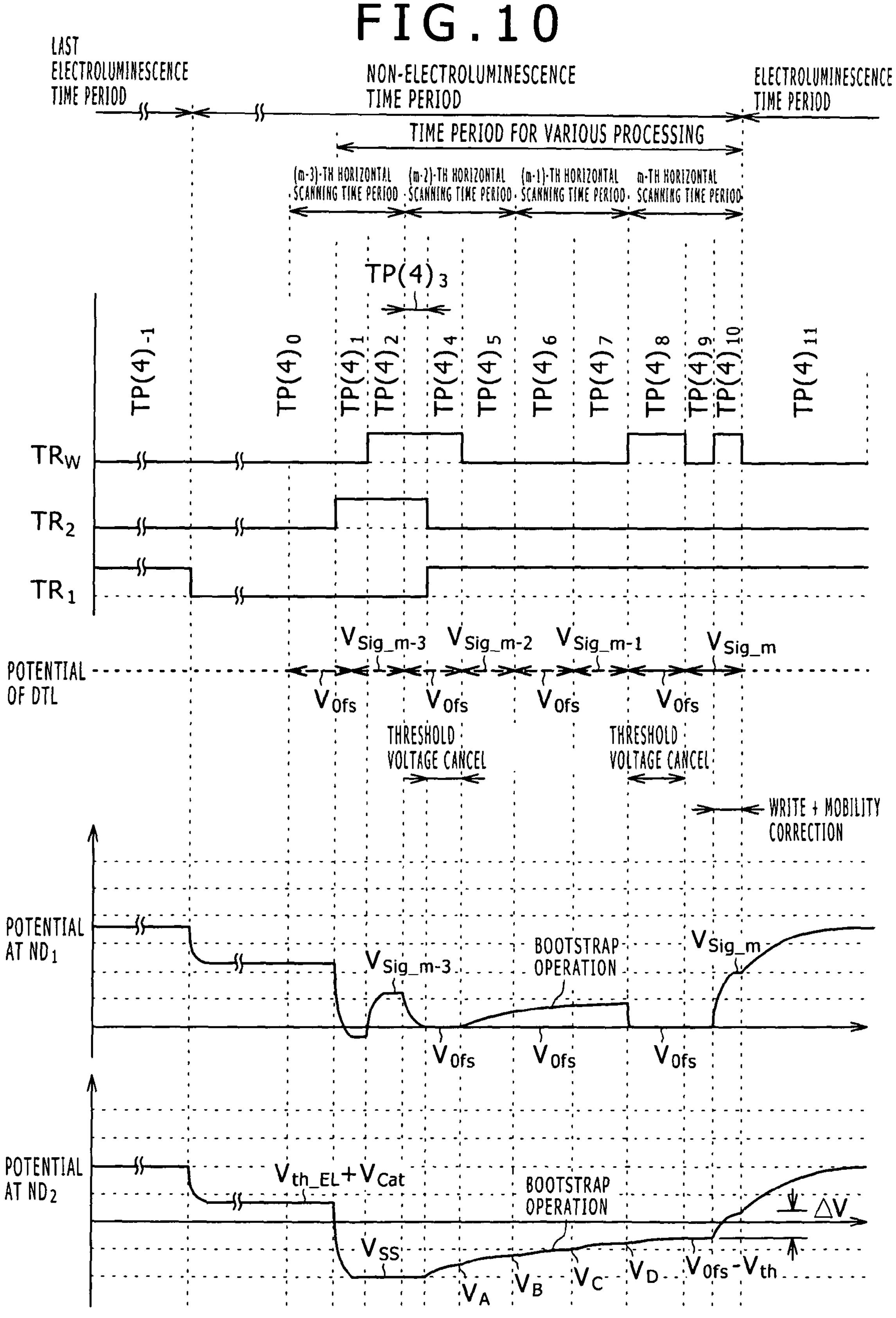
FIG. 10 is a timing chart schematically explaining a drive operation in the organic EL element in Embodiment 2.
Figure 11A:
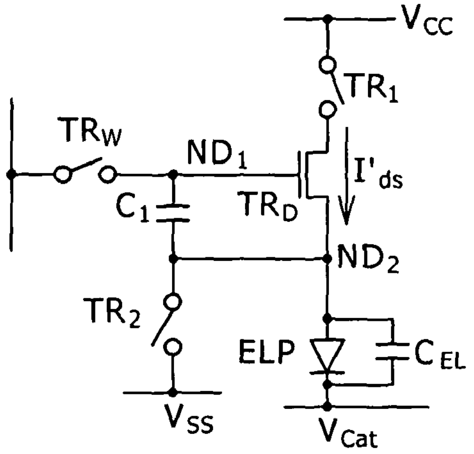
FIGS. 11A to 11N are respectively circuit diagrams schematically showing an ON/OFF state and the like of transistors constituting the drive circuit of the organic EL element in Embodiment 2.

FIG. 8 shows an equivalent circuit diagram of the 4Tr/1C drive circuit, and FIG. 9 shows a conceptual view of an organic EL display device. Also, FIG. 10 schematically shows a timing chart in a drive operation, and FIGS. 11A to 11N schematically show an ON/OFF state and the like of the four transistors.

The 4Tr/1C drive circuit also includes two transistors of the write transistor $TR_W$ and the drive transistor $TR_D$, and one capacitor portion $C_1$ similarly to the case of the 2Tr/1C drive circuit described above. Also, the 4Tr/1C drive circuit further includes a first transistor $TR_1$, and a second transistor $TR_2$.

The first transistor $TR_1$ is composed of an n-channel TFT including source/drain regions, a channel formation region, and a gate electrode. In addition, the second transistor $TR_2$ is also composed of an n-channel TFT including source/drain regions, a channel formation region, and a gate electrode. It is noted that each of the first transistor $TR_1$ and the second transistor $TR_2$ may be configured in the form of a p-channel TFT.

[First Transistor $TR_1$]

In the first transistor $TR_1$, one of the source/drain regions is connected to the power source portion 100, and the other thereof is connected to one of the source/drain regions of the drive transistor $TR_D$. The gate electrode is connected to the first transistor controlling line $CL_1$.

The ON/OFF state of the first transistor $TR_1$ is controlled in accordance with a signal from the first transistor controlling line $CL_1$. More specifically, the first transistor controlling line $CL_1$ is connected to a first transistor controlling circuit 111. Also, a potential of the first transistor controlling line $CL_1$ is set at a low level or a high level in accordance with an operation of the first transistor controlling circuit 111, thereby turning ON or OFF the first transistor $TR_1$.

[Second Transistor $TR_2$]

In the second transistor $TR_2$, one of the source/drain regions is connected to a second node initialization voltage supplying line $PS_{ND2}$, and the other thereof is connected to the second node $ND_2$. The gate electrode thereof is connected to a second transistor controlling line $AZ_2$. A voltage $V_{ss}$ used to initialize the potential at the second node $ND_2$ is applied from the second node initialization voltage supplying line $PS_{ND2}$ to the second node $ND_2$ through the second transistor $TR_2$ held in the ON state. The voltage $V_{ss}$ will be described later.

The ON/OFF state of the second transistor $TR_2$ is controlled in accordance with a signal from the second transistor controlling line $AZ_2$. More specifically, the second transistor controlling line $AZ_2$ is connected to a second transistor controlling circuit 112. Also, a potential of the second transistor controlling line $AZ_2$ is set at the low level or the high level in accordance with the operation of the second transistor controlling circuit 112, thereby turning ON or OFF the second transistor $TR_2$.

In Embodiment 1, the second voltage $V_{CC-L}$ is applied from the power source portion 100 to one of the source/drain regions of the drive transistor $TR_D$, thereby initializing the potential at the second node $ND_2$. On the other hand, in Embodiment 2, as will be described later, the potential at the second node $ND_2$ is initialized by using the second transistor $TR_2$. Therefore, in Embodiment 2, there is no necessity for applying the second voltage $V_{CC-L}$ from the power source portion 100 for the purpose of initializing the potential at the second node $ND_2$. In addition, in Embodiment 2, the power source portion 100 and one of the source/drain regions of the drive transistor $TR_D$ are connected to each other through the first transistor $TR_1$. Thus, the electroluminescence/non-electroluminescence of the electroluminescence portion ELP is controlled by using the first transistor $TR_1$. From the above reason, in Embodiment 2, the power source portion 100 applies a given voltage $V_{CC}$.

Although in the following description, a value of the voltage $V_{CC}$, and a value of the voltage $V_{ss}$ are set as follows, these values are merely ones for a description, and thus the present invention is by no means limited thereto.

$V_{CC}$: a drive current used to cause a current to flow through the electroluminescence portion ELP

. . . 20 V $V_{ss}$: a second node initialization voltage used to initialize the potential at the second node $ND_2$

. . . −10 V

[Drive Transistor $TR_D$]

Since a configuration of the drive transistor $TR_D$ is the same as that of the drive transistor $TR_D$ described in the 2Tr/1C drive circuit, a detailed description thereof is omitted here for the sake of simplicity.

[Write Transistor $TR_W$]

Since a configuration of the write transistor $TR_W$ is the same as that of the write transistor $TR_W$ described in the 2Tr/1C drive circuit, a detailed description thereof is omitted here for the sake of simplicity.

[Electroluminescence Portion ELP]

Since a configuration of the electroluminescence portion ELP is the same as that of the electroluminescence portion ELP described in the 2Tr/1C drive circuit, a detailed description thereof is omitted here for the sake of simplicity.

Hereinafter, a method of driving the electroluminescence portion ELP by using the 4Tr/1C drive circuit will be described.

[Time Period-TP(4)$_{-1}$] (Refer to FIG. 10 and FIG. 11A)

[time period-TP(4)$_{-1}$], for example, is an operation time period for the last display frame, and thus is substantially the same operation time period as that for [time period-TP(2)$_{-1}$] previously described in Embodiment 1.

A time period from [time period-TP(4)$_0$] to [time period-TP(4)$_9$] shown in FIG. 10 is one corresponding to the time period from [time period-TP(2)$_0$] to [time period-TP(2)$_8$] shown in FIG. 4. Thus, this time period is an operation time period from a time point after end of the electroluminescence state after completion of the last various kinds of processing to a time point right before next write processing is executed. Also, the (n, m)-th organic EL element is held in the non-electroluminescence state for the time period from [time period-TP(4)$_0$] to [time period-TP(4)$_9$]. It is noted that the description is given on the assumption that a commencement of [time period-TP(4)$_3$], and a termination of [time period-TP(4)$_5$] agree with a commencement and a termination of the (m−2)-th horizontal scanning time period, respectively. The description is further given on the assumption that a commencement of [time period-TP(4)$_6$], and a termination of [time period-TP(4)$_7$] agree with a commencement and a termination of the (m−1)-th horizontal scanning time period, respectively. The description is still further given on the assumption that a commencement of [time period-TP(4)$_8$], and a termination of [time period-TP(4)$_{10}$] agree with a commencement and a termination of the m-th horizontal scanning time period, respectively.

Hereinafter, time periods of [time period-TP(4)$_0$] to [time period-TP(4)$_{10}$] will be described. It is noted that a commencement of [time period-TP(4)$_1$], and lengths of the time periods of [time period-TP(4)$_1$] to [time period-TP(4)$_{10}$] have to be suitably set depending on the design of the organic EL display device.

Figure 11B:
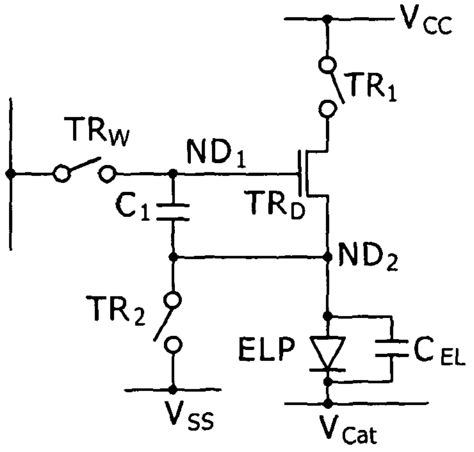
Figure 11C:
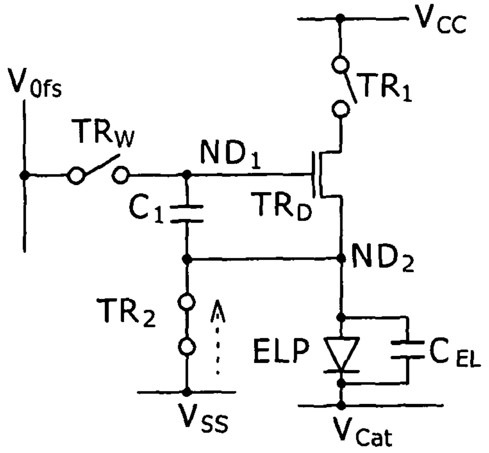
Figure 11D:
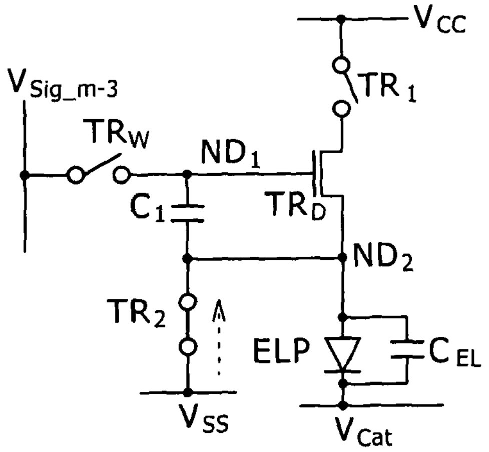

[Time Period-TP(4)$_0$] (Refer to FIG. 10 and FIG. 11B)

As described above, the (n, m)-th organic EL element 10 is held in the non-electroluminescence state for [time period-TP(4)$_0$]. Each of the write transistor $TR_W$ and the second transistor $TR_2$ is held in the OFF state. In addition, the first transistor $TR_1$ is turned OFF at a time point at which the time period proceeds from [time period-TP(4)$_{-1}$] to [time period-TP(4)$_0$]. Thus, the potential at the second node $ND_2$ drops to ($V_{th\text{-}EL}$+$V_{Cat}$), so that the electroluminescence portion ELP is held in the non-electroluminescence state. In addition, the potential at the first node $ND_1$ held in the floating state also drops so as to follow the drop of the potential at the second node $ND_2$. It is noted that the potential at the first node $ND_1$ for [time period-TP(4)$_0$] depends on the potential (determined depending on the value of the video signal $V_{Sig}$ in the last frame) at the first node $ND_1$ for [time period-TP(4)$_{-1}$], and thus does not take a given value.

[Time Period-TP(4)$_1$] to [Time Period-TP(4)$_3$] (Refer to FIG. 10, and FIGS. 11C, 11D, 11E and 11F)

As will be described later, the step (a) described above, that is, the preprocessing described above is executed for [time period-TP(4)$_3$]. The write transistor $TR_W$ is turned ON in accordance with the signal from the corresponding one of the scanning lines SCL prior to a commencement of the time period for which the step (a) described above is intended to be performed (that is, the (m−2)-th horizontal scanning time period). In this state, the step (a) described above is performed. In Embodiment 2, the write transistor $TR_W$ is turned ON for a time period right before the (m−2)-th horizontal scanning time period (that is, the (m−3)-th horizontal scanning time period) similarly to the case described in Embodiment 1. In this state, the step (a) is performed. Hereinafter, a detailed description thereof will be given. [Time Period-TP (4)$_1$] (refer to FIG. 10, and FIGS. 11C and 11D)

The potential of the second transistor controlling line $AZ_2$ is set at the high level in accordance with the operation of the second transistor controlling circuit 112 for the (m−3)-th horizontal scanning time period while the OFF state of each of the write transistor $TR_W$ and the first transistor $TR_1$ is maintained. As a result, the second transistor $TR_2$ is turned ON. In Embodiment 2, the description is given on the assumption that the second transistor $TR_2$ is switched from the OFF state over to the ON state for a time period for which the first node initialization voltage $V_{0fs}$ is applied to the corresponding one of the data lines DTL, and thereafter, the voltage of the corresponding one of the data lines DTL is switched from the first node initialization voltage $V_{0fs}$ over to the video signal $V_{Sig\_m-3}$. The potential at the second node $ND_2$ is set at $V_{ss}$ (−10 V). In addition, the potential at the first node $ND_1$ held in the floating state also drops so as to follow the drop of the potential at the second node $ND_2$. It is noted that the potential at the first node $ND_1$ for [time period-TP (4)$_{1A}$] depends on the potential at the first node $ND_1$ for [time period-TP(4)$_1$], and thus does not take a given value.

Figure 11E:
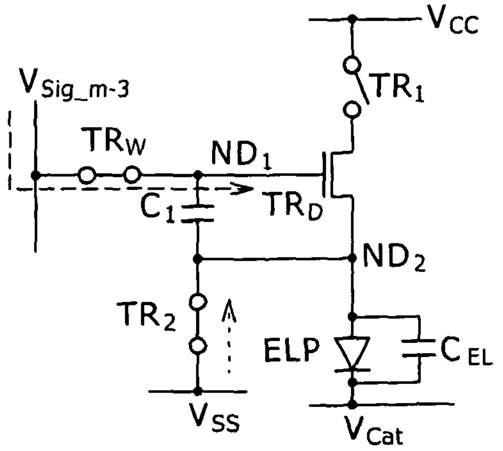

[Time Period-TP(4)$_2$] (Refer to FIG. 10 and FIG. 11E)

The potential of the corresponding one of the scanning lines SCL is set at the high level in accordance with the operation of the scanning circuit 101 in and after a termination of the (m−3)-th horizontal scanning time period while the OFF state of the first transistor $TR_1$ is maintained. As a result, the voltage is applied from the corresponding one of the data lines DTL to the first node $ND_1$ through the write transistor $TR_W$ turned ON in accordance with the signal from the corresponding one of the scanning lines SCL. In Embodiment 2, the description is given on the assumption that the write transistor $TR_W$ is turned ON for the time period for which the video signal $V_{Sig\_m-3}$ is applied to the corresponding one of the data lines DTL similarly to the case described in Embodiment 1.

As a result, although the potential at the first node $ND_1$ is set at $V_{Sig\_m-3}$, the potential at the second node $ND_2$ is set at $V_{ss}$ (−10 V). Thus, the difference in potential between the second node $ND_2$ and the cathode electrode provided in the electroluminescence portion ELP is set at −10 V, and thus does not exceed the threshold voltage $V_{th\text{-}EL}$ of the electroluminescence portion ELP. Therefore, the electroluminescence portion ELP emits no light.

Figure 11F:
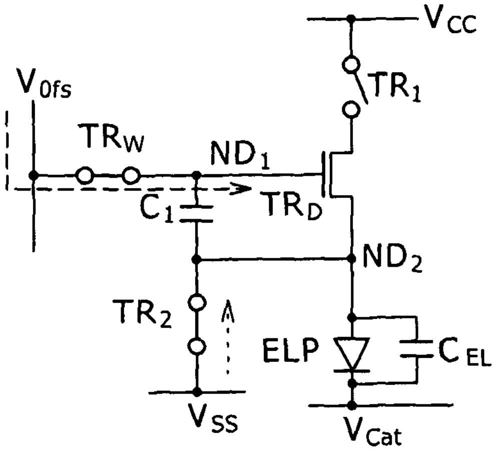

[Time Period-TP(4)$_3$] (Refer to FIG. 10 and FIG. 11F)

The step (a) described above, that is, the preprocessing described above is executed for [time period-TP(4)$_3$]. In embodiment 2, the second node initialization voltage $V_{ss}$ is applied from a second node initialization voltage supplying line $PS_{ND2}$ to the second node $ND_2$ through the second transistor $TR_2$ turned ON in accordance with the signal from a second transistor controlling line $AZ_2$ based on the operation of the second transistor controlling circuit 112 in a state in which the OFF state of the first transistor $TR_1$ is maintained in accordance with the signal from the first transistor controlling line $CL_1$ based on the operation of the first transistor controlling circuit 111. Next, the second transistor $TR_2$ is turned OFF in accordance with the signal from the second transistor controlling line $AZ_2$ in a termination of [time period-TP(4)$_3$], thereby initializing the potential at the second node $ND_2$.

On the other hand, the voltage of the corresponding one of the data lines DTL is switched from the voltage of the video signal $V_{Sig\_m-3}$ over to the first node initialization voltage $V_{0fs}$ in a commencement of [time period-TP(4)$_3$] in a state in which the ON state of the write transistor $TR_W$ is maintained in accordance with the signal from the corresponding one of the scanning lines SCL similarly to the case described in Embodiment 1. The write transistor $TR_W$ is held in the ON state prior to a change in voltage of the corresponding one of the data lines DTL. Thus, the potential at the first node $ND_1$ is initialized as soon as the first node initialization voltage $V_{0fs}$ is applied to the corresponding one of the data lines DTL. As a result, the potential at the first node $ND_1$ is set at $V_{0fs}$ (0 V). On the other hand, the potential at the second node $ND_2$ is set at $V_{ss}$ (−10 V) The drive transistor $TR_D$ is held in the ON state because the difference in potential between the first node $ND_1$ and the second node $ND_2$ is 10 V, and the threshold voltage $V_{th}$ of the drive transistor $TR_D$ is 3 V. It is noted that the difference in potential between the second node $ND_2$ and the cathode electrode provided in the electroluminescence portion ELP is −10 V, and thus does not exceed the threshold voltage $V_{th\text{-}EL}$ of the electroluminescence portion ELP. As a result, the preprocessing for initializing the potential at the first node $ND_1$ and the potential at the second node $ND_2$ is completed.

The write transistor $TR_W$ is held in the ON state prior to the change in voltage of the corresponding one of the data lines DTL similarly to the case described in Embodiment 1. Thus, the potential at the first node $ND_1$ is initialized as soon as the first node initialization voltage $V_{0fs}$ is applied to the corresponding one of the data lines DTL. As a result, since the preprocessing can be executed for a shorter time, a longer time can be allocated to the threshold voltage canceling processing executed so as to follow the preprocessing.

Figure 11G:
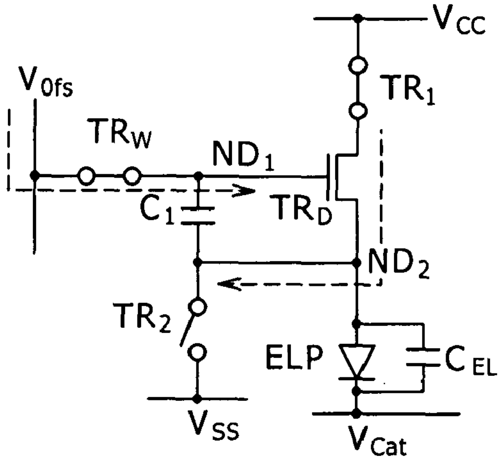

[Time Period-TP(4)$_4$] (Refer to FIG. 10 and FIG. 11G)

The step (b) described above, that is, the threshold voltage canceling processing is executed for [time period-TP(4)$_4$]. That is to say, one of the source/drain regions of the drive transistor $TR_D$ is caused to obtain conduction with the power source portion 100 through the first transistor $TR_1$ turned ON in accordance with the signal from the first transistor controlling line $CL_1$ based on the operation of the first transistor controlling circuit 111 in a state in which the first node initialization voltage $V_{0fs}$ is applied from the corresponding one of the data lines DTL to the first node $ND_1$ through the write transistor $TR_W$ held in the ON state in accordance with the signal from the corresponding one of the scanning lines SCL. Also, the voltage $V_{CC}$ is applied as a higher voltage than that obtained by subtracting the threshold voltage $V_{th}$ of the drive transistor $TR_D$ from the potential $V_{0fs}$ at the first node $ND_1$ from the power source portion 100 to one of the source/drain regions of the drive transistor $TR_D$. It is noted that the voltage $V_{CC}$ is continuously applied thereto until a termination of the (m+m'−1)-th horizontal scanning time period. As a result, although no potential at the first node $ND_1$ changes ($V_{0fs}$=0V is held), the potential at the second node $ND_2$ changes from the potential as the first node $ND_1$ toward the potential obtained by subtracting the threshold voltage $V_{th}$ of the drive transistor $TR_D$ from the potential at the first node $ND_1$. That is to say, the potential at the second node $ND_2$ held in a floating state rises.

If a length of [time period-TP(4)$_4$] is sufficiently long similarly to the case described for [time period-TP(2)$_3$] in Embodiment 1, the difference in potential between the gate electrode of the drive transistor $TR_D$, and the other of the source/drain regions thereof reaches the threshold voltage $V_{th}$, and thus the drive transistor $TR_D$ is turned OFF. That is to say, the potential at the second node $ND_2$ held in the floating state approaches ($V_{0fs}-V_{th}$=−3 V), and finally becomes ($V_{0fs}-V_{th}$). However, the length of [time period-TP(4)$_4$] in Embodiment 2 is not enough to sufficiently change the potential at the second node $ND_2$. As a result, in the termination of [time period-TP(4)$_4$], the potential at the second node $ND_2$ reaches a certain potential $V_A$ fulfilling a relationship Of $V_{ss}<V_A<(V_{0fs}-V_{th})$.

The operation carried out for a time period in and after [time period-TP(4)$_5$] is substantially the same as that for which the voltage $V_{CC-H}$ is replaced with the voltage $V_{CC}$ in the description given for a time period from [time period-TP (2)$_4$] to [time period-TP(2)$_{10}$]. Hereinafter, time periods will be described.

Figure 11H:
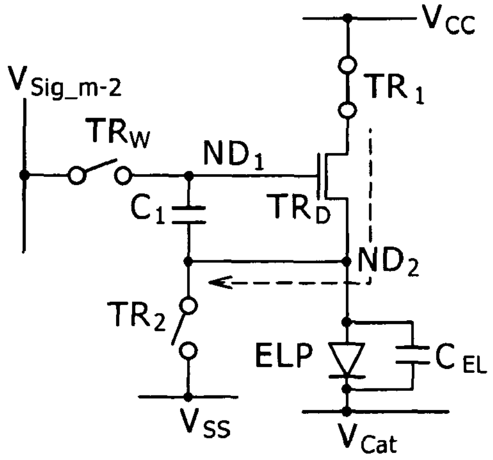

[Time Period-TP(4)$_5$] (Refer to FIG. 10 and FIG. 11H)

In a commencement of [time period-TP(4)$_5$], the voltage on the corresponding one of the data lines DTLs is switched from the first node initialization voltage $V_{0fs}$ over to the voltage of the video signal voltage $V_{Sig\_m-2}$. In order to avoid that the video signal voltage $V_{Sig\_m-2}$ is applied to the first node $ND_1$, in the commencement of [time period-TP(4)$_5$], the write transistor $TR_W$ is turned OFF in accordance with the signal transmitted through the corresponding one of the scanning lines SCLs. The operation carried out for [time period-TP(4)$_5$] is the same as that described for [time period-TP(2)$_4$] in Embodiment 1. Thus, the potential at the second node $ND_2$ rises from the potential $V_A$ to a certain potential $V_B$. In addition, the potential at the first node $ND_1$ rises so as to follow a change in potential at the second node $ND_2$.

Figure 11I:
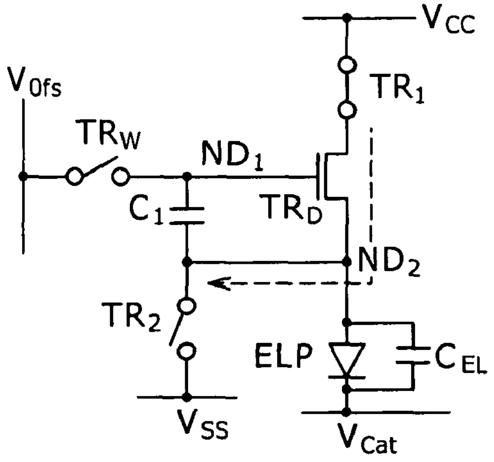
Figure 11J:
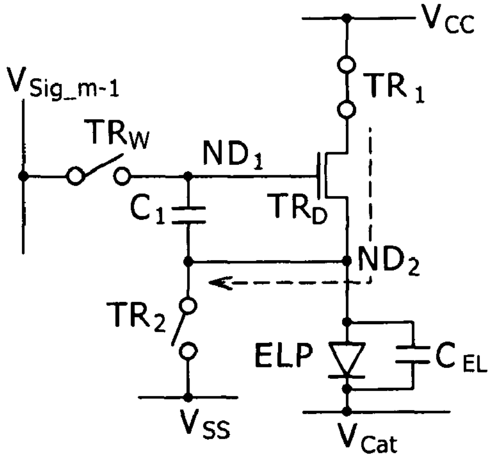

[Time Period-TP(4)$_6$] and [Time Period-TP(4)$_7$] (Refer to FIG. 10, and FIGS. 11I and 11J)

For [time period-TP(4)$_6$] and [time period-TP(4)$_7$], the higher voltage than the voltage obtained by subtracting the threshold voltage $V_{th}$ of the drive transistor $TR_D$ from the first node initialization voltage $V_{0fs}$ is applied from the power source portion 100 to one of the source/drain regions of the drive transistor $TR_D$. In this case, the write transistor $TR_W$ is held in the OFF state for one horizontal scanning time period to cause the potential at the second node $ND_2$ to rise, thereby causing the potential at the first node $ND_1$ held in the floating state to rise. In such a manner, the auxiliary bootstrap processing is executed.

An operation carried out for [time period-TP(4)$_6$] is the same as that described for [time period-TP(2)$_5$] in Embodiment 1. Thus, the potential at the second node $ND_2$ rises from the potential $V_B$ to a certain potential $V_C$. In addition, the potential at the first node $ND_1$ rises so as to follow a change in potential at the second node $ND_2$. The operation carried out for [time period-TP(4)$_7$] is the same as that described for [time period-TP(2)$_6$] in Embodiment 1. Thus, the potential at the second node $ND_2$ rises from the potential $V_C$ to a certain potential $V_D$. In addition, the potential at the first node $ND_1$ rises so as to follow a change in potential at the second node $ND_2$.

Figure 11K:
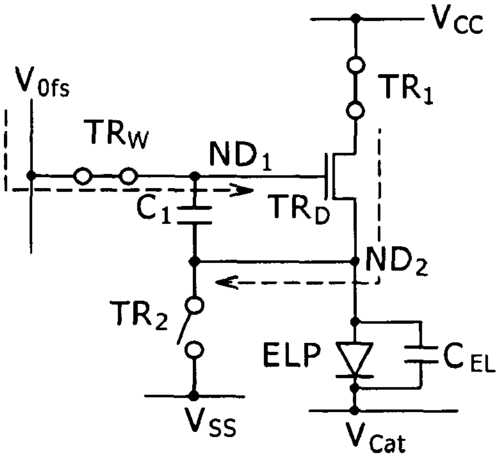

[Time Period-TP(4)$_8$] (Refer to FIG. 10 and FIG. 11K)

For [time period-TP(4)$_8$] as well, the above step (b), that is, the threshold voltage canceling processing described above is executed. The threshold voltage canceling processing executed for [time period-TP(4)$_8$] corresponds to the threshold voltage canceling processing intended to be executed right before execution of the write processing. The operation carried out for [time period-TP(4)$_8$] is the same as that described for [time period-TP(2)$_7$] in Embodiment 1. Thus, the potential at the second node $ND_2$ held in the floating state approaches ($V_{0fs}-V_{th}$=−3 V), and finally becomes ($V_{0fs}-V_{th}$). Here, as long as Expression (5) is guaranteed, in other words, as long as the potentials are selected and determined so as to fulfill Expression (5), the electroluminescence portion ELP emits no light.

The potential at the second node $ND_2$ finally becomes ($V_{0fs}-V_{th}$) for [time period-TP(4)$_8$]. That is to say, the potential at the second node $ND_2$ is determined depending on only the threshold voltage $V_{th}$ of the drive transistor $TR_D$, and the first node initialization voltage $V_{0fs}$ used to initialize the potential at the gate electrode of the drive transistor $TR_D$. Also, the potential at the second node $ND_2$ has no connection with the threshold voltage $V_{th\_EL}$ of the electroluminescence portion ELP.

Figure 11L:
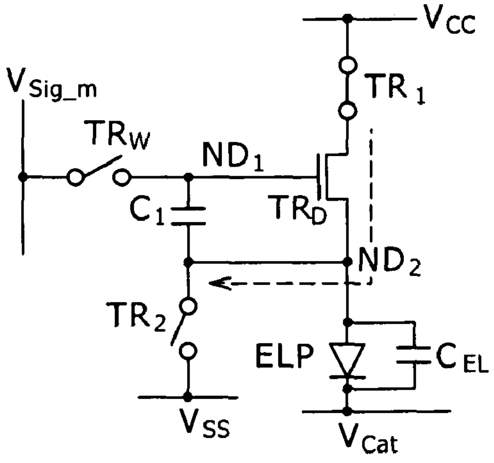

[Time Period-TP(4)$_9$] (Refer to FIG. 10 and FIG. 11L)

In a commencement of [time period-TP(4)$_9$], the write transistor $TR_W$ is turned OFF in accordance with the signal transmitted through the corresponding one of the scanning lines SCLs. Also, the voltage applied to the corresponding one of the data lines DTLs is switched from the first node initialization voltage $V_{0fs}$ over to the voltage of the video signal $V_{Sig\_m}$. If the drive transistor $TR_D$ reaches the OFF state in the threshold voltage canceling processing, neither of the potential at the first node $ND_1$ and the potential at the second node $ND_2$ substantially changes. In the case where the drive transistor $TR_D$ does not reach the OFF state in the threshold voltage canceling processing, the bootstrap operation occurs for [time period-TP(4)$_9$] as well, each of the potential at the first node $ND_1$ and the potential at the second node $ND_2$ slightly rises. The drive operation in the organic EL element is explained in FIG. 10 on the assumption that no bootstrap operation occurs.

Figure 11M:
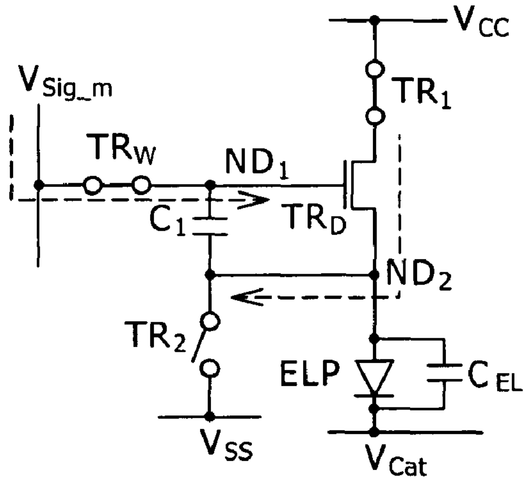
Figure 11N:
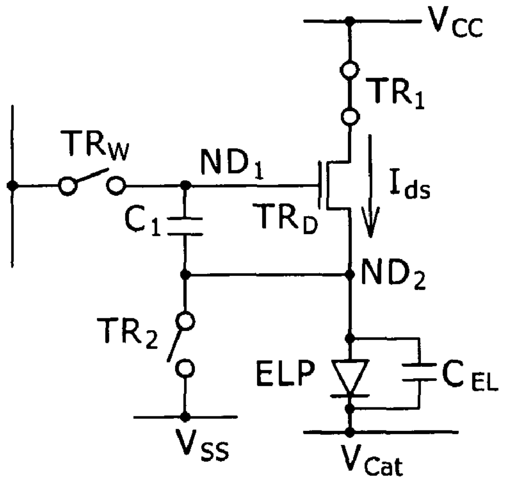

[Time Period-TP(4)$_{10}$] (Refer to FIG. 10 and FIG. 11M)

The above step (c), that is, the write processing described above is executed for [time period-TP(4)$_{10}$]. Since the operation carried out for [time period-TP(4)$_{10}$] is the same as that described for [time period-TP(2)$_9$] in Embodiment 1, a description thereof is omitted here for the sake of simplicity. Similarly to the case described in Embodiment 1, in the driving method as well of Embodiment 2, the write processing is executed together with the mobility correcting processing for causing the potential (that is, the potential at the second node $ND_2$) at the other of the source/drain regions of the drive transistor $TR_D$ to rise in correspondence to the characteristics of the drive transistor $TR_D$ (for example, the magnitude of the mobility μ, and the like).

It is noted that the write transistor $TR_W$ can be held in the ON state for [time period-TP(4)$_9$] as the case may be similarly to the case described in Embodiment 1. With this constitution, the write processing starts to be executed as soon as the voltage on the corresponding one of the data lines DTLs is switched from the first node initialization voltage of $V_{0fs}$ over to the voltage of the video signal $V_{Sig\_m}$ for [time period-TP (4)$_9$].

[Time Period-TP(4)$_{11}$] (Refer to FIG. 10 and FIG. 11N)

By performing the above operations, the execution of the threshold voltage canceling processing, the write processing, and the mobility correcting processing is completed. After that, the step (d) described above is performed for this time period. That is to say, the write transistor $TR_W$ is held in the OFF state, and the first node $ND_1$, that is, the gate electrode of the drive transistor $TR_D$ is held in the floating state. The ON state of the first transistor $TR_1$ is maintained, and a state is maintained in which the voltage $V_{CC}$ is applied from the power source portion 100 to one of the source/drain regions of the drive transistor $TR_D$. Therefore, as the result of the foregoing, since the potential at the second node $ND_2$ rises to exceed ($V_{th\_EL}$+$V_{Cat}$), the electroluminescence portion ELP starts to emit the light. At this time, the current $I_{ds}$ caused to flow through the electroluminescence portion ELP is independent of the threshold voltage $V_{th-EL}$ of the electroluminescence portion ELP, and the threshold voltage $V_{th}$ of the drive transistor $TR_D$ because it can be obtained based on Expression (9).

Also, the electroluminescence state of the electroluminescence portion ELP is continuously held until the (m+m'−1)-th horizontal scanning time period. This time point corresponds to end of [time period-TP(4)$_{-1}$].

From the above, the operation of the electroluminescence of the organic EL element 10 constituting the (n, m)-th subpixel has been completed.

Embodiment 3

Embodiment 3 also relates to a method of driving the organic electroluminescence emission portion of the present invention. A drive circuit is configured in the form of a 3Tr/1C drive circuit.

Figure 14:
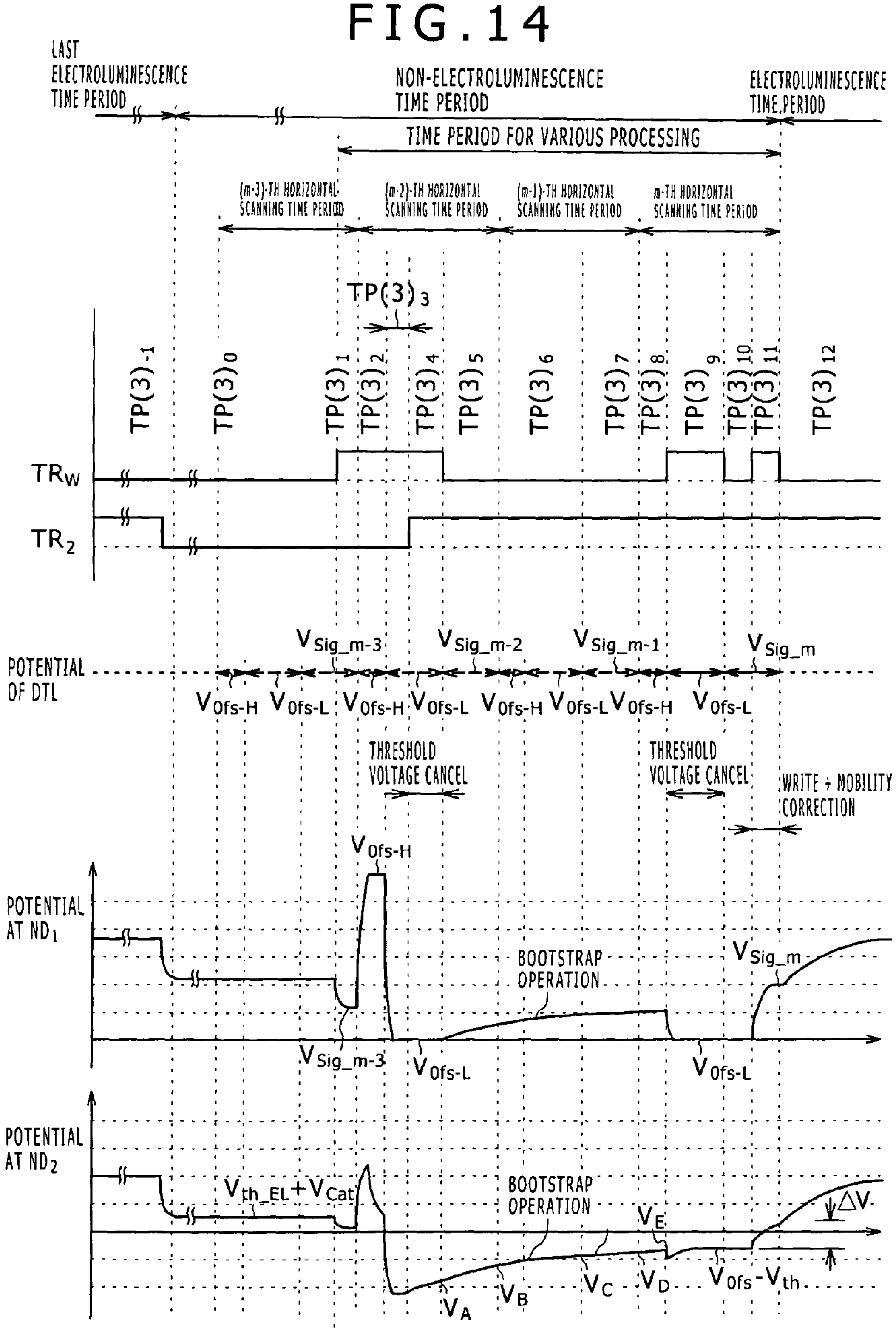
FIG. 14 is a timing chart schematically explaining a drive operation in the organic EL element in Embodiment 3.
Figure 15A:
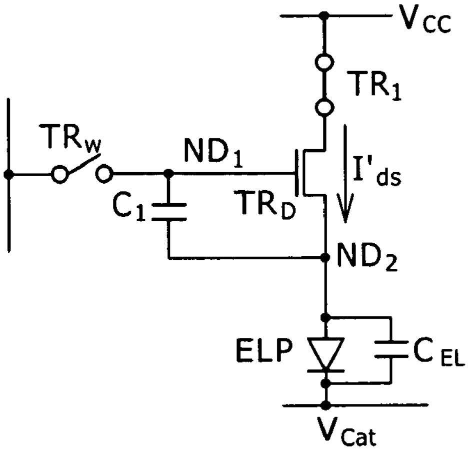
FIGS. 15A to 15O are respectively circuit diagrams schematically showing an ON/OFF state and the like of transistors constituting the drive circuit for the organic EL element in Embodiment 3.

FIG. 12 shows an equivalent circuit diagram of the 3Tr/1C drive circuit, and FIG. 13 shows a conceptual diagram of the organic EL display device. In addition, FIG. 14 schematically shows a timing chart in a drive operation. Also, FIGS. 15A to 15O schematically show an ON/OFF state and the like of the three transistors.

The 3Tr/1C drive circuit also includes the two transistors of the write transistor $TR_W$ and the drive transistor $TR_D$, and the one capacitor portion $C_1$ similarly to the case of the 2Tr/1C drive circuit described above. Also, the 3Tr/1C drive circuit further includes a first transistor $TR_1$.

[Write Transistor $TR_W$]

Since a structure of the write transistor $TR_W$ is the same as that of the write transistor $TR_W$ previously described in Embodiment 1, a detailed description there of is omitted here for the sake of simplicity. However, although one of the source/drain regions of the write transistor $TR_W$ is connected to the corresponding one of the data lines DTL, not only the video signal $V_{Sig}$ used to control the luminance in the electroluminescence portion ELP, but also two kinds of voltages (more specifically, a voltage $V_{0fs-H}$ and a voltage $V_{0fs-L}$ which will be described later) are supplied as the first node initialization voltage to the write transistor $TR_W$ in order to initialize the potential at the first node $ND_1$. The operation of the write transistor $TR_W$ in Embodiment 3 is different from that of the write transistor $TR_W$ described in each of Embodiments 1 and 2 in this respect. $V_{0fs-H}$=about 30 V, and $V_{0fs-L}$=about 0 V, for example, can be exemplified as values of the voltage $V_{0fs-H}$ and the voltage $V_{0fs-L}$. However, the present invention is by no means limited thereto. It is noted that as will be described later, the voltage $V_{0fs-H}$ is applied merely for the purpose of initializing the potential at the second node $ND_2$. The above step (b), that is, the threshold voltage canceling processing described above is executed while the voltage $V_{0fs-L}$ is applied to the corresponding one of the data lines DTLs.

[Relationship Between Values of $C_{EL}$ and $C_1$]

As will be described later, in Embodiment 3, the potential at the second node $ND_2$ is changed in correspondence to the change in potential at the first node $ND_1$, thereby initializing the potential at the second node $ND_2$. In each of Embodiments 1 and 2 described above, the description has been given on the assumption that the capacitance value $c_{EL}$ of the capacitance $C_{EL}$ in the electroluminescence portion ELP is sufficiently larger than each of the capacitance value $c_1$ of the capacitor portion $C_1$, and the capacitance value $c_{gs}$ of the parasitic capacitance between the gate electrode and the source region of the drive transistor $TR_D$. Thus, the description has been also given without taking the change in potential at the source region (the second node $ND_2$) of the drive transistor $TR_D$ based on the change in potential at the gate electrode (the first node $ND_1$) of the drive transistor $TR_D$ into consideration. On the other hand, in Embodiment 3, the capacitance value $c_1$ is set as being larger than that in each of other drive circuits in terms of design(for example, the capacitance value $c_1$ is set at about ¼ to about ⅓ of the capacitance value $c_{EL}$). Therefore, the degree of the change in potential at the second node $ND_2$ caused by the change in potential at the first node $ND_1$ is large. For this reason, in Embodiment 3, the description is given in consideration of the change in potential at the second node $ND_2$ caused by the change in potential at the first node $ND_1$. It is noted that the timing chart in the drive operation of FIG. 14 is also shown in consideration of the change in potential at the second node $ND_2$ caused by the change in potential at the first node $ND_1$.

[First transistor $TR_1$]

A structure of the first transistor $TR_1$ is the same as that of the first transistor $TR_1$ previously described in Embodiment 2. That is to say, in the first transistor $TR_1$, one of the source/drain regions is connected to the power source portion 100, and the other thereof is connected to one of the source/drain regions of the drive transistor $TR_D$. A gate electrode thereof is connected to the first transistor controlling line $CL_1$.

The ON/OFF state of the first transistor $TR_1$ is controlled in accordance with a signal from the first transistor controlling line $CL_1$. More specifically, the first transistor controlling line $CL_1$ is connected to the first transistor controlling circuit 111. Also, the potential of the first transistor controlling line $CL_1$ is set at the low level or the high level in accordance with the operation of the first transistor controlling circuit 111, thereby turning ON or OFF the first transistor $TR_1$.

[Drive Transistor $TR_D$]

Since a structure of the drive transistor $TR_D$ is the same as that previously described in Embodiment 1, a detailed description thereof is omitted here for the sake of simplicity. It is noted that similarly to the case of Embodiment 2, the power source portion 100 and one of the source/drain regions of the drive transistor $TR_D$ are connected to each other through the first transistor $TR_1$, and the electroluminescence/non-electroluminescence of the electroluminescence portion ELP is controlled by using the first transistor $TR_1$. A given voltage $V_{CC}$ is applied to the power source portion 100 similarly to the case of Embodiment 2.

[Electroluminescence Portion ELP]

Since a structure of the electroluminescence portion ELP is the same as that of the electroluminescence portion ELP previously described in Embodiment 1, a detailed description thereof is omitted here for the sake of simplicity.

Here, a description will be given with respect to a method of driving the electroluminescence portion ELP by using the 3Tr/1C driving circuit.

[Time Period-TP(3)$_{-1}$] (refer to FIG. 14 and FIG. 15A)

[time period-TP(3)$_{-1}$], for example, is an operation time period in the last display frame, and thus is substantially the same operation time period as that of [time period-TP(2)$_{-1}$] previously described in Embodiment 1.

A time period from [time period-TP(3)$_0$] to [time period-TP(3)$_{10}$] shown in FIG. 14 is one corresponding to a time period from [time period-TP(2)$_0$] to [time period-TP(2)$_8$] shown in FIG. 4. Thus, this time period is an operation time period right before the next write processing is executed. Also, for the time period from [time period-TP(3)$_0$] to [time period-TP(3)$_{10}$], the (n, m)-th organic EL element is held in the non-electroluminescence state as a general rule. It is noted that the description will now be given on the assumption that a commencement of [time period-TP(3)$_2$], and a termination of [time period-TP(3)$_5$] agree with a commencement and a termination of the (m−2)-th horizontal scanning time period, respectively. The description further will be given on the assumption that a commencement of [time period-TP(3)$_6$], and a termination of [time period-TP(3)$_7$] agree with a commencement and a termination of the (m−1)-th horizontal scanning time period, respectively. The description still further will be given on the assumption that a commencement of [time period-TP(3)$_8$], and a termination of [time period-TP (3)$_{11}$] agree with a commencement and a termination of the m-th horizontal scanning time period, respectively.

Hereinafter, time periods of [time period-TP(3)$_0$] to [time period-TP(3)$_{11}$] will be described. It is noted that a commencement of [time period-TP(3)$_1$], and lengths of time periods of [time period-TP(3)$_1$] to [time period-TP(3)$_{11}$] have to be suitably set depending on the design of the organic EL display device.

Figure 15B:
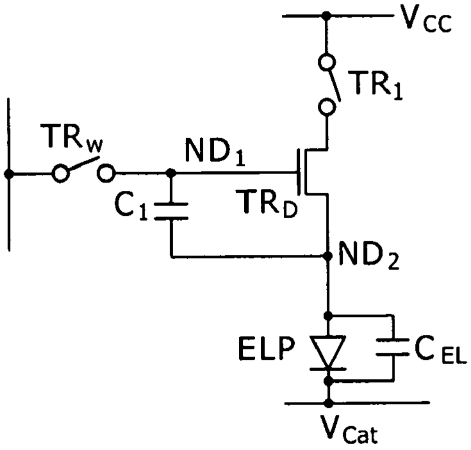

[Time Period-TP(3)$_0$] (Refer to FIG. 14 and FIG. 15B)

[time period-TP(3)$_0$], for example, is an operation time period ranging from the last display frame to the current display frame, and thus substantially the same operation time period as that of [time period-TP(4)$_0$] previously described in Embodiment 2.

[Time Period-TP(3)$_1$] to [Time Period-TP(3)$_3$] (Refer to FIG. 14, and FIGS. 15C to 15E)

As will be described later, the step (a) described above, that is, the preprocessing described above is executed for [time period-TP(3)$_3$]. The write transistor $TR_W$ is turned ON in accordance with the signal from the corresponding one of the scanning lines SCL prior to the commencement of the scanning time period for which the step (a) is intended to be performed (that is, the (m−2)-th horizontal scanning time period). In this ON state, the step (a) is then performed. In Embodiment 3, the write transistor $TR_W$ is turned ON for the scanning time period right before the (m−2)-th horizontal scanning time period (that is, the (m−3)-th horizontal scanning time period) similarly to the case previously described in Embodiment 1. In this ON state, the step (a) is then performed. A detailed description thereof will be given hereinafter.

Figure 15C:
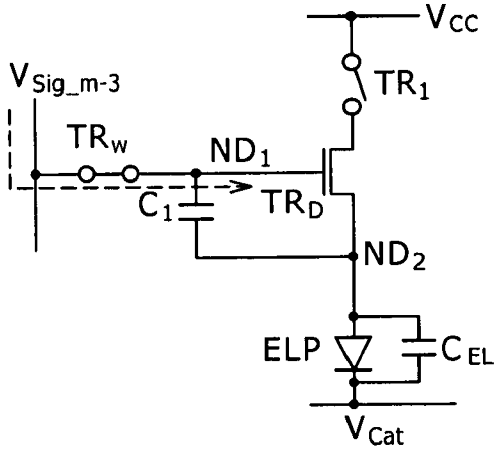

[Time Period-TP(3)$_1$] (Refer to FIG. 14 and FIG. 15C)

The potential of the corresponding one of the scanning lines SCL is set at the high level in accordance with the operation of the scanning circuit 101 in and before the termination of the (m−3)-th horizontal scanning time period while the OFF state of the first transistor $TR_1$ is maintained. As a result, the voltage is applied from the corresponding one of the data lines DTL to the first node $ND_1$ through the write transistor $TR_W$ turned ON in accordance with the signal from the corresponding one of the scanning lines SCL. In Embodiment 3, similarly to the case of Embodiment 1, the description will now be given on the assumption that the write transistor $TR_W$ is held in the ON state for the time period for which the video signal $V_{Sig\_m-3}$ is applied to the corresponding one of the data lines DTL. Thus, the potential at the first node $ND_1$ is set at $V_{Sig\_m-3}$.

Figure 15D:
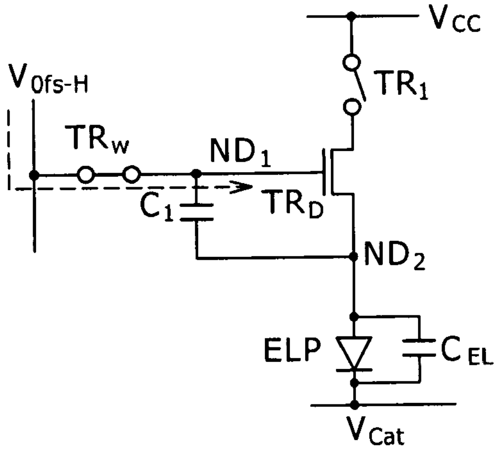

[Time Period-TP(3)$_2$] (Refer to FIG. 14 and FIG. 15D)

The (m−2)-th horizontal scanning time period in the current display frame starts with [time period-TP(3)$_2$]m The voltage of the corresponding one of the data lines DTL is switched from the voltage of the video signal $V_{Sig\_m-3}$ over to $V_{0fs-H}$ (30 V) as the first node initialization voltage in accordance with the operation of the signal outputting circuit 102 in a commencement of [time period-TP(3)$_2$] while the OFF state of the first transistor $TR_1$ is held in accordance with the signal from the first transistor controlling line $CL_1$ based on the operation of the first transistor controlling circuit 111. As a result, the potential at the first node $ND_1$ is set at $V_{0fs-H}$. As described above, since the capacitance value $c_1$ of the capacitor portion $C_1$ is made larger than that in each of other drive circuits in terms of the design, the potential at the source region (the potential at the second node $ND_2$) rises. It is noted that although when the difference in potentials at the opposite terminals of the electroluminescence portion ELP exceeds the threshold voltage $V_{th\text{-}EL}$ of the electroluminescence portion ELP, the electroluminescence portion ELP is held in a conduction state, the potential at the source region of the drive transistor $TR_D$ drops to $(V_{th\text{-}EL}+V_{Cat})$ again. Although the electroluminescence portion ELP can emit the light in this process, it does not become practically a problem because the electroluminescence is made in a flash. On the other hand, the voltage $V_{0fs-H}$ is held in the gate electrode of the drive transistor $TR_D$.

Figure 15E:
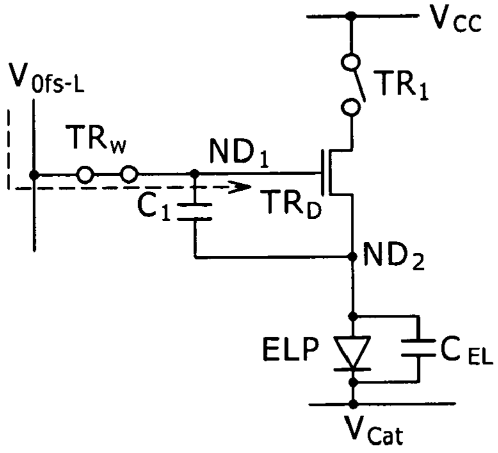

[Time Period-TP(3)$_3$] (Refer to FIG. 14 and FIG. 15E)

For [time period-TP(3)$_3$], the step (a) described above, that is, the processing described above is executed. The value of the first node initialization voltage applied to the first node $ND_1$ is changed from $V_{0fs-H}$ over to $V_{0fs-L}$ while the OFF state of the first transistor $TR_1$ is held in accordance with the signal from the first transistor controlling line $CL_1$ based on the operation of the first transistor controlling circuit 111. As a result, the potential at the second node $ND_2$ is changed in accordance with the change in potential at the first node $ND_1$, thereby initializing the potential at the second node $ND_2$. Specifically, the potential of the corresponding one of the data lines DTL is changed from the voltage $V_{0fs-H}$ over to the voltage $V_{0fs-L}$, so that the potential at the first node $ND_1$ changes from the voltage $V_{0fs-H}$ (30 V) over to the voltage $V_{0fs-L}$ (0 V). Also, the potential at the second node $ND_2$ also drops so as to follow the drop of the potential at the first node $ND_1$. That is to say, the electric charges based on the change ($V_{0fs-L}-V_{0fs-H}$) in potential at the gate electrode of the drive transistor $TR_D$ are distributed to the capacitor portion $C_1$, the capacitance $C_{EL}$ of the electroluminescence portion ELP, and the parasitic capacitance between the gate electrode and the other of the source/drain regions of the drive transistor $TR_D$. It is noted that it is demanded as a premise of the operation for [time period-TP(3)$_4$] which will be described later that the potential at the second node $ND_2$ is lower than the potential difference ($V_{0fs-L}-V_{th}$) in the termination of [time period-TP (3)$_3$]. The values of $V_{0fs-H}$ and the like are set so as to meet this condition. That is to say, by executing the above processing, the difference in potential between the gate electrode and the source region of the dive transistor $TR_D$ becomes equal to or larger than the threshold voltage $V_{th}$ of the dive transistor $TR_D$, and thus the dive transistor $TR_D$ is turned ON.

Figure 15F:
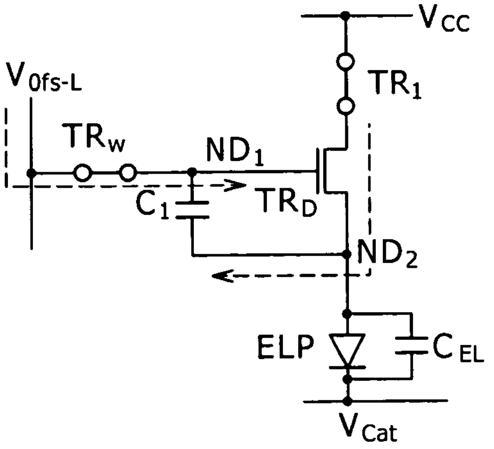

[Time Period-TP(3)$_4$] (Refer to FIG. 14 and FIG. 15F)

The above step (b), that is, the threshold voltage canceling processing described above is executed for [time period-TP (3)$_4$]. That is to say, the first node initialization voltage $V_{0fs-L}$ is applied from the corresponding one of the data lines DTLs to the first node $ND_1$ through the write transistor $TR_W$ held in the ON state in accordance with the signal transmitted through the corresponding one of the scanning lines SCLs. In this state, one of the source/drain regions of the drive transistor $TR_D$ is made to have conduction with the power source portion 100 through the first transistor $TR_1$ turned ON in accordance with the signal transmitted through the corresponding one of the first transistor controlling line $CL_1$ in accordance with the operation of the first transistor controlling circuit 111. Also, the voltage $V_{CC}$ is applied as the higher voltage than the voltage obtained by subtracting the threshold voltage $V_{th}$ of the drive transistor $TR_D$ from the potential $V_{0fs-L}$ at the first node $ND_1$ from the power source portion 100 to one of the source/drain regions of the drive transistor $TR_D$. It is noted that the voltage $V_{CC}$ is continuously applied until the termination of the (m+m'−1)-th horizontal scanning time period. As a result, although no potential at the first node $ND_1$ changes ($V_{0fs-L}$=0 V is maintained), the potential at the second node $ND_2$ changes from the potential at the first node $ND_1$ toward the potential obtained by substituting the threshold voltage $V_{th}$ of the drive transistor $TR_D$ from the potential at the first node $ND_1$. That is to say, the potential at the second node $ND_2$ held in the floating state rises.

If a length of [time period-TP(3)$_4$] is sufficiently long similarly to the case described for [time period-TP(2)$_3$] in Embodiment 1, the difference in potential between the gate electrode of the drive transistor $TR_D$, and the other of the source/drain regions thereof reaches the threshold voltage $V_{th}$, and thus the drive transistor $TR_D$ is turned OFF. That is to say, the potential at the second node $ND_2$ held in the floating state approaches ($V_{0fs}-V_{th}$=−3 V), and finally becomes ($V_{0fs}-V_{th}$). However, the length of [time period-TP(3)$_4$] in Embodiment 3 is not enough to sufficiently change the potential at the second node $ND_2$. As a result, in the termination of [time period-TP(3)$_4$], the potential at the second node $ND_2$ reaches the certain potential $V_A$ fulfilling the relationship of $V_A<(V_{0fs-L}-V_{th})$.

The operation for a time period in and after [time period-TP(3)$_5$] is substantially the same as that for which the voltage $V_{CC-H}$ is replaced with the voltage $V_{CC}$ and the voltage $V_{0fs}$ is substantially replaced with $V_{0fs-H}/V_{0fs-L}$ in the description given for a time period from [time period-TP(2)$_4$] to [time period-TP(2)$_{11}$] in Embodiment 1 except that Embodiment 3 is different from Embodiment 1 in that the write transistor $TR_W$ is held in the OFF state for [time period-TP(3)$_8$] which will be described later. Hereinafter, time periods will be described.

Figure 15G:
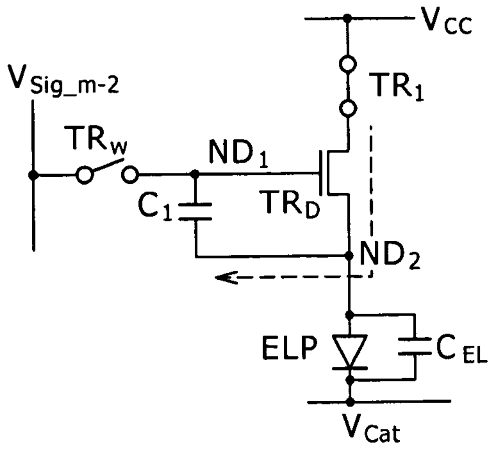
Figure 15H:
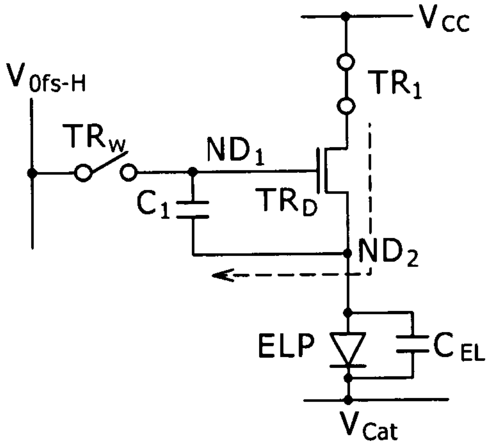
Figure 15I:
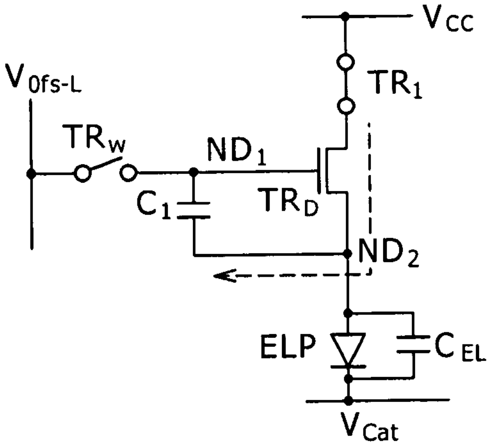
Figure 15J:
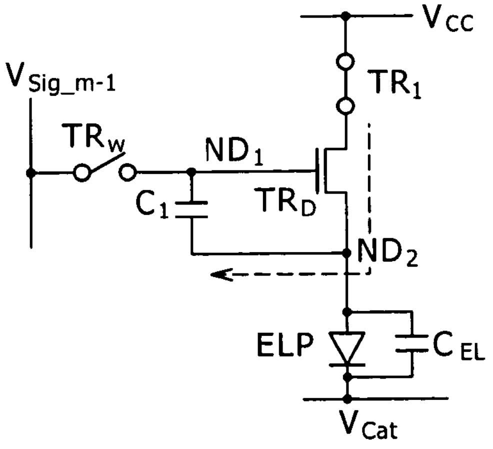

[Time Period-TP(3)$_5$] (Refer to FIG. 14 and FIG. 15G)

In a commencement of [time period-TP(3)$_5$], the voltage on the corresponding one of the data lines DTLs is switched from the first node initialization voltage $V_{0fs-L}$ over to the voltage of the video signal voltage $V_{Sig\_m-2}$. In order to avoid application of the video signal voltage $V_{Sig\_m-2}$ to the first node $ND_1$, in the commencement of [time period-TP(4)$_5$], the write transistor $TR_W$ is turned OFF in accordance with the signal transmitted through the corresponding one of the scanning lines SCLs. The operation carried out for [time period-TP(4)$_5$] is the same as that described for [time period-TP(2)$_4$] in Embodiment 1. Thus, the potential at the second node $ND_2$ rises from the potential $V_A$ to a certain potential $V_B$. In addition, the potential at the first node $ND_1$ rises so as to follow a change in potential at the second node $ND_2$.

[Time Period-TP(3)$_6$] and [Time Period-TP(3)$_7$] (Refer to FIG. 14, and FIGS. 15H to 15J)

For Time Period-TP(3)$_6$, the higher voltage than the voltage obtained by subtracting the threshold voltage $V_{th}$ of the drive transistor $TR_D$ from the first node initialization voltage $V_{0fs-L}$ applied to the first node $ND_1$ in the above step (b) is applied from the power source portion 100 to one of the source/drain regions of the drive transistor $TR_D$. In this state, the write transistor $TR_W$ is held in the OFF state for one horizontal scanning time period to cause the potential at the second node $ND_2$ to rise, thereby causing the potential at the first node $ND_1$ held in the floating state to rise. In such a manner, the auxiliary bootstrap processing is executed.

An operation carried out for [time period-TP(3)$_6$] is the same as that described for [time period-TP(2)$_5$] in Embodiment 1. Thus, the potential at the second node $ND_2$ rises from the potential $V_B$ to a certain potential $V_C$. In addition, the potential at the first node $ND_1$ rises so as to follow a change in potential at the second node $ND_2$. The operation carried out for [time period-TP(3)$_7$] is the same as that described for [time period-TP(2)$_6$] in Embodiment 1. Thus, the potential at the second node $ND_2$ rises from the potential $V_C$ to a certain potential $V_D$. In addition, the potential at the first node $ND_1$ rises so as to follow a change in potential at the second node $ND_2$.

Figure 15K:
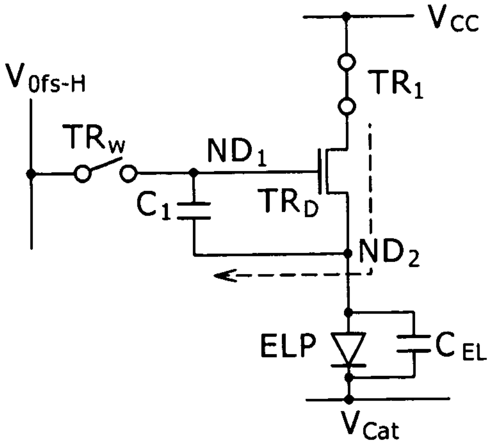

[Time Period-TP(3)$_8$] (Refer to FIG. 14 and FIG. 15K)

In a commencement of [time period-TP(3)$_8$], the voltage on the corresponding one of the data lines DTLs is switched from the voltage of the video signal $V_{Sig\_m-1}$ over to the voltage $V_{0fs-H}$ as the first node initialization voltage. As previously described, the voltage $V_{0fs-H}$ is the voltage for the purpose of initializing the potential at the second node $ND_2$ in the above step (a), that is, in the preprocessing described above. It is unnecessary to apply the voltage $V_{0fs-H}$ to the first node $ND_1$ after execution of the preprocessing. Thus, in order to avoid application of the voltage $V_{0fs-H}$ to the first node $ND_1$, the voltage on the corresponding one of the scanning lines SCLs is held at the low level in accordance with the scanning circuit 101. Also, the write transistor $TR_W$ is maintained in the OFF state. Therefore, for [time period-TP(3)$_8$] as well, the bootstrap operation is maintained, and thus the potential at the second node $ND_2$ rises from the potential $V_D$ to a certain potential $V_E$. In addition, the potential at the first node $ND_1$ rises so as to follow a change in potential at the second node $ND_2$.

It is noted that it is required as the premise of an operation for [time period-TP(3)$_9$] that the potential at the second node $ND_2$ is lower than ($V_{0fs}-V_{th}$). Basically, the operation carried out for [time period-TP(3)$_9$] is not impeded as long as the potential $V_E$ at the second node $ND_2$ in the termination of [time period-TP(3)$_8$] is lower than ($V_{0fs\text{-}L}$−$V_{th}$). Similarly to the case described in Embodiment 1, a length from the commencement of [time period-TP(3)$_5$] to the termination of [time period-TP(3)$_8$] has to be previously set as the design value during the design of the organic EL display device so as to fulfill a condition of $V_E<V_{0fs\text{-}L}-V_{th}$.

Figure 15L:
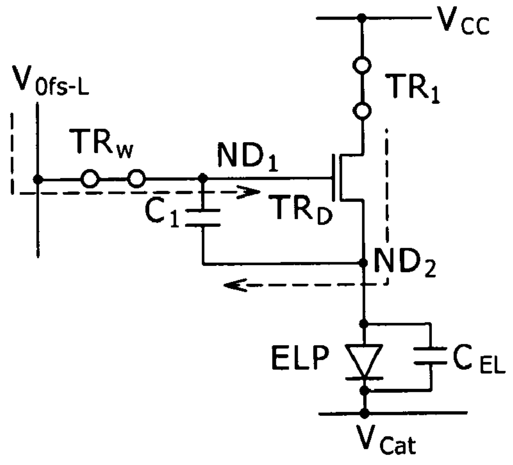

[Time Period-TP(3)$_9$] (Refer to FIG. 14 and FIG. 15L)

For [time period-TP(3)$_9$] as well, the above step (b), that is, the threshold voltage canceling processing described above is executed. The threshold voltage canceling processing executed for [time period-TP(3)$_9$] corresponds to the threshold voltage canceling processing intended to be executed right before execution of the write processing. The operation carried out for [time period-TP(3)$_9$] is the same as that described for [time period-TP(2)$_7$] in Embodiment 1. Thus, the potential at the second node $ND_2$ held in the floating state approaches ($V_{0fs\text{-}L}$−$V_{th}$=−3 V), and finally becomes ($V_{0fs\text{-}L}$−$V_{th}$). Here, as long as Expression obtained by replacing $V_{0fs}$ with $V_{0fs\text{-}L}$ in Expression (5) is guaranteed, in other words, as long as the potentials are selected and determined so as to fulfill Expression obtained by replacing $V_{0fs}$ with $V_{0fs\text{-}L}$ in Expression (5), the electroluminescence portion ELP emits no light.

The potential at the second node $ND_2$ finally becomes ($V_{0fs\text{-}L}$−$V_{th}$) for [time period-TP(3)$_9$]. That is to say, the potential at the second node $ND_2$ is determined depending on only the threshold voltage $V_{th}$ of the drive transistor $TR_D$, and the first node initialization voltage $V_{0fs\text{-}L}$ used to initialize the potential at the gate electrode of the drive transistor $TR_D$. Also, the potential at the second node $ND_2$ has no connection with the threshold voltage $V_{th\_EL}$ of the electroluminescence portion ELP.

Figure 15M:
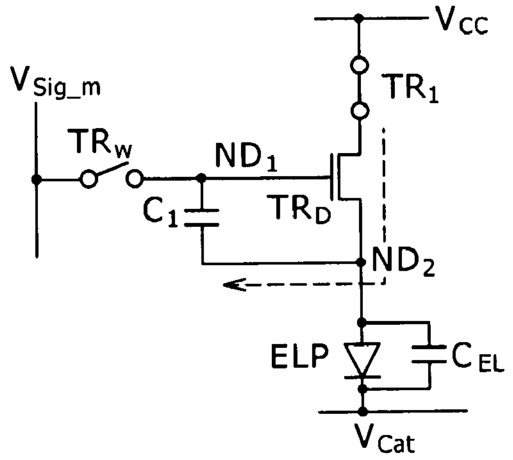

[Time Period-TP(3)$_{10}$] (Refer to FIG. 14 and FIG. 15M)

In a commencement of [time period-TP(3)$_{10}$], the write transistor $TR_W$ is turned OFF in accordance with the signal transmitted through the corresponding one of the scanning lines SCLs. Also, the voltage applied to the corresponding one of the data lines DTLs is switched from the first node initialization voltage $V_{0fs\text{-}L}$ over to the voltage of the video signal $V_{Sig\_m}$. If the drive transistor $TR_D$ reaches the OFF state in the threshold voltage canceling processing, neither of the potential at the first node $ND_1$ and the potential at the second node $ND_2$ substantially changes. In the case where the drive transistor $TR_D$ does not reach the OFF state in the threshold voltage canceling processing, the bootstrap operation occurs for [time period-TP(3)$_{10}$] as well, and each of the potential at the first node $ND_1$ and the potential at the second node $ND_2$ slightly rises. The drive operation in the organic EL element is explained in FIG. 14 on the assumption that no bootstrap operation occurs.

Figure 15N:
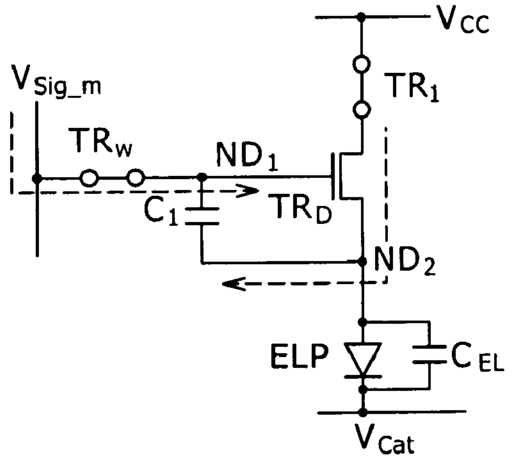
Figure 15O:
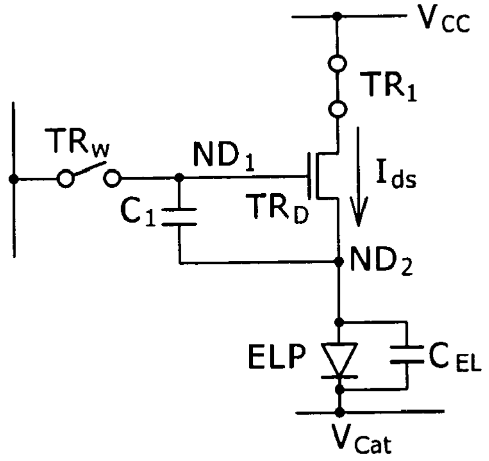
Figure 16:
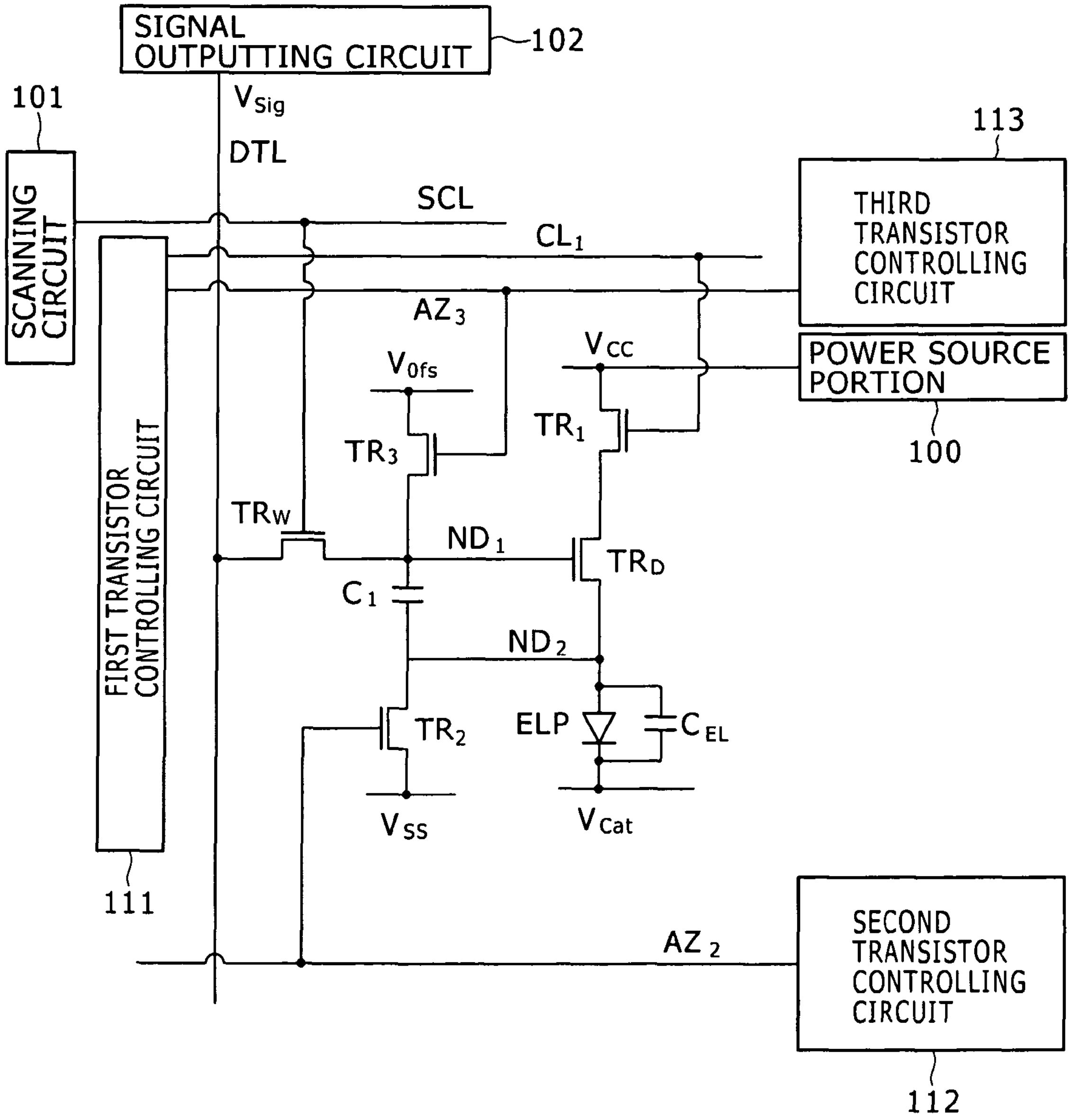
FIG. 16 is an equivalent circuit diagram of a drive circuit composed of 5 transistors/1 capacitor portion in the related art.
Figure 17:
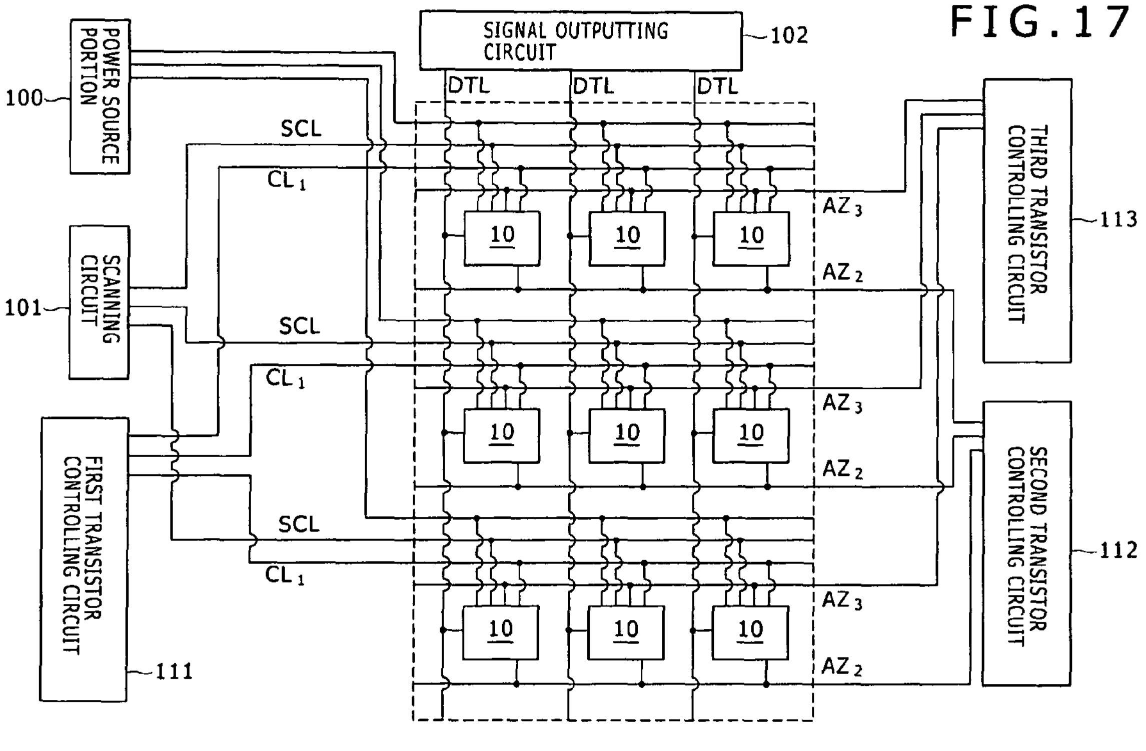
FIG. 17 is a conceptual view of an organic EL display device in the related art.

[Time Period-TP(3)$_{11}$] (Refer to FIG. 14 and FIG. 15N)

The above step (c), that is, the write processing described above is executed for [time period-TP(3)$_{11}$]. Since the operation for [time period-TP(3)$_{11}$] is the same as that described for [time period-TP(2)$_9$] in Embodiment 1, a description thereof is omitted here for the sake of simplicity. Similarly to the case described in Embodiment 1, in the driving method as well of Embodiment 3, the write processing is executed together with the mobility correcting processing for causing the potential (that is, the potential at the second node $ND_2$) at the other of the source/drain regions of the drive transistor $TR_D$ to rise in correspondence to the characteristics of the drive transistor $TR_D$ (for example, the magnitude of the mobility μ, and the like).

It is noted that the write transistor $TR_W$ can be held in the ON state for [time period-TP(3)$_{10}$] as the case may be similarly to the case described in Embodiment 1. With this constitution, the write processing starts to be executed as soon as the voltage on the corresponding one of the data lines DTLs is switched from the first node initialization voltage $V_{0fs\text{-}L}$ over to the voltage of the video signal $V_{Sig\_m}$ for [time period-TP(3)$_{10}$].

[Time Period-TP(3)$_{12}$] (Refer to FIG. 14 and FIG. 15O)

By performing the above operations, there are completed the execution of the threshold voltage canceling processing, the write processing, and the mobility correcting processing. After that, the step (d) described above is performed for [time period-TP(3)$_5$]. That is to say, the write transistor $TR_W$ is held in the OFF state, and thus the first node $ND_1$, that is, the gate electrode of the drive transistor $TR_D$ is held in the floating state. The ON state of the first transistor $TR_1$ is maintained, and a state is maintained in which the voltage $V_{CC}$ is applied from the power source portion 100 to one of the source/drain regions of the drive transistor $TR_D$. Therefore, as the result of the foregoing, the electroluminescence portion ELP starts to emit the light because the potential at the second node $ND_2$ rises to exceed ($V_{th\text{-}EL}$−$V_{Cat}$). At this time, the current $I_{ds}$ caused to flow through the electroluminescence portion ELP is independent of the threshold voltage $V_{th\text{-}EL}$ of the electroluminescence portion ELP, and the threshold voltage $V_{th}$ of the drive transistor $TR_D$ because it can be obtained based on Expression (8) in which $V_{0fs\text{-}L}$ takes the place of $V_{0fs}$.

Also, the electroluminescence state of the electroluminescence portion ELP is continuously held until the (m+m'−1)-th horizontal scanning time period. This time point corresponds to end of [time period-TP(3)$_{-1}$].

From the above, the operation of the electroluminescence of the organic EL element 10 constituting the (n, m)-th subpixel has been completed.

Although the present invention has been described so far based on the preferred embodiments, the present invention is by no means limited thereto. The configurations and the structures of the various kinds of constituent elements constituting the organic EL display device, the organic EL element, and the drive circuit, and the processes in the method of driving the electroluminescence portion which have been described in Embodiments 1 to 3 are merely the exemplifications, and thus can be suitably changed.

Although in Embodiment 1, the threshold voltage canceling processing is executed for [time period-TP(2)$_3$] after execution of the preprocessing for [time period-TP(2)$_2$], the present invention is by no means limited thereto. The write transistor $TR_W$ can be held in the OFF state for [time period-TP(2)$_3$] as the case may be. With this constitution, the threshold voltage canceling processing is executed once right before execution of the write processing. This also applies to each of Embodiment 2 and Embodiment 3.

In addition, although in each of Embodiment 2 and Embodiment 3, the write processing is executed together with the mobility correcting processing similarly to the case of Embodiment 1, the present invention is by no means limited thereto. The write processing and the mobility correcting processing can be executed separately from each other. Specifically, the write processing is executed in a way that the first transistor $TR_1$ is held in the OFF state, and the voltage of the video signal $V_{Sig\_m}$ is applied from the corresponding one of the data lines DTLs to the first node $ND_1$ through the write transistor $TR_W$ held in the ON state. Next, the mobility correcting processing may be executed in a way that the first transistor $TR_1$ is held in the ON state, and a state in which the video signal $V_{Sig\_m}$ is applied to the first node is maintained for a predetermined time period.

It should be understood by those skilled in the art that various modifications, combinations, sub-combinations and alterations may occur depending on design requirements and other factors insofar as they are within the scope of the appended claims or the equivalents thereof.

What is claimed is:

1. A method of driving an organic electroluminescence emission portion, in which a drive circuit for driving an organic electroluminescence emission portion includes a drive transistor including source/drain regions, a channel formation region, and a gate electrode, a write transistor including source/drain regions, a channel formation region, and a gate electrode, and a capacitor portion including a pair of electrodes, in said drive transistor, one of said source/drain regions is connected to a power source portion, the other of the said source/drain regions is connected to an anode electrode provided in said organic electroluminescence light emission portion, and is connected to one of said pair of electrodes of said capacitor portion, thereby forming a second node, and said gate electrode is connected to the other of said source/drain regions of said write transistor, and is connected to the other of said pair of electrodes of said capacitor portion, thereby forming a first node, in said write transistor, one of said source/drain regions is connected to corresponding one of data lines, and said gate electrode is connected to corresponding one of scanning lines, by using said drive circuit, there are performed the steps of (a) executing preprocessing for initializing a potential at said first node and a potential at said second node so that a difference in potential between said first node and said second node exceeds a threshold voltage of said drive transistor, and a difference in potential between said second node and a cathode electrode provided in said organic electroluminescence emission portion does not exceed a threshold voltage of said organic electroluminescence emission portion, (b) executing threshold voltage canceling processing for applying a higher voltage than that obtained by subtracting the threshold voltage of said drive transistor from the potential at said first node from said power source portion to one of said source/drain regions of said drive transistor in a state of holding the potential at said first node, thereby changing the potential at said second node toward the potential obtained by subtracting the threshold voltage of said drive transistor from the potential at said first node at least once, (c) executing write processing for supplying a video signal from the corresponding one of said data lines to said first node through said write transistor, and (d) turning OFF said write transistor to set said first node in a floating state, thereby causing a current corresponding to a value of the difference in potential between said first node and said second node to flow from said power source portion through said drive transistor to said organic electroluminescence emission portion, said driving method including the steps of:

executing steps from said step (a) to said step (c) for at least continuous three scanning time periods;

applying a first node initialization voltage to corresponding one of said data lines, and supplying the video signal instead of the first node initialization voltage for each of the scanning time periods;

applying the first node initialization voltage from the corresponding one of said data lines to said first node through said write transistor held in the ON state, thereby initializing the potential at said first node in said step (a);

and applying the first node initialization voltage from the corresponding one of said data lines to said first node through said write transistor held in an ON state, thereby holding the potential at said first node in said step (b);

wherein auxiliary bootstrap processing for holding said write transistor in an OFF state for one scanning time period in which a higher voltage than a voltage obtained by subtracting the threshold voltage of said drive transistor from the first node initialization voltage applied to said first node in said step (b) is applied from said power source portion to the one of said source/drain regions for a time period from completion of the execution of the preprocessing to start of the execution of the threshold voltage canceling processing intended to be executed right before the write processing, to cause the potential at said second node to rise, thereby causing the potential at said first node held in the floating state to rise is executed at least once.

2. The method of driving an organic electroluminescence emission portion according to claim 1, wherein in said step (a), a second node initialization voltage is applied from said power source portion to said second node through said driving transistor for initializing the potential at said second node.

3. The method of driving an organic electroluminescence emission portion according to claim 1, wherein said drive circuit further comprises:

a first transistor including source/drain regions, a channel formation region, and a gate electrode; and a second transistor including source/drain regions, a channel formation region, and a gate electrode;

in said first transistor, one of said source/drain regions is connected to said power source portion, the other of said source/drain regions is connected to one of said source/drain regions of said drive transistor, and said gate electrode is connected to a first transistor controlling line; in said second transistor, one of said source/drain regions is connected to a second node initialization voltage supplying line, the other of said source/drain regions is connected to said second node, and said gate electrode is connected to a second transistor controlling line;

in said step (a), a second node initialization voltage is applied from said second node initialization voltage supplying line to said second node through said second transistor turned ON in accordance with a signal from said second transistor controlling line in a state in which an OFF state of said first transistor is maintained in accordance with a signal from said first transistor controlling line, and said second transistor is turned OFF in accordance with the signal from said second transistor controlling line for initializing the potential at said second node; and in said step (b), one of said source/drain regions of said drive transistor is caused to obtain conduction with said power source portion through said first transistor turned ON in accordance with the signal from said first transistor controlling line.

4. The method of driving an organic electroluminescence emission portion according to claim 1, wherein said drive circuit further comprises:

a first transistor including source/drain regions, a channel formation region, and a gate electrode; in said first transistor, one of said source/drain regions is connected to said power source portion, the other of said source/drain regions is connected to one of said source/drain regions of said drive transistor, and said gate electrode is connected to a first transistor controlling line;

in said step (a), a value of a first node initialization voltage applied to said first node is changed in a state in which an OFF state of said first transistor is maintained in accordance with a signal from said first transistor controlling line to change the potential at said second node in accordance with the change in potential at said first node for initializing the potential at said second node; and in said step (b), one of said source/drain regions of said drive transistor is caused to obtain conduction with said power source portion through said first transistor turned ON in accordance with the signal from said first transistor controlling line.

* * * * *